United States Patent
Nishida

(10) Patent No.: US 11,481,962 B2
(45) Date of Patent: Oct. 25, 2022

(54) INFORMATION PROCESSING DEVICE, INFORMATION PROCESSING METHOD, AND INFORMATION PROCESSING PROGRAM

(71) Applicant: GREE, Inc., Tokyo (JP)

(72) Inventor: Ryosuke Nishida, Minato-ku (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 17/356,836

(22) Filed: Jun. 24, 2021

(65) Prior Publication Data

US 2021/0407179 A1 Dec. 30, 2021

(30) Foreign Application Priority Data

| Jun. 26, 2020 | (JP) | JP2020-110737 |
| Jun. 26, 2020 | (JP) | JP2020-110753 |
| Jun. 26, 2020 | (JP) | JP2020-110767 |

(51) Int. Cl.
*G06T 15/20* (2011.01)
*A63F 13/525* (2014.01)

(52) U.S. Cl.
CPC ............ *G06T 15/20* (2013.01); *A63F 13/525* (2014.09); *A63F 2300/6661* (2013.01)

(58) Field of Classification Search
None
See application file for complete search history.

(56) References Cited

U.S. PATENT DOCUMENTS

| 11,244,499 B2 | 2/2022 | Yonezu | |
| 2020/0298117 A1 * | 9/2020 | Yonezu | G06T 15/20 |

FOREIGN PATENT DOCUMENTS

| JP | 2013-208269 A | 10/2013 |
| JP | 2017-131523 A | 8/2017 |
| JP | 2020-080007 A | 5/2020 |

OTHER PUBLICATIONS

Notification of Reasons for Refusal dated Aug. 9, 2022, in corresponding to Japanese Application No. 2020-110737; 5 pages (with Machine-Generated English Translation).
Notification of Reasons for Refusal dated Aug. 9, 2022, in corresponding to Japanese Application No. 2020-110753; 5 pages (with Machine-Generated English Translation).

* cited by examiner

*Primary Examiner* — Frank S Chen
(74) *Attorney, Agent, or Firm* — Maier & Maier, PLLC

(57) ABSTRACT

An information processing device for drawing an object arranged in a three-dimensional virtual space, in an expression viewed from a virtual camera, the object including a field object associated with a two-dimensional plane defined by a first axis and a second axis, and a specific object arranged on the field object, the device including: a change processing unit changing a region of the field object falling within a viewing angle of the virtual camera; and a deformation processing unit deforming the field object, in which in a case where the region is changed by the change processing unit, the deformation processing unit makes a deformation mode of the field object different when it is determined that the specific object is positioned in the region after being changed and when it is determined that the specific object is not positioned in the region after being changed.

21 Claims, 33 Drawing Sheets

FIG.11A
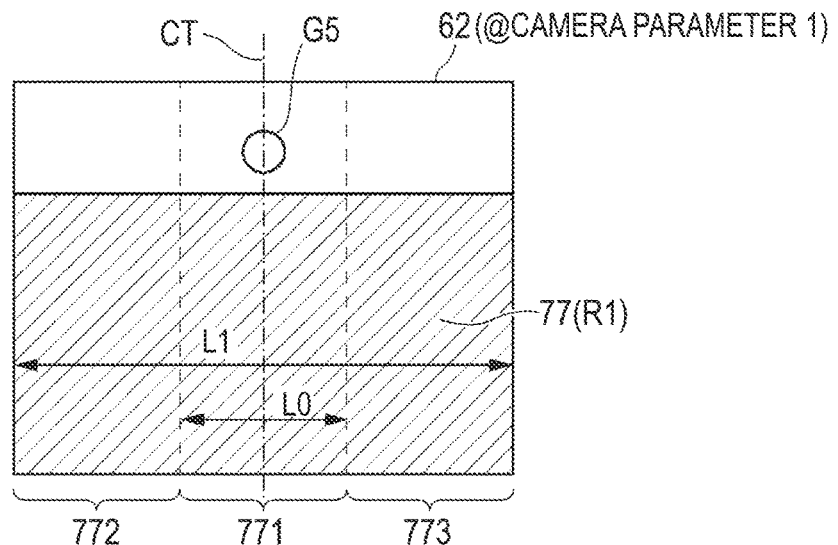
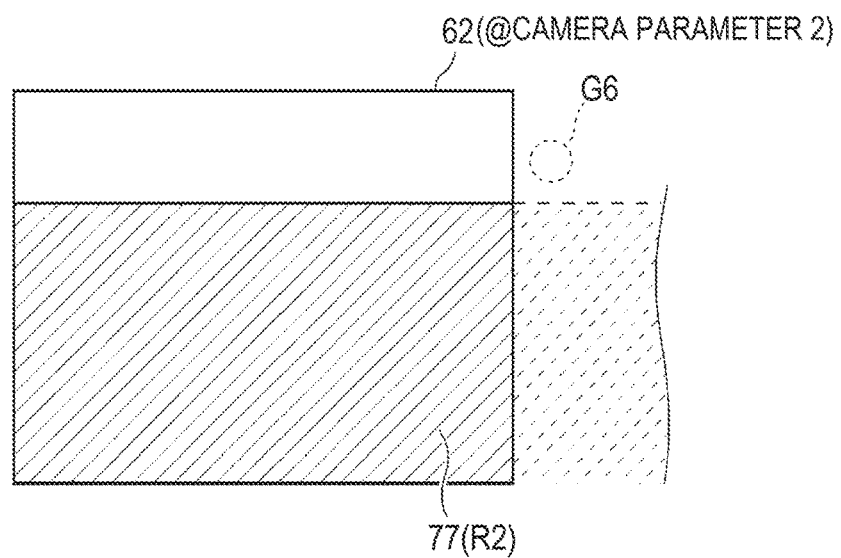
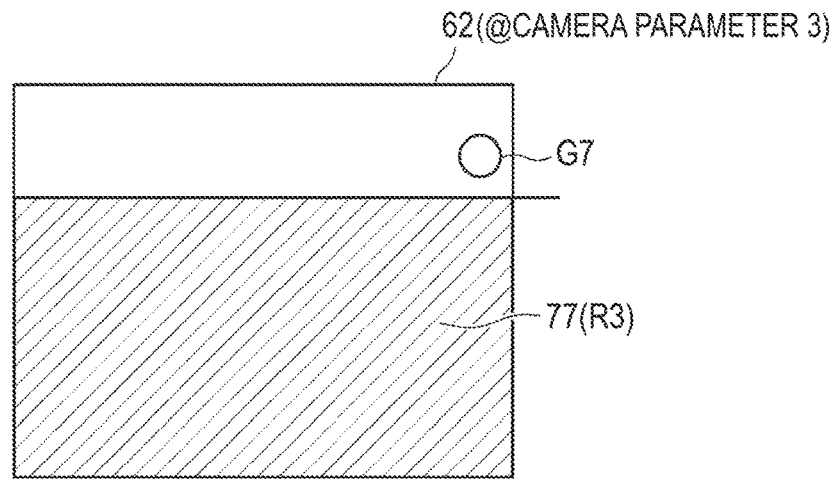

FIG.11B
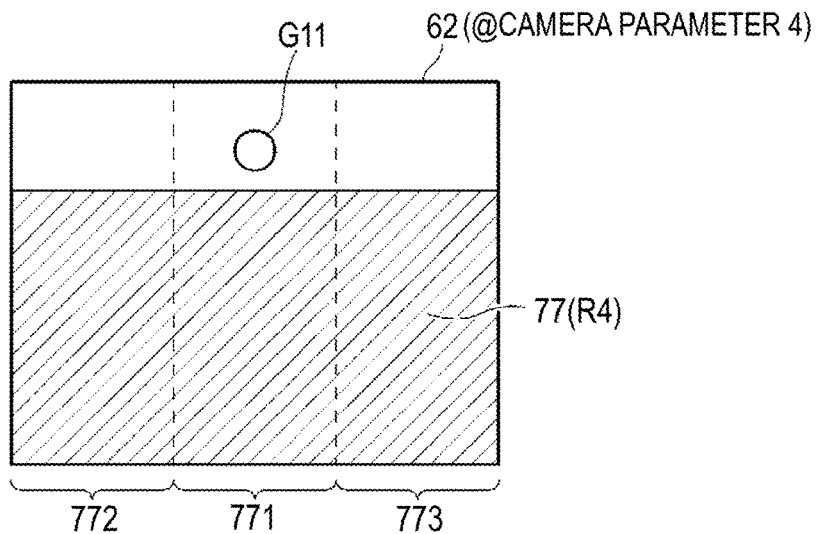
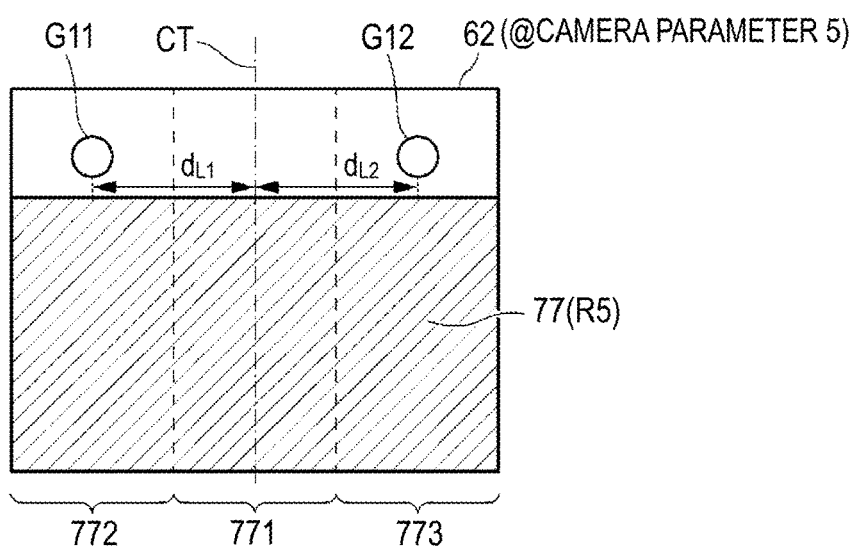
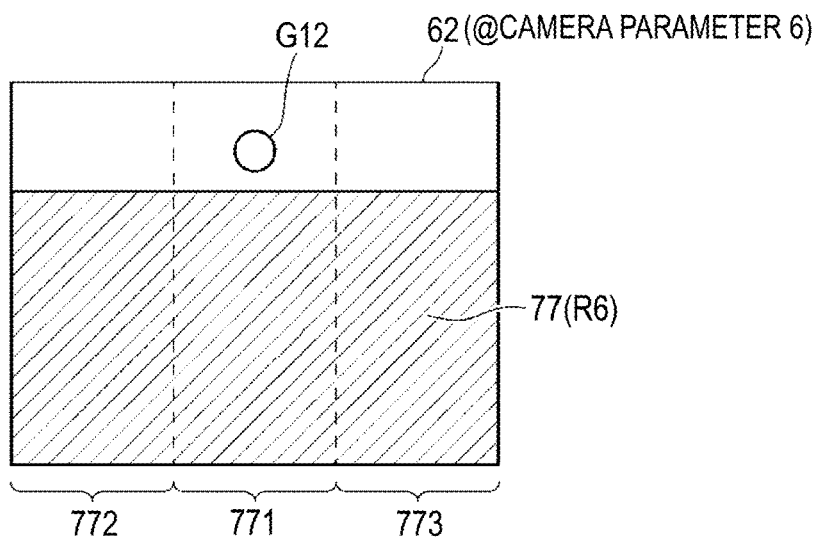

| POSITION PARAMETER(X,Y) | DIRECTION PARAMETER $\theta$ | DEFORMATION PARAMETER A1 |
|---|---|---|
| SPECIFIC POSITION A $(X_A, Y_A)$ | — | $\beta_1$ |
| SPECIFIC POSITION B $(X_B, Y_B)$ | — | $\beta_2$ |
| SPECIFIC POSITION C $(X_C, Y_C)$ | $\theta_{C1}$ | $\beta_3$ |
| | $\theta_{C2}$ | $\beta_4$ |
| ... | ... | ... |

13B

| SPECIFIC OBJECT | DIRECTION PARAMETER $\theta$ | DEFORMATION PARAMETER A1 |
|---|---|---|
| SPECIFIC OBJECT G1 | — | $\beta_{G1}$ |
| SPECIFIC OBJECT G2 | — | $\beta_{G2}$ |
| SPECIFIC OBJECT G3 | $\theta_{C3}$ | $\beta_{G3}$ |
| | $\theta_{C4}$ | $\beta_{G4}$ |
| ... | ... | ... |

| POSITION PARAMETER(X,Y) | DISTANCE PARAMETER A2 |
|---|---|
| SPECIFIC POSITION A $(X_A, Y_A)$ | $r_1$ |
| SPECIFIC POSITION B $(X_B, Y_B)$ | $r_2$ |
| SPECIFIC POSITION C $(X_C, Y_C)$ | $r_3$ |
| ... | ... |

14B

| SPECIFIC OBJECT | DISTANCE PARAMETER A2 |
|---|---|
| SPECIFIC OBJECT G1 | $r_{G1}$ |
| SPECIFIC OBJECT G2 | $r_{G2}$ |
| SPECIFIC OBJECT G3 | $r_{G3}$ |
| ... | ... |

FIG.15

| POSITION PARAMETER(X,Y) | DIRECTION PARAMETER $\theta$ |
|---|---|
| DIRECTION CHANGE POSITION T1 $(X_{P1}, Y_{P1})$ | $\theta_1$ |
| DIRECTION CHANGE POSITION T2 $(X_{P2}, Y_{P2})$ | $\theta_2$ |
| DIRECTION CHANGE POSITION T3 $(X_{P3}, Y_{P3})$ | $\theta_3$ |
| ... | ... |

INFORMATION PROCESSING DEVICE, INFORMATION PROCESSING METHOD, AND INFORMATION PROCESSING PROGRAM

FIELD

The present disclosure relates to an information processing device, an information processing method, and an information processing program.

BACKGROUND

An information processing device for drawing an object arranged in a three-dimensional virtual space, in an expression viewed from a virtual camera arranged in the virtual space, has been known.

PRIOR ART DOCUMENT

Patent Literature

[Patent Literature 1] JP-A-2013-208269

SUMMARY

In the related art as described above, it is difficult to generate various expressions according to a relationship between the virtual camera and a specific object (for example, a position relationship).

Therefore, in one aspect, an object of the invention is to generate various expressions according to a relationship between a virtual camera and a specific object.

Solution to Problem

In one aspect, an information processing device for drawing an object arranged in a three-dimensional virtual space defined by a first axis, a second axis, and a third axis that are orthogonal to each other, in an expression viewed from a virtual camera arranged in the virtual space, the object including a field object associated with a two-dimensional plane defined by the first axis and the second axis, and a specific object arranged on the field object, the device including:

a change processing unit changing a region of the field object falling within a viewing angle of the virtual camera; and a deformation processing unit deforming the field object, in which in a case where the region is changed by the change processing unit, the deformation processing unit determines whether or not the specific object is positioned in the region after being changed, and makes a deformation mode of the field object different when it is determined that the specific object is positioned in the region after being changed and when it is determined that the specific object is not positioned in the region after being changed, is provided.

In one aspect, according to the invention, various expressions according to a relationship between a virtual camera and a specific object can be generated.

BRIEF DESCRIPTION OF THE DRAWINGS

FIG. 11A is an explanatory diagram of a specific object region or the like;

FIG. 11B is an explanatory diagram of various object regions;

FIG. 13 is an explanatory diagram of deformation parameter data;

FIG. 14 is an explanatory diagram of distance parameter data;

FIG. 15 is an explanatory diagram of direction parameter data;

DETAILED DESCRIPTION

Hereinafter, each embodiment will be described in detail, with reference to the attached drawings.

(Outline of Game System)

Figure 1:
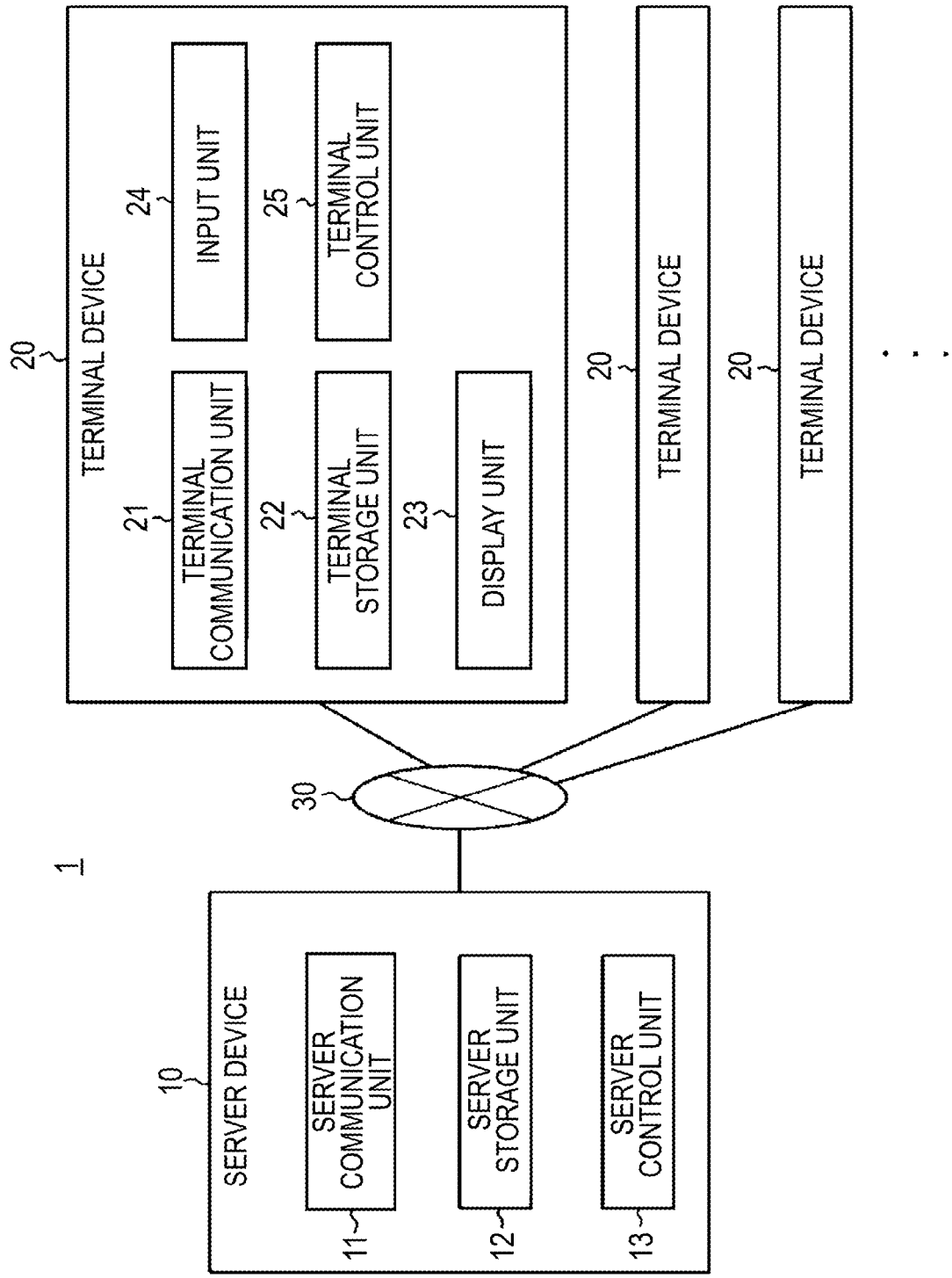
FIG. 1 is a block diagram of a game system according to this embodiment.
Figure 2:
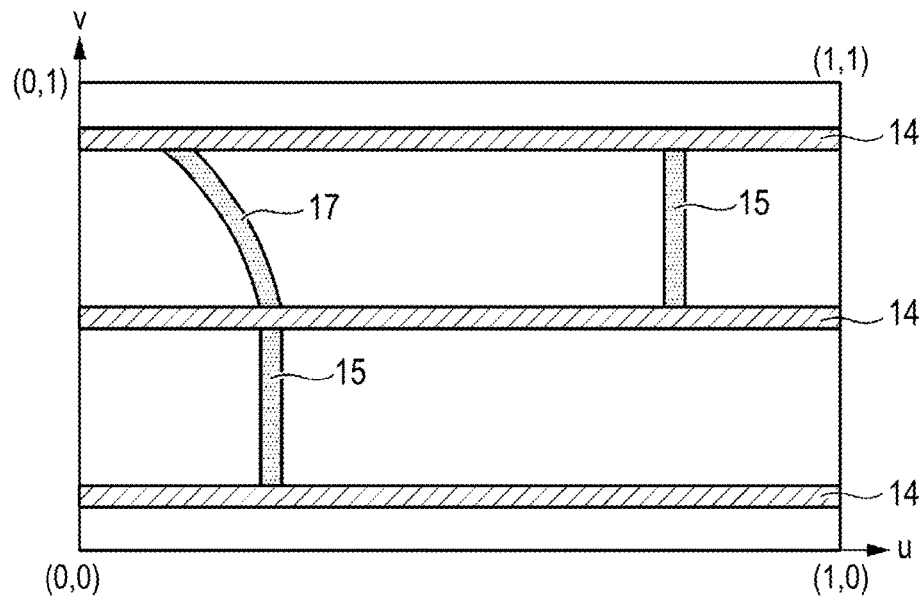
FIG. 2 is a diagram illustrating an example of a field image.

The outline of a game system 1 according to one embodiment of the invention will be described with reference to FIG. 1. FIG. 1 is a block diagram of the game system 1 according to this embodiment. FIG. 2 is a diagram illustrating an example of a field image. The game system 1 includes a server device 10 and one or more terminal devices 20. In FIG. 1, for convenience, three terminal devices 20 are illustrated, and the number of terminal devices 20 may be two or more.

The server device 10, for example, is an information processing device that is managed by a game operator, such as a server. The terminal device 20, for example, is an information processing device that is used by a user, such as a mobile phone, a smart phone, a tablet terminal, a personal computer (PC), or a game device. The terminal device 20 is capable of executing an application of a game according to this embodiment. The application of the game may be received in the terminal device 20 from the server device 10 or a predetermined application distribution server through a network 30, or may be stored in advance in a storage device provided in the terminal device 20 or a storage medium that can be read by the terminal device 20, such as a memory card. The server device 10 and the terminal device 20 are connected through the network 30 such that communication can be performed. For example, various processings relevant to the game are executed by cooperation between the server device 10 and the terminal device 20.

Note that, the network 30 may be a wireless communication network, the internet, a virtual private network (VPN), a wide area network (WAN), a wired network, an arbitrary combination thereof, or the like.

Here, the outline of the game according to this embodiment will be described. The game according to this embodiment, for example, is a role playing game, a simulation game, or the like, and a game content is used, in association with the execution of the game. For example, the game according to this embodiment is a game for moving a game content on a field within a three-dimensional virtual space.

The game content is electronic data that is used in the game, and for example, includes an arbitrary medium such as a card, an item, a point, a currency in a service (or a currency in a game), a ticket, a character, an avatar, and a parameter. In addition, the game content may be game-related information such as level information, status information, game parameter information (a physical power value, an offensive capability, and the like) or capability information (a skill, an ability, a spell, a job, and the like). In addition, the game content is electronic data that can be retrieved, possessed, used, managed, exchanged, synthesized, enhanced, sold, disposed, or bestowed by the user in the game, but a use mode of the game content is not limited to that clearly specified herein.

Hereinafter, unless otherwise stated, the "game content possessed by the user" indicates a game content associated with a user ID of the user. In addition, "applying the game content to the user" indicates associating the game content with the user ID. In addition, "wasting the game content possessed by the user" indicates dissolving the association between the user ID and the game content. In addition, "consuming the game content possessed by the user" indicates enabling some effects or influences to be generated in the game, in accordance with the dissolution of the association between the user ID and the game content. In addition, "selling the game content possessed by the user" indicates dissolving the association between the user ID and the game content to associate another game content (for example, a virtual currency, an item, or the like) with the user ID. In addition, "assigning a game content possessed by a certain user to another user" indicates dissolving the association between a user ID of the certain user and the game content to associate the game content with a user ID of another user.

The game according to this embodiment schematically includes a first game part, a second game part, and a third game part.

In the first game part, the user conducts the game while exploring the field within the virtual space by manipulating a user character. Specifically, the user character is moved on the field, in accordance with the user manipulation. In the field, for example, various areas such as a town and a dungeon are provided, and for example, various events according to the area, such as a conversation with a resident character of the town, and a matchup with an enemy character encountered in the dungeon, occur. The event is executed, and thus, a main story of the game progresses. In addition, in the first game part, for example, in the case of winning the matchup with the enemy character, for example, the game content such as an item, a virtual currency, or a character can be applied to the user. The applied game content, for example, can be used in the third game part described below.

In the second game part, the user changes a possession situation of the game content. The user, for example, collects various game media such as an item, a virtual currency, and a character. Specifically, in a case where the user character is moved in a specific area provided on the field, such as a mine and a fishing hole, or the game content such as a specific character is selected (for example, a touch manipulation with respect to a screen), a sub-event that can be retrieved by the game content occurs. The sub-event, for example, includes the progress of a sub-story, the execution of a mini game, and the like, but the contents of the sub-event are not limited thereto. Various game media can be applied to the user, in accordance with an execution result of the sub-event. The applied game content, for example, can be used in the third game part described below.

In the third game part, the user changes a parameter relevant to the game content. The user, for example, enhances the user character. Specifically, the game content that is applied to the user in the first game part and the second game part, as described above, is consumed, and thus, various game parameters of the user character are changed. The game parameter, for example, includes a level, an HP, an offensive capability, a defensive capability, an attribution, a skill, and the like of the user character, but is not limited thereto. The user character is enhanced in accordance with a change in the game parameter of the user character. Probability that the user character wins the matchup with the enemy character in the first game part increases due to the enhancement of the user character.

As described above, in the game according to this embodiment, the user repeatedly performs the first game part, the second game part, and the third game part.

(Configuration of Server Device)

The configuration of the server device 10 will be described in detail. The server device 10 includes a server computer. The server device 10 may be attained in cooperation with a plurality of server computers.

The server device 10 includes a server communication unit 11, a server storage unit 12, and a server control unit 13.

The server communication unit 11 includes an interface that transmits and receives information by performing communication with respect to the external device in a wireless or wired manner. The server communication unit 11, for example, may include a wireless local area network (LAN) communication module, a wired LAN communication module, or the like. The server communication unit 11 is capable of transmitting and receiving information with respect to the terminal device 20 through the network 30.

The server storage unit 12, for example, is a storage device, and stores various information items and programs that are necessary for the processing of the game. For example, the server storage unit 12 stores the application of the game.

In addition, the server storage unit 12 stores various images (texture images) for projection (texture mapping) with respect to various objects arranged within the three-dimensional virtual space.

For example, the server storage unit 12 stores an image of the user character. Hereinafter, the user character will be referred to as a first game content, and an object that is drawn (arranged) on a field object (described below), on the basis of an image of the first game content, may be referred to as a first object. Note that, in this embodiment, only one first object is arranged in the virtual space, but two or more first objects may be arranged. Note that, the first object may be a group of a plurality of first game media. In addition, the first game content (and the first object based thereon) that is used in the virtual space may be capable of being suitably exchanged by the user.

In addition, the server storage unit 12, for example, stores an image according to the game content, such as a building, a wall, a tree, or a non player character (NPC). Hereinafter, a game content that is an arbitrary game content different from the first game content (for example, a building, a wall, a tree, an NPC, or the like) and can be arranged on the field object described below will be referred to as a second game content, and an object onto which the second game content is projected may be referred to as a second object. Note that, in this embodiment, the second object may include an object that is fixed with respect to the field object described below, an object that is movable with respect to the field object described below, or the like. In addition, the second object may include an object that is perennially arranged on the field object described below, an object that is arranged only in a case where a predetermined condition is satisfied, or the like.

In addition, the server storage unit 12, for example, stores an image of the background such as the sky or the distant landscape (a background image). Hereinafter, an object onto which the background image is projected will also be referred to as a background object. Note that, a plurality of types of background images may be prepared, and may be used differently.

In addition, the server storage unit 12 stores an image of the field (for example, a ground surface) (the field image). The field image is projected onto a field surface described below. Hereinafter, an object in which the field image is projected onto the field surface may be referred to as the field object. Note that, the field object is used as a virtual field (the ground surface) within the virtual space.

Here, as illustrated in FIG. 2, in the field image, for example, a texture coordinate system including a u axis and a v axis that are orthogonal to each other is set. In this embodiment, in the field image, a horizontal passage 14, a vertical passage 15, and a curved road 17 are set. The horizontal passage 14, the vertical passage 15, and the curved road 17 form a passage in which the first object or the like in the field object can be moved. Note that, in FIG. 2, a specific passage configuration is illustrated, but the passage configuration is arbitrary. In addition, in FIG. 2, the field image is in the shape of a rectangle, and may be in other forms. In addition, a plurality of types of field images may be prepared, and may be used differently.

In addition, the server storage unit 12 stores correspondence information in which the second object and texture coordinates of the field image are associated. The correspondence information is used by the server control unit 13 that executes processing of arranging the second object on the field object.

The server control unit 13 is a dedicated microprocessor or a CPU that attains a specific function by reading a specific program. For example, the server control unit 13 executes the application of the game, in accordance with the user manipulation with respect to the display unit 23. In addition, the server control unit 13 executes various processings relevant to the game.

For example, the server control unit 13 displays the field image on which the field object, the first object, and the like are displayed, on the display unit 23. In addition, the server control unit 13 relatively moves the first object on the field object with respect to the field object, within the virtual space, in accordance with a predetermined user manipulation. The details of specific processing of the server control unit 13 will be described below.

(Configuration of Terminal Device)

The configuration of the terminal device 20 will be described in detail. As illustrated in FIG. 1, the terminal device 20 includes a terminal communication unit 21, a terminal storage unit 22, a display unit 23, an input unit 24, and a terminal control unit 25.

The terminal communication unit 21 includes an interface that transmits and receives information by performing communication with respect to the external device in a wireless or wired manner. The terminal communication unit 21, for example, may include a wireless communication module corresponding to a mobile communication standard such as long term evolution (LTE) (Registered Trademark), a wireless LAN communication module, a wired LAN communication module, or the like. The terminal communication unit 21 is capable of transmitting and receiving information with respect to the server device 10 through the network 30.

The terminal storage unit 22, for example, includes a primary storage device and a secondary storage device. For example, the terminal storage unit 22 may include a semiconductor memory, a magnetic memory, an optical memory, or the like. The terminal storage unit 22 stores various information items and programs that are received from the server device 10 and are used in the processing of the game. The information and the program used in the processing of the game may be retrieved from the external device through the terminal communication unit 21. For example, an application program of the game may be retrieved from a predetermined application distribution server. Hereinafter, the application program may be simply referred to as an application. In addition, for example, a part or all of the information relevant to the user described above, information relevant to a game content that is an opponent, and the like may be retrieved from the server device 10.

The display unit 23, for example, includes a display device such as a liquid crystal display or an organic electroluminescence (EL) display. The display unit 23 is capable of displaying various images. The display unit 23, for example, includes a touch panel, and functions as an interface that detects various user manipulations.

The input unit 24, for example, includes an input interface including a touch panel that is provided integrally with the display unit 23. The input unit 24 is capable of receiving user input with respect to the terminal device 20. In addition, the input unit 24 may include a physical key, or may further include an arbitrary input interface including a pointing device such as a mouse.

The terminal control unit 25 includes one or more processors. The terminal control unit 25 controls the operation of the entire terminal device 20.

The terminal control unit 25 transmits and receives information through the terminal communication unit 21. For example, the terminal control unit 25 receives various information items and programs used in the processing of the game from at least one of the server device 10 and another external server. The terminal control unit 25 stores the received information and program in the terminal storage unit 22.

The terminal control unit 25 activates the application of the game, in accordance with the manipulation of the user. The terminal control unit 25 executes the game, in cooperation with the server device 10. For example, the terminal control unit 25 displays various images used in the game (for example, various field images described below) on the display unit 23. For example, a graphic user interface (GUI) detecting the user manipulation may be displayed on the screen. The terminal control unit 25 is capable of detecting the user manipulation with respect to the screen through the input unit 24. For example, the terminal control unit 25 is capable of detecting a tap manipulation, a long tap manipulation, a click manipulation, a swipe manipulation, and the like of the user. The tap manipulation is a manipulation in which the user touches the display unit 23 with a finger, and then, releases the finger. The terminal control unit 25 transmits manipulation information to the server device 10.

(Drawing Function in Game)

The server control unit 13 displays the field image on the display unit 23, in cooperation with terminal device 20, and updates the field image, in accordance with the progress of the game. In this embodiment, the server control unit 13 draws the object arranged in the three-dimensional virtual space, in an expression viewed from the virtual camera arranged in the virtual space, in cooperation with terminal device 20.

Note that, drawing processing described below is attained by the server control unit 13, but in another embodiment, a part or all of the drawing processing described below may be attained by the server control unit 13. For example, in the following description, at least a part of the field image displayed on the terminal device 20 may be set to web display in which the field image is displayed on the terminal device 20, on the basis of data generated by the server device 10, and at least a part of the screen may be set to native display in which the screen is displayed by a native application installed in the terminal device 20.

Figure 3:
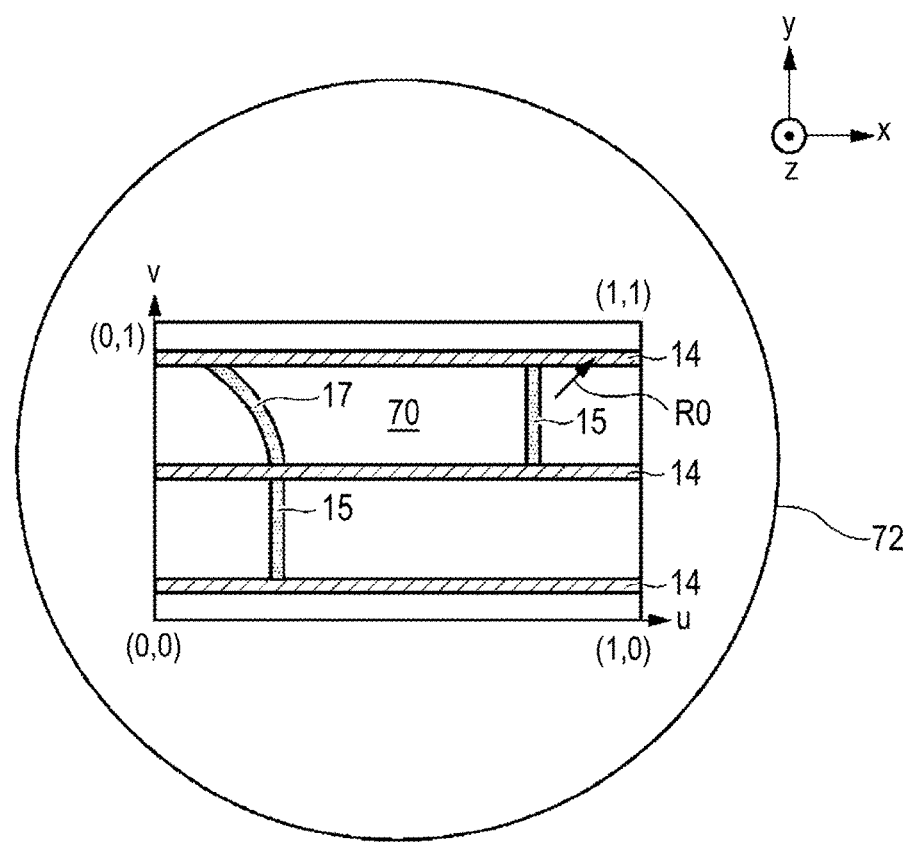
FIG. 3 is a plan view illustrating the entire field surface forming a field object and the entire background surface forming a background object.
Figure 4:
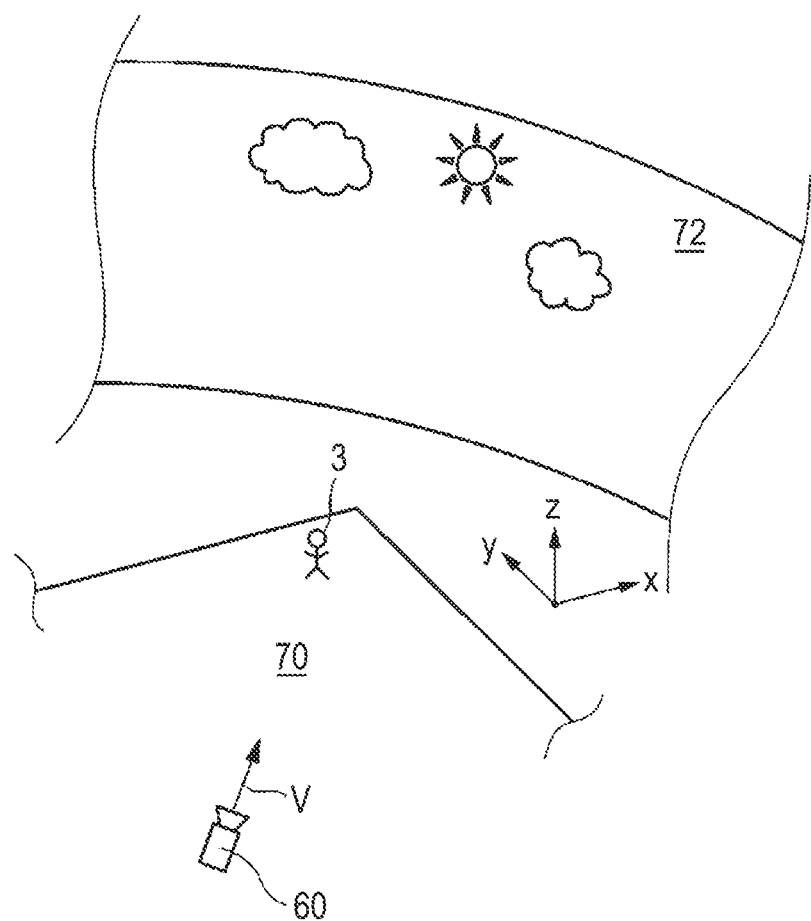
FIG. 4 is a perspective view illustrating a part of the field surface and the background surface.

FIG. 3 and FIG. 4 are explanatory diagrams of an example of the field object and the background object. FIG. 3 is a plan view illustrating the entire field surface 70 forming the field object and the entire background surface 72 forming the background object, and FIG. 4 is a perspective view illustrating a part of the field surface 70 and the background surface 72 when viewed in an oblique direction including a direction component of an arrow R0 in FIG. 3. In FIG. 4, a virtual camera 60 is also schematically illustrated. In addition, in FIG. 4, the background surface 72 is illustrated in the form of the background object onto which the background image including a picture of the cloud or the sun is projected.

In the following description, the movement of various objects indicates a movement within the virtual space. In addition, a visible range of the various objects indicates a range that is visible when viewed from the virtual camera 60 (that is, a range within a viewing angle 62 of the virtual camera 60).

In FIG. 3, a coordinate system of x, y, and z as a space coordinate system of the virtual space (hereinafter, also referred to as a "global coordinate system") is illustrated. Note that, the origin of the global coordinate system may be fixed to an arbitrary position. Hereinafter, a positive side of a z direction is set to the upper side of the virtual space, and a negative side is set to the lower side of the virtual space. Note that, in this embodiment, an x axis is an example of a first axis, a y axis is an example of a second axis, and a z axis is an example of a third axis. Hereinafter, the terms of an x direction, a y direction, and a z direction indicate a direction parallel to the x axis, a direction parallel to the y axis, and a direction parallel to the z axis, respectively. For example, the z direction indicates a direction parallel to the z axis passing through an arbitrary point within an xy plane, unless otherwise stated.

The field surface 70 is arranged by being associated with the xy plane of the virtual space. In this embodiment, as an example, the field surface 70 is arranged by being associated with the xy plane such that the u axis, the v axis, and the origin of the texture coordinate system of the projected field image are coincident with the x axis, the y axis, and the origin of the global coordinate system. Note that, in FIG. 3, as a state before being associated, the u axis, the v axis, and the origin of the texture coordinate system are illustrated by being separated from the x axis, the y axis, and the origin of the global coordinate system. The field surface 70 is not capable of being subjected to a translational movement (a linear movement), in each direction of the x direction, the y direction, and the z direction. Here, in another embodiment, the field surface 70 may be capable of being subjected to the translational movement in the global coordinate system.

When a plane parallel to the xy plane is set to a regular state, the field surface 70 can be deformed from the regular state. As described above, in this embodiment, the field object is shaped on the basis of the deformable field surface 70. That is, the field object is shaped on the basis of the field surface 70 deformed from the regular state, and thus, is deformed with respect to the plane parallel to the xy plane. Hereinafter, the deformation relevant to the field surface 70 and the field object indicates deformation in a case where the plane parallel to the xy plane is set to a regular shape (state), unless otherwise stated. Note that, the field object in a deformed state may be attained by projecting the field image onto the field surface 70 in the deformed state, or may be attained by deforming the field surface 70 after projecting the field image onto the field surface 70 in the regular state.

Note that, in a case where the field image is projected, in the regular state, the field surface 70 is capable of inheriting the texture coordinates of the projected field image. That is, each position on the field surface 70 onto which the field image is projected, substantially, can be specified by the texture coordinate system of the field image (refer to FIG. 2). Hereinafter, a coordinate system for specifying each of the positions on the field surface 70 is coincident with the texture coordinate system of the field image projected onto the field surface 70, and may be referred to a "field coordinate system".

The background surface 72 extends in the z direction of the background object. Here, in another embodiment, the background surface 72 may be arranged obliquity with respect to the z direction. In FIG. 3, the background surface 72 is arranged to surround the field surface 70. In this case, the background surface 72 may be fixed with respect to the global coordinate system, or may be movable only in the z direction, as described below. Here, in another embodiment, the background surface 72 may be arranged to surround only a part of the field surface 70. In this case, the background surface 72 may be subjected to a rotation movement, in accordance with the rotation of the virtual camera 60 described below. In addition, in still another embodiment, as with the field surface 70, the background surface 72 may be deformable.

Figure 5:
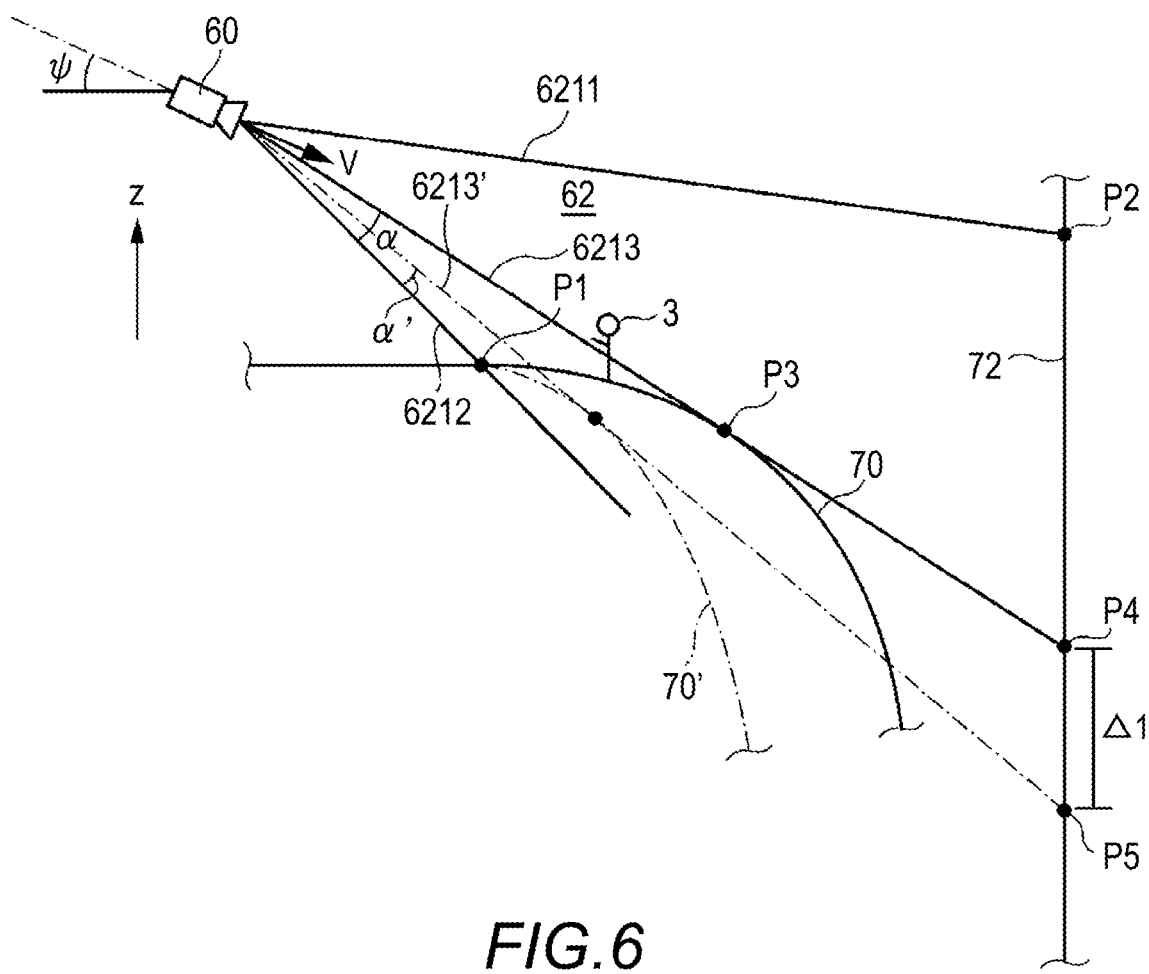
FIG. 5 is an explanatory diagram illustrating various position relationships.
Figure 6:
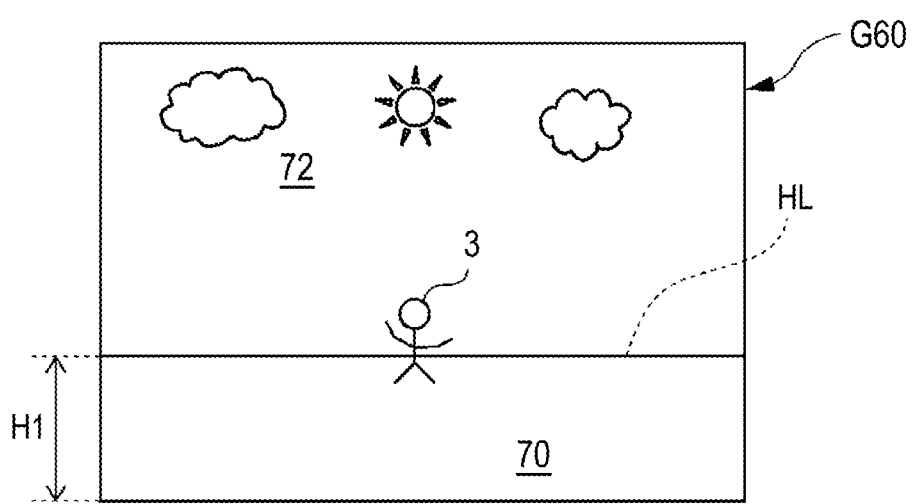
FIG. 6 is a schematic view illustrating an example of the field image obtained by being drawn in an expression viewed from a virtual camera.

FIG. 5 is an explanatory diagram illustrating various position relationships when a plane including a visual line direction V of the virtual camera 60 illustrated in FIG. 4 and the z direction (hereinafter, may be referred to as a "Vz plane") is viewed perpendicularly. In FIG. 5, a first object 3 positioned in the region of the field object within the viewing angle of the virtual camera 60 is schematically illustrated. FIG. 6 is a schematic view illustrating an example of the field image obtained by being drawn in an expression viewed from the virtual camera 60.

In FIG. 5, the viewing angle 62 of the virtual camera 60 (the viewing angle when viewed in a direction perpendicular to the z direction) is schematically illustrated between boundary lines 6211 and 6212. Note that, in this embodiment, the viewing angle of the virtual camera 60 is constant, and in another embodiment, the viewing angle of the virtual camera 60 may be variable.

In the example illustrated in FIG. 5, in the viewing angle 62, the boundary line 6211 on the upper side intersects with the background surface 72 (refer to a point P2), and the boundary line 6212 on the lower side intersects with the field surface 70 (refer to a point P1). In this case, as illustrated in FIG. 6, a field image G60 includes the background surface 72 (and the background object associated therewith) and the field surface 70 (and the field object associated therewith). Note that, in FIG. 5, the first object 3 is positioned in the region of the field object within the viewing angle of the virtual camera 60, and thus, the field image G60 includes the expression of the first object 3.

Here, in this embodiment, as illustrated in FIG. 5, the field surface 70 is subjected to bending deformation such that a virtual horizon line HL (FIG. 6) is expressed by the field surface 70 (and the field object associated therewith). Specifically, the field surface 70 is deformed in a direction toward the lower side as being far away in the visual line direction V (that is, as being directed toward the background surface 72). Note that, such deformation may be attained only within the range of the viewing angle of the virtual camera 60, or may be attained in the entire field surface 70.

In a case where the entire field surface 70 is deformed, the shape of the field surface 70 at the time of being cut in the Vz plane (a shape expressed by the line as illustrated in FIG. 5) may be approximately the same in any sectional position (that is, may be an approximately equal sectional surface). Note that, being approximately the same is the concept of allowing an error within 10%. Note that, as described above, the field object is shaped on the basis of the field surface 70, and thus, the shape of the field object at the time of being cut in the Vz plane is identical to the shape of the field surface 70 at the time of being cut in the Vz plane, but the field object may have a shape slightly different from the shape of the field surface 70 (for example, fine unevenness or the like).

As illustrated in FIG. 5, the horizon line HL in such expression is formed by an intersection point P3 of a tangent line 6213 with respect to the field surface 70 from the virtual camera 60 (a tangent line within the viewing angle 62). Note that, in FIG. 6, the first object 3 is positioned in front of the horizon line HL, and thus, a part of the expression of the horizon line HL is hidden by the first object 3. On the contrary, in a case where the first object 3 is positioned on the deeper side from the horizon line HL (a side close to the background surface 72), a part or all of the first object 3 is hidden by the field object.

Here, a height H1 of the horizon line HL (refer to FIG. 6) depends on an angle α of the tangent line 6213 with respect to the boundary line 6212. The angle α can be changed in accordance with a bending mode of the field surface 70. For example, in the case of a field surface 70' illustrated by a dash-dot-dash line in FIG. 5, an angle α' of a tangent line 6213' with respect to the boundary line 6212 is less than the angle α, and thus, the height H1 of the horizon line HL decreases (not illustrated). As described above, it is found that the height of the horizon line HL can be changed by changing the bending mode of the field surface 70. Note that, in a case where the height of the horizon line HL is changed, the range of the background surface 72 falling within the viewing angle of the virtual camera 60 is also changed in accordance with the change.

As described above, in this embodiment, the field surface 70 is subjected to the bending deformation in a direction toward the lower side as being close to the background surface 72 when viewed in the visual line direction V, and thus, the horizon line HL can be suitably expressed. In addition, the height H1 of the horizon line HL (and a visible range of the field object, the background object, or the like associated therewith) can be freely changed by changing a deformation mode (a deformation degree or the like) of the bending deformation. Hereinafter, the bending deformation in a mode where the field surface 70 is deformed in the direction toward the lower side as being close to the background surface 72 when viewed in the visual line direction V may be simply referred to as "bending deformation of the field surface 70".

Figure 7:
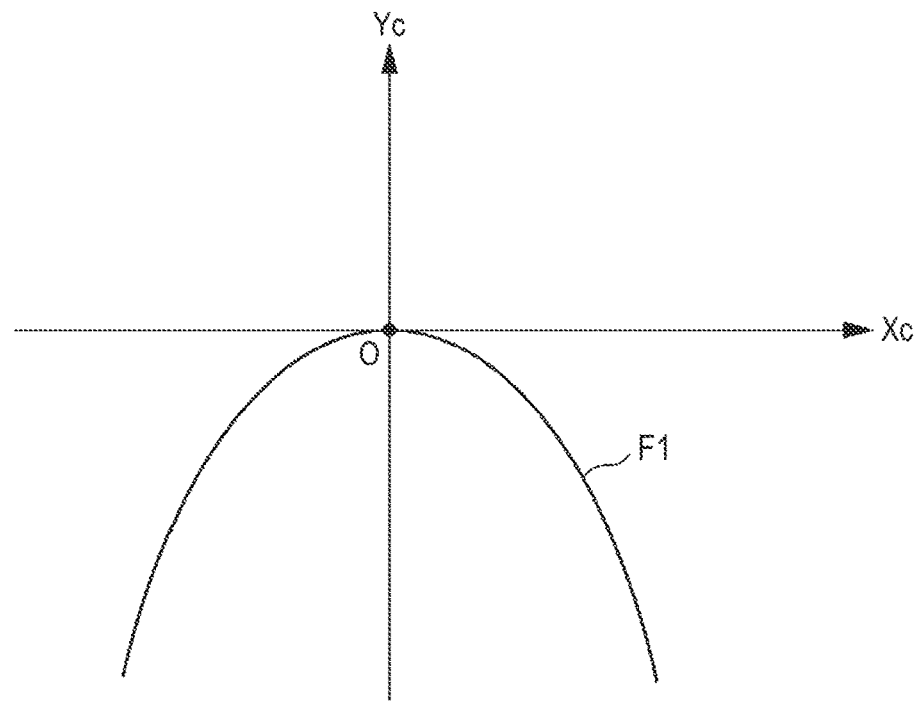
FIG. 7 is an explanatory diagram of an example of a deformation parameter for attaining bending deformation of the field surface.

FIG. 7 is an explanatory diagram of an example of a deformation parameter for attaining the bending deformation of the field surface 70.

In FIG. 7, a two-dimensional coordinate system of Xc and Yc within the Vz plane (hereinafter, may be referred to as a "local coordinate system") is defined. An XcYc plane is a plane parallel to the Vz plane, a Yc axis is an axis parallel to the z axis, and a positive side of the Yc axis corresponds to the upper side of the virtual space. In FIG. 7, a function F1 for setting the deformation mode of the field surface 70 is illustrated.

The function F1 is a function in which the value of a Yc coordinate monotonically decreases non-linearly as an absolute value of the value of an Xc coordinate increases. In addition, the function F1 is symmetrical about the Yc axis. Here, in another embodiment, in the function F1, the value of the Yc coordinate may monotonically decrease linearly as the absolute value of the value of the Xc coordinate increases, and/or the function F1 may be asymmetrical about the Yc axis. In this embodiment, as an example, the function F1 is a quadratic function, and is represented as described below.

$$yc = -A1 \times (xc)^2$$

Here, xc is the value of the Xc coordinate, yc is the value of the Yc coordinate, and A1 is a coefficient for setting the deformation degree (hereinafter, will be referred to as a "deformation parameter A1").

Note that, the function F1 described above is merely an example, and for example, different functions as described below may be used.

When $xc > a$, $yc = -A1 \times (xc-a)^2$
When $xc \leq -a$, $yc = -A1 \times (xc+a)^2$
When $-a \leq xc \leq a$, $yc = 0$ In this case, a is a positive integer, and a flat plane is attained in a range of $-a \leq xc \leq a$.

Alternatively, when $xc > -a1$, $yc = -A1 \times (xc)^2$
When $xc \leq -a1$, $yc = 0$ In this case, a1 may be a positive fixed value, and the position of $xc = -a1$ may be set to be coincident with an intersection point between the boundary line 6212 on the lower side of the viewing angle 62 and the field surface 70 (the point P1 in FIG. 5).

In addition, in another embodiment, a plurality of types of functions may be prepared, and different functions may be selected in accordance with various conditions.

Figure 7A:
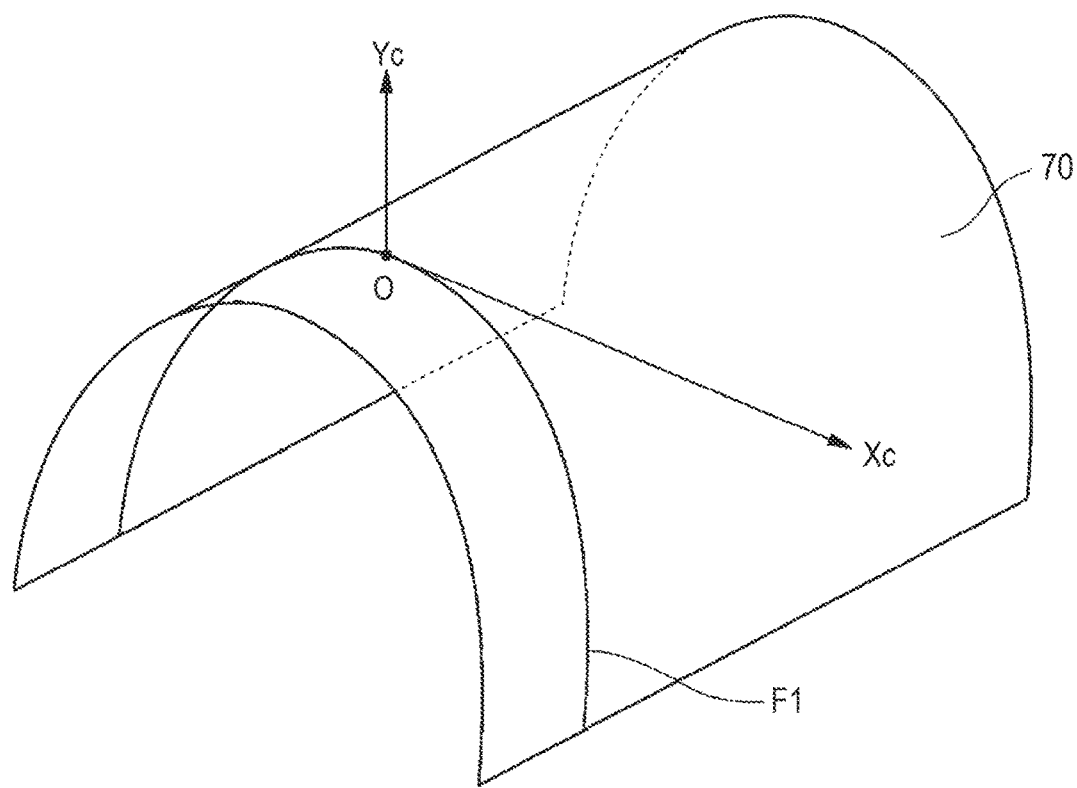
FIG. 7A is an explanatory diagram of the bending deformation of the field surface based on a function.

FIG. 7A is an explanatory diagram of the bending deformation of the field surface 70 based on the function F1.

The field surface 70 is deformed in accordance with the function F1. Accordingly, the deformation degree of the field surface 70 increases as the value of the deformation parameter A1 increases. In FIG. 7A, as described above, the field surface 70 is subjected to the bending deformation with the approximately equal sectional surface.

Here, an example of an applied scene of the bending deformation of the field surface 70 will be described with reference to FIG. 8 to FIG. 8C.

Figure 8:
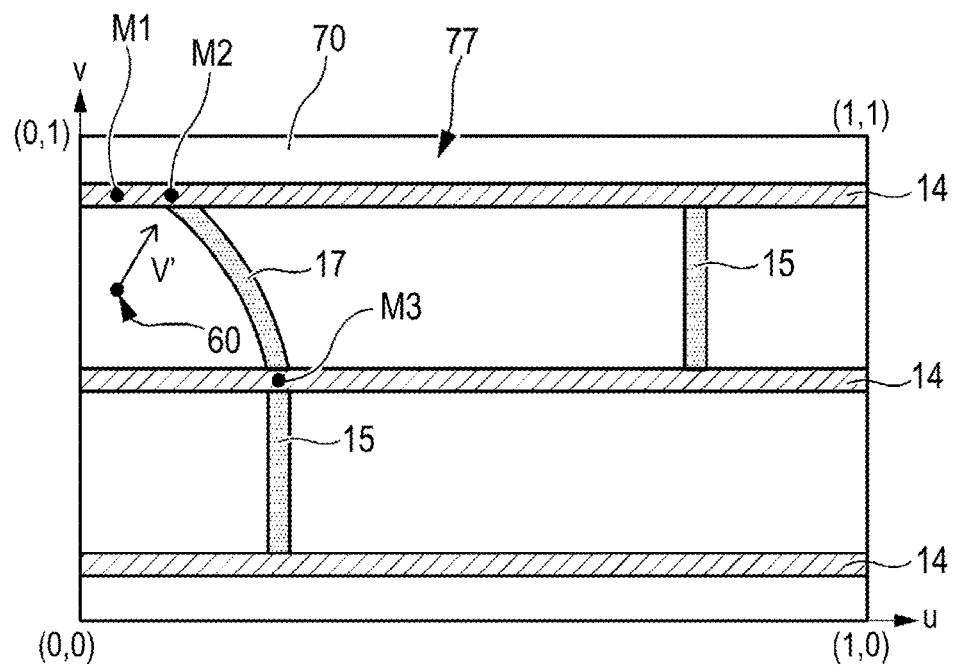
FIG. 8 is an explanatory diagram of an applied scene of the bending deformation of the field surface.
Figure 8A:
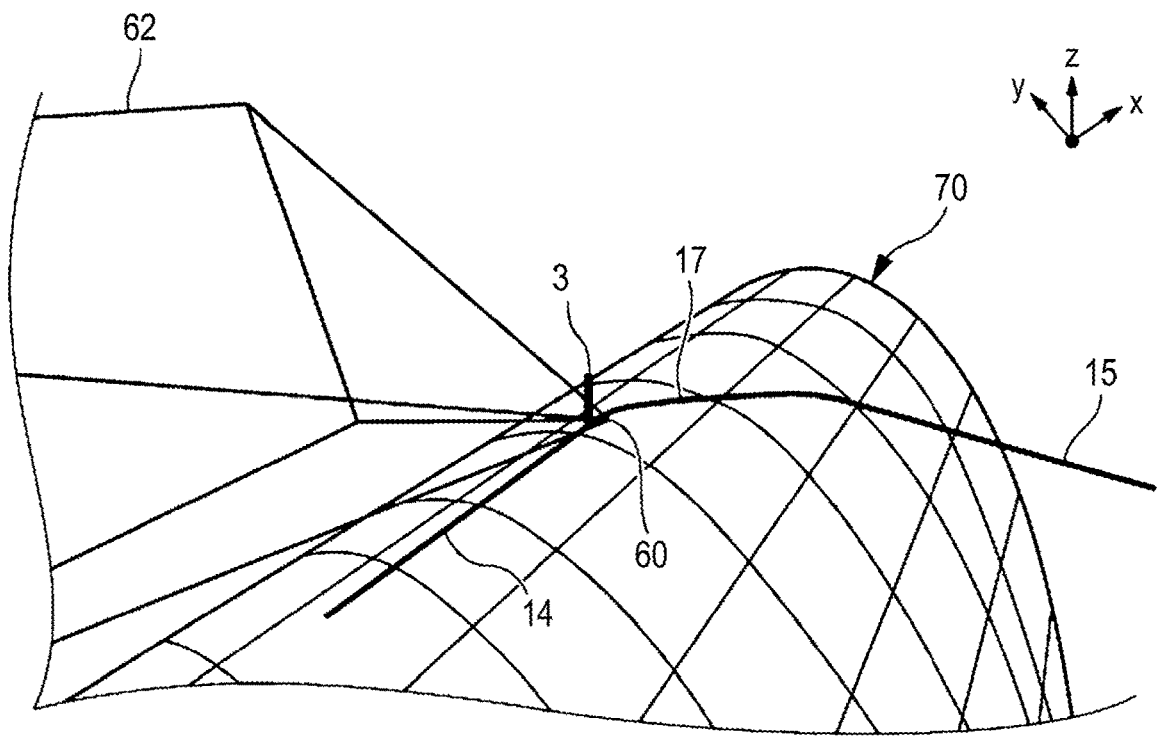
FIG. 8A is an (first) explanatory diagram illustrating a relationship between the virtual camera and the bending deformation of the field surface.
Figure 8B:
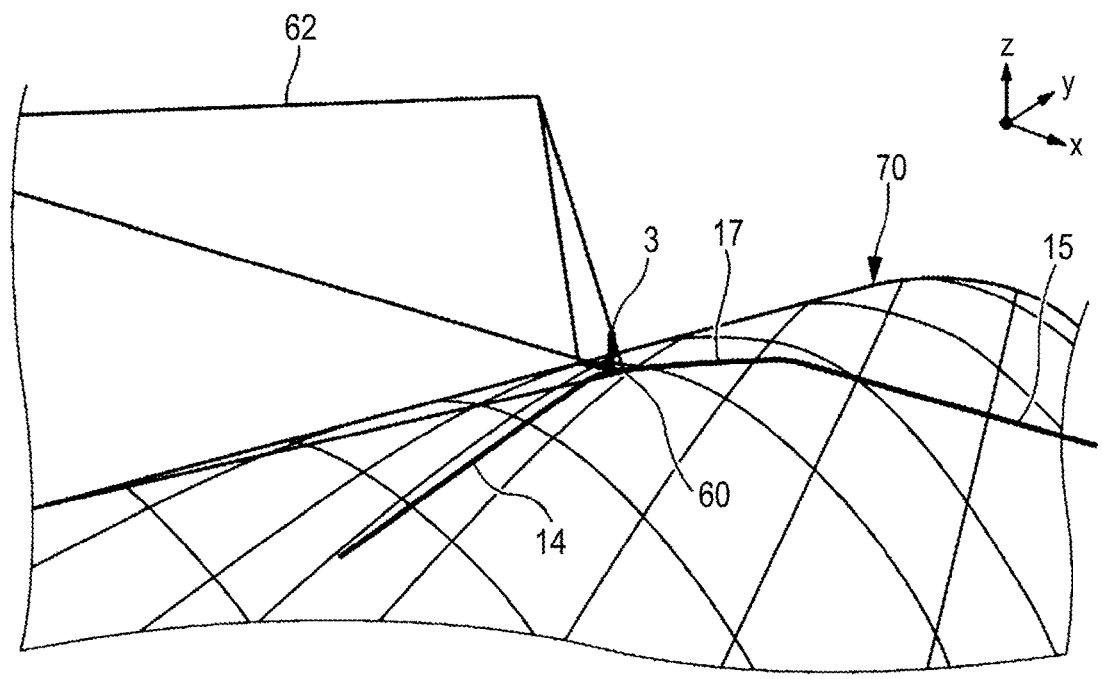
FIG. 8B is an (second) explanatory diagram illustrating the relationship between the virtual camera and the bending deformation of the field surface.
Figure 8C:
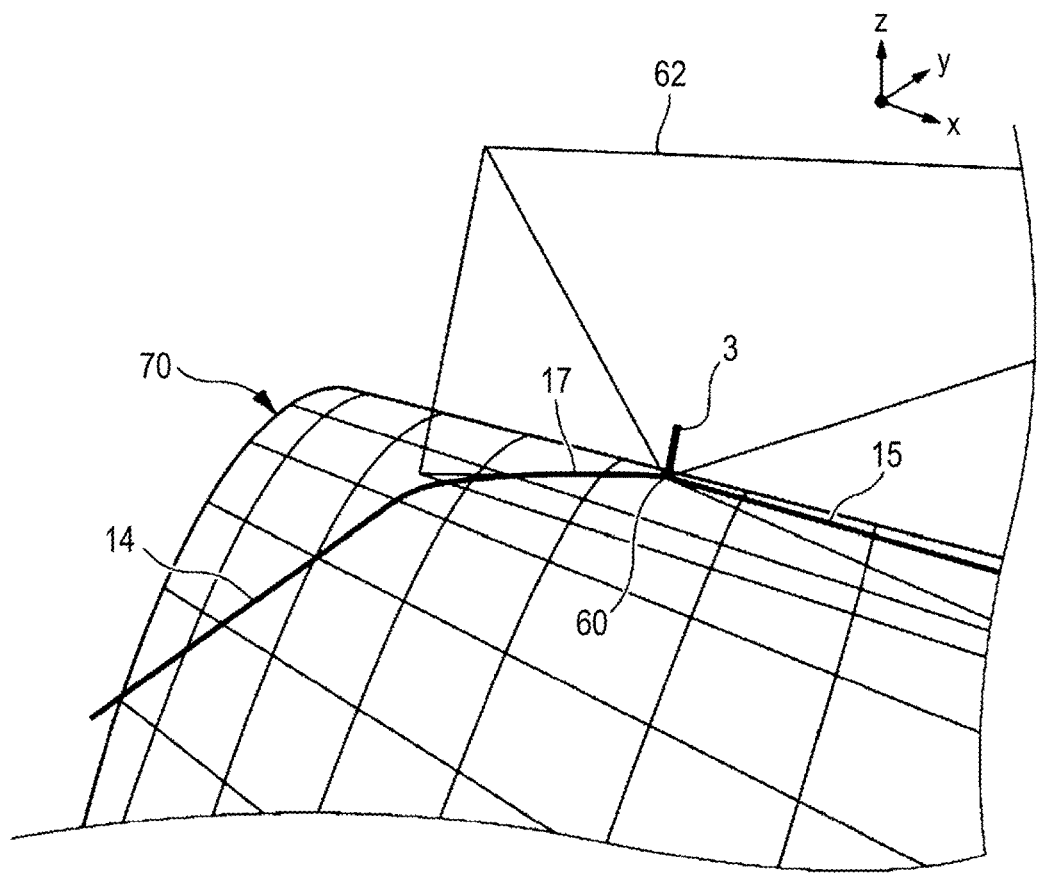
FIG. 8C is an (third) explanatory diagram illustrating the relationship between the virtual camera and the bending deformation of the field surface.

FIG. 8 is a plan view of a field object 77, FIG. 8A is an explanatory diagram of a bending deformation state of the field surface according to a position M1, FIG. 8B is an explanatory diagram of a bending deformation state of the field surface according to a position M2, and FIG. 8C is an explanatory diagram of a bending deformation state of the field surface according to a position M3. In FIG. 8, the field object 77 is illustrated in an expression in which the field image is projected onto the field surface 70 in the regular state. In FIG. 8, the position M1 to the position M3 are exemplified, and the position M2 and the position M3 are in the vicinity of each of a start position and an end position of the curved road 17. Note that, in FIG. 8A to FIG. 8C, for the convenience of drawing, the curved road 17 and the like include a portion separated from the field surface 70 (a portion outside the viewing angle 62 of the virtual camera 60), but the entire curved road 17 and the like may be projected onto the field surface 70.

Here, each of the position M1 and the position M3 corresponds to an intersection point position between the visual line direction V of the virtual camera 60 and the xy plane (or the field surface 70 before being deformed). In FIG. 8, a projection vector V' of the virtual camera 60 (a projection vector V' of the visual line direction V on the xy plane) at the time of the position M2 is illustrated. In addition, the position M1 and the position M3 correspond to the position of the first object 3. That is, the bending deformation of the field surface 70 associated with the movement of the virtual camera 60 when the first object 3 is moved to the position M3 from the position M1 along the curved road 17 will be described.

When the intersection point position between the visual line direction V of the virtual camera 60 and the field surface 70 is positioned in the position M1, the bending deformation of the field surface 70 as illustrated in FIG. 8A is attained. When the intersection point position between the visual line direction V of the virtual camera 60 and the field surface 70 is positioned in the position M2, the bending deformation of the field surface 70 as illustrated in FIG. 8B is attained. When the intersection point position between the visual line direction V of the virtual camera 60 and the field surface 70 is positioned in the position M3, the bending deformation of the field surface 70 as illustrated in FIG. 8C is attained.

As described above, in a case where the visual line direction V of the virtual camera 60 is changed in association with the movement of the first object 3 to the position M3 from the position M1, the bending deformation of the field object 77 according to the changed visual line direction V (bending deformation in the same deformation mode when viewed in the visual line direction V of the virtual camera 60) is attained.

However, in a case where the position of the virtual camera 60 in the virtual space (the position with respect to the field object) is changed, a region within the viewing angle of the virtual camera 60 in the virtual space (for example, the region of the field object) is changed, and thus, the field image can be diversified. Here, even in such a case, when the state of the region within the viewing angle of the virtual camera 60 is monotonous, the field image is not capable of being diversified even in a case where the position of the virtual camera 60 (the position with respect to the field object) is changed. Accordingly, the position of the virtual camera 60 in the virtual space (the position with respect to the field object) can be changed, and the field image can be effectively diversified by increasing the number of second objects arranged on the field object, the type of second object, and the like. Hereinafter, the position of the virtual camera 60 indicates the position with respect to the field object (a relative position), unless otherwise stated.

However, in this embodiment, as described above, the field surface 70 (and the field object associated therewith) is subject to the bending deformation, but in a case where the deformation degree at the time of the bending deformation is perennially constant, the field image obtained by being drawn in an expression viewed from the virtual camera 60 is likely to be monotonous.

Note that, in a case where the position of the virtual camera 60 can be changed, the region of the field object falling within the viewing angle of the virtual camera 60 is changed in association with a change in the position of the virtual camera 60, and thus, in a case where various second objects are arranged on the field object in various modes, the appearance of the first object that is a manipulation target of the user or an overlap condition of a plurality of second objects is changed, and therefore, the field image obtained by being drawn in an expression viewed from the virtual camera 60 can be diversified.

Here, as a merit for diversifying a game field, a part of the game field can be emphasized, the visibility of the user with respect to the object is improved, and the object that is a manipulation target or a manipulation part is clarified, and thus, manipulation properties are improved. In addition, within a limited screen, even in a case where there are a plurality of objects, a situation within the virtual space can be expressed without impairing the visibility (without limiting an information amount). Such an effect is particularly remarkable on a narrow screen such as a smart phone.

In addition, the expression of the horizon line, or the like can be attained by simple processing such as the bending deformation of the field object, and thus, a processing load can also be suppressed. In addition, an (hidden) object out of the viewing angle of the virtual camera 60 in the field object may be not drawn, and thus, the processing load can be suppressed.

At this time, in this embodiment, not only can the position of the virtual camera 60 be changed, but also the deformation degree according to the bending deformation of the field surface 70 (and the field object associated therewith) can be changed. In a case where the deformation degree according to the bending deformation of the field surface 70 (and the field object associated therewith) is changed, the appearance when viewed from the virtual camera 60 is different even in the same region of the field object, and thus, the field image obtained by being drawn in an expression viewed from the virtual camera 60 can be further diversified.

In addition, in this embodiment, the deformation degree according to the bending deformation of the field surface 70 is changed by using one material for the field object (the field image and the field surface 70), and thus, field objects in various forms are attained. Accordingly, the efficiency of a storage region for the field object can be attained, compared to a case where various field objects (a field object in a fixed form that is not deformable) are prepared in advance. That is, the field objects in various forms can be attained by efficiently using the storage region.

Note that, as described above, in a case where the deformation degree of the field surface 70 is changed, the user may feel a sense of discomfort due to a change in the height H1 of the horizon line HL. For example, in a case where the deformation degree of the field surface 70 is changed in a state where the position of the virtual camera 60 is fixed, the user easily feels a sense of discomfort.

Therefore, in this embodiment, in a case where the region of the field object falling within the viewing angle of the virtual camera 60 is changed, in accordance with the change, the deformation degree of the field surface 70 is changed. For example, in a case where the position of the virtual camera 60 is changed, in accordance with the change, the deformation degree of the field surface 70 is changed. Accordingly, a disadvantage that may occur due to a change in the deformation degree of the field surface 70 (that is, a sense of discomfort that can be felt by the user) can be reduced.

For example, in a case where the position of the virtual camera 60 is within one or more specific positions or specific ranges, the deformation degree of the field surface 70 may be greater than that in a case where the position of the virtual camera 60 is not within the specific position or the specific range. Accordingly, the field image when the position of the virtual camera 60 is in the specific position or the specific range (that is, the expression of the various objects within the viewing angle of the virtual camera 60) can be expressed in a mode different from that of the field image at the time of being in another position. For example, an effect of emphasizing the field image according to the specific position, compared to the field image according to another position or of applying specific meaning to the field image according to the specific position can be attained. Note that, the specific position or the specific range, for example, may be set corresponding to a position or the like in which the first object is bent while being moved (for example, a position in which the horizontal passage 14 intersects with the vertical passage 15, illustrated in FIG. 2), or may be set corresponding to a position in which an object to be emphasized (for example, an object according to a game content having a low occurrence probability) is arranged. In this case, for example, the specific position may be a position having a predetermined relationship with respect to the position of the object. In addition, the specific position may be dynamically changed. For example, only in a case where the object according to the game content having a low occurrence probability is arranged, one or more specific positions may include a specific position that is set corresponding to the position in which the object is arranged.

Here, in a case where the position of the virtual camera 60 can be changed, the region of the field object within the viewing angle of the virtual camera 60 is changed, in association with a change in the position of the virtual camera 60. In this case, when various second objects are arranged on the field object in various modes, the appearance of the first object that is a manipulation target of the user or an overlapping condition of a plurality of second objects is changed, and thus, the field image obtained by being drawn in an expression viewed from the virtual camera 60 can be diversified. In addition, even in a case where an overlap (overlapping) occurs between the second object and/or the first object, as described above, the overlapping objects are arranged in positions shifted from each other up and down by adjusting the deformation degree of the field surface 70. Therefore, in the overlapping objects, the visibility of individual objects or one or more focused objects can be increased.

In addition, the field image obtained by being drawn in an expression viewed from the virtual camera 60 is diversified, and thus, a part of such a field image can be emphasized, and the visibility of the user with respect to the object is improved. Further, the object that is a manipulation target or a manipulation part is clarified, and thus, manipulation properties are improved. In addition, within a limited screen, even in a case where there are a plurality of objects, a situation within the virtual space can be expressed without impairing the visibility (without limiting an information amount). Such an effect is particularly remarkable on a narrow screen such as a smart phone.

In addition, the expression of the horizon line, or the like can be attained by simple processing such as the bending deformation of the field object, and thus, the processing load can also be suppressed. In addition, the (hidden) object out of the viewing angle of the virtual camera 60 in the field object may not be drawn, and thus, the processing load can be suppressed.

Figure 9:
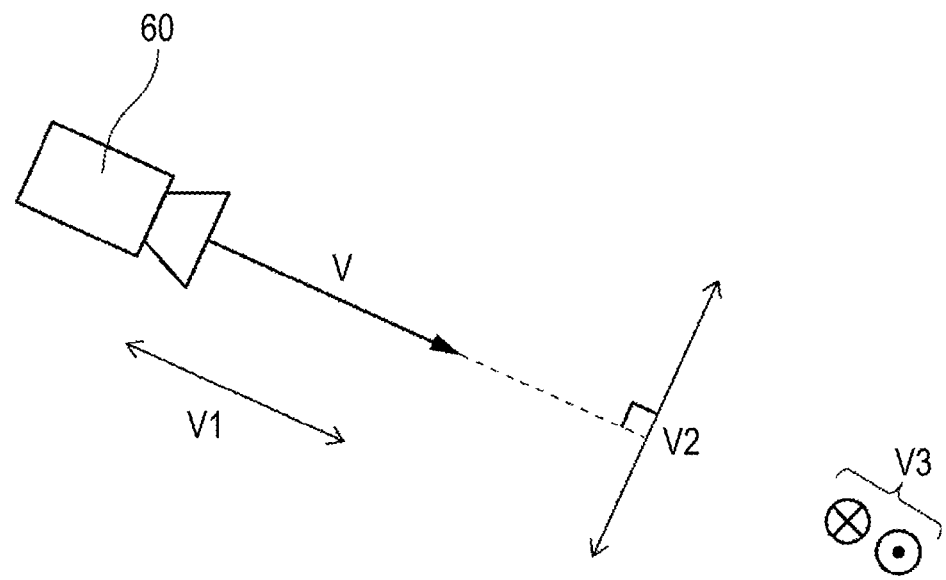
FIG. 9 is an explanatory diagram of a freedom degree of a change in a position of the virtual camera.

FIG. 9 is an explanatory diagram of a freedom degree of a change in the position of the virtual camera 60. As illustrated in FIG. 9, the change in the position of the virtual camera 60 includes a change V1 along the visual line direction V, changes V2 and V3 in a direction intersecting with the visual line direction V, and a combination thereof. The change V2 is a change within the Vz plane, V3 is a change in a direction perpendicular to the Vz plane. Note that, the change in the position of the virtual camera 60 may be attained by the displacement (the movement) of the virtual camera 60 in the global coordinate system, may be attained by the displacement (the movement) of the field object in the global coordinate system, or may be attained by a combination thereof.

As described above, in this embodiment, a mode in which the position (the relative position) of the virtual camera 60 is changed includes a mode in which the position with respect to the field object (the relative position) is changed in the direction (V2 and V3) intersecting with the visual line direction V (hereinafter, will be referred to as a "first change mode") and a mode in which the position with respect to the field object (the relative position) is changed in the direction (V1) along the visual line direction V (hereinafter, will be referred to as a "second change mode").

At this time, a change in the deformation degree of the field surface 70 may be attained in association with any one of the first change mode and the second change mode, or may be attained in association with both of the first change mode and the second change mode. For example, the position of the virtual camera 60 is changed in the direction intersecting with the visual line direction V and is changed along the visual line direction V.

Figure 10:
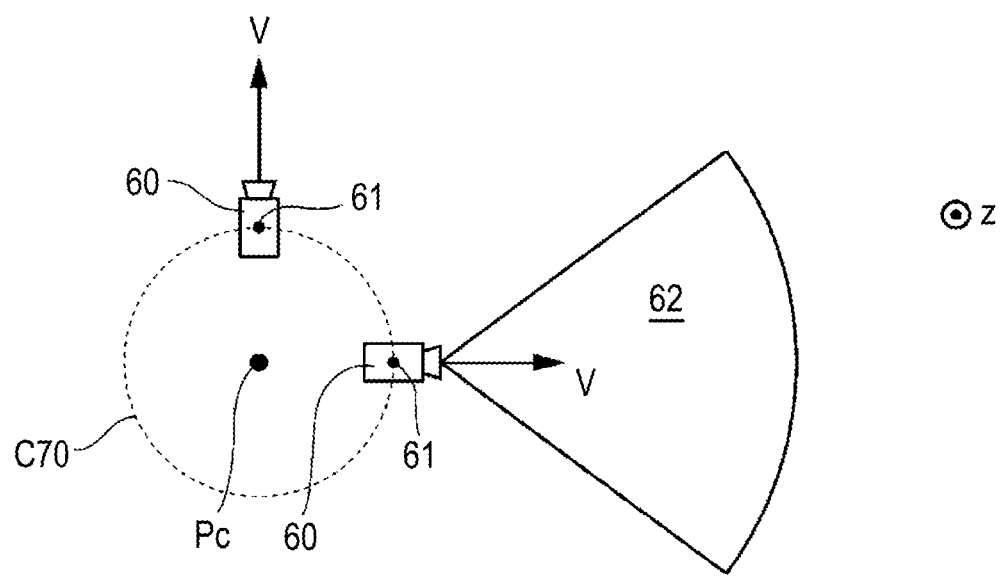
FIG. 10 is an explanatory diagram of a rotation of a visual line direction of the virtual camera.

Note that, a change attained simultaneously when the deformation degree of the field surface 70 is changed (that is, a change in the region of the field object within the viewing angle of the virtual camera 60) is not limited to the change in the position with respect to the field object (the relative position), and may be attained by the rotation of the visual line direction V of the virtual camera 60 (refer to FIG. 10). In addition, an optical parameter of the virtual camera 60 is set to a variable value, and the value of the optical parameter of the virtual camera 60 is changed, and thus, the region of the field object falling within the viewing angle of the virtual camera 60 can be changed. Such an optical parameter, for example, may be an optical parameter relevant to a zoom amount of the virtual camera 60, such as a focal distance or a viewing angle.

In this embodiment, as an example, not only can the position of the virtual camera 60 with respect to the field object (the relative position) be changed, but also the visual line direction V of the virtual camera 60 can be changed. Specifically, the visual line direction V of the virtual camera 60 can be rotated around an axis parallel to the z direction (an example of the third axis) (hereinafter, will be referred to as a "revolution axis Pc"). Note that, the visual line direction V of the virtual camera 60 may be set such that only a rotation rotated around the revolution axis Pc can be performed, or a rotation around another axis (a planetary rotation described below) can also be performed. For example, the visual line direction V of the virtual camera 60 may be set such that a rotation around an axis perpendicular to the Vz plane can be performed. That is, in a mode where an attack angle of the virtual camera 60 (an attack angle parameter ψ described below) is changed, the visual line direction V of the virtual camera 60 may be rotated. In this case, the rotation center may be a position having a predetermined relationship with respect to the position of the virtual camera 60, and the predetermined relationship may be fixed, or may be changed.

Hereinafter, the rotation of the virtual camera 60 indicates a rotation in a mode where the visual line direction V is rotated around the revolution axis Pc, unless otherwise stated. The direction of the virtual camera 60 indicates the direction of the visual line direction V of the virtual camera 60.

FIG. 10 is an explanatory diagram of the rotation (the change) of the visual line direction V of the virtual camera 60, and is a diagram schematically illustrating the virtual camera 60 and the viewing angle 62 viewed in the z direction. In FIG. 10, the virtual camera 60 is schematically illustrated in two positions during the rotation.

In FIG. 10, the revolution axis Pc according to the visual line direction V of the virtual camera 60 passes through the visual line direction V of the virtual camera 60 and is offset to the backward side of the visual line direction V from the virtual camera 60 when viewed in the z direction. In this case, when the virtual camera 60 is rotated by 360 degrees, the virtual camera 60 draws a circular locus C70 around the revolution axis Pc when viewed in the z direction. Here, the position of the revolution axis Pc is arbitrary, and may be a position having a predetermined relationship with respect to the virtual camera 60, and the predetermined relationship may be fixed, or may be changed. Herein, the revolution axis Pc is distinguished from a planetary rotation axis in the case of passing through the virtual camera 60, and thus, is set to be different from the planetary rotation axis.

Note that, in FIG. 10, the visual line direction V is a direction that passes through the revolution axis Pc and is separated from the revolution axis Pc perennially during the rotation of the virtual camera 60 when viewed in the z direction, but is not limited thereto. For example, the visual line direction V may be a direction that passes through the revolution axis Pc and is directed toward the revolution axis Pc perennially during the rotation of the virtual camera 60 when viewed in the z direction. That is, the revolution axis Pc may pass through the visual line direction V of the virtual camera 60 and may be offset to the forward side (the farther side) of the visual line direction V from the virtual camera 60 when viewed in the z direction. In this case, the revolution axis Pc, for example, may be set to pass through a predetermined object that the user wants to see (for example, a predetermined object described below) from all directions. In addition, in another embodiment, the visual line direction V may be subjected to the planetary rotation during the rotation (the revolution) of the virtual camera 60 when viewed in the z direction. That is, the virtual camera 60 may be set such that a rotation around a planetary rotation axis 61 (the axis parallel the z axis (another example of the third axis)) (the planetary rotation) can be performed. Alternatively, the visual line direction V may be set such that the planetary rotation can be performed independently from the revolution.

However, as described above, the horizon line HL is formed by the bending deformation of the field surface 70. Accordingly, in a case where the visual line direction V is changed in association with the rotation of the virtual camera 60, in association with the change, the deformation mode of the bending deformation of the field surface 70 is changed. That is, in a case where the visual line direction V is changed in association with the rotation of the virtual camera 60, in association with the change, the deformation mode of the bending deformation of the field surface 70 is changed such that an Xc axis of the local coordinate system is positioned within the Vz plane based on the visual line direction V after being changed. Accordingly, even in a case where the visual line direction V is changed in association with the rotation of the virtual camera 60, the horizon line HL within the virtual space can be attained in a mode where there is no sense of discomfort.

Next, the further details of a drawing function of the server device 10 will be described with reference to FIG. 11 and the subsequence.

Here, first, a camera parameter used in the description of FIG. 12 and the subsequence will be described, and then, the details of the server device 10 will be described, with reference to FIG. 11.

Figure 11:
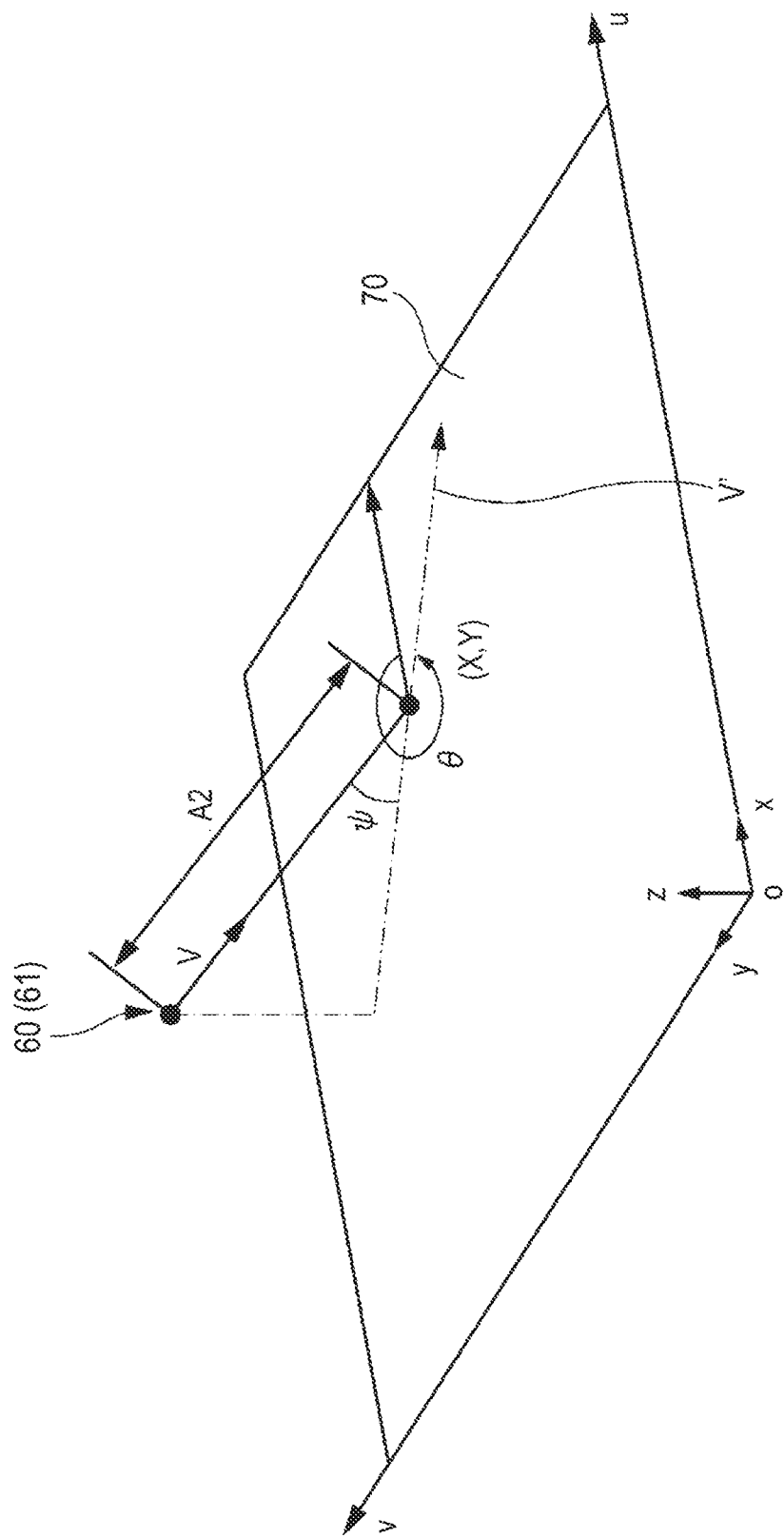
FIG. 11 is an explanatory diagram of a camera parameter.

FIG. 11 is an explanatory diagram of the camera parameter. In FIG. 11, the field surface 70 (the regular state) positioned in the global coordinate system is illustrated. Note that, as described above, the field surface 70 can be subjected to the bending deformation, but the translational movement or the rotation of the entire field surface 70 in the global coordinate system is not capable of being performed. Accordingly, the coordinates of each position of the field surface 70 in the field coordinate system can be converted into the coordinates of the global coordinate system in a predetermined conversion method, and the reverse conversion can also be performed. Note that, hereinafter, for description, the origin of the field coordinate system is identical to the origin of the global coordinate system, the u axis of the field coordinate system (=the u axis of the texture coordinate system) is coincident with the x axis of the global coordinate system, and the v axis of the field coordinate system (=the v axis of the texture coordinate system) is coincident with the y axis of the global coordinate system. Note that, hereinafter, the field surface 70 indicates the field surface 70 in a state where the field image is projected (the field surface 70 of the field object), unless otherwise stated.

In this embodiment, the camera parameter includes two position parameters (X, Y), a distance parameter A2, a direction parameter θ, and an attack angle parameter ψ. In a case where the values of all of the parameters are set, the virtual camera 60 can be uniquely positioned with respect to the global coordinate system.

The position parameter X is an x coordinate of an intersection point on the xy plane of the visual line direction V, a position parameter Y is a y coordinate of the intersection point on the xy plane of the visual line direction V, and the distance parameter A2 is a distance to the virtual camera 60 from the intersection point on the xy plane of the visual line direction V (a distance along the visual line direction V). The direction parameter θ is an angle between a projection vector V' of the visual line direction V on the xy plane and the x axis. The attack angle parameter ψ is an angle between the visual line direction V and the xy plane. Note that, in this embodiment, the attack angle parameter ψ is used, but the attack angle parameter ψ may be omitted. That is, the attack angle parameter ψ may have a constant value (a fixed value).

Note that, such camera parameters are used in the following description, and in the actual processing, different parameters may be equivalently used.

Figure 12:
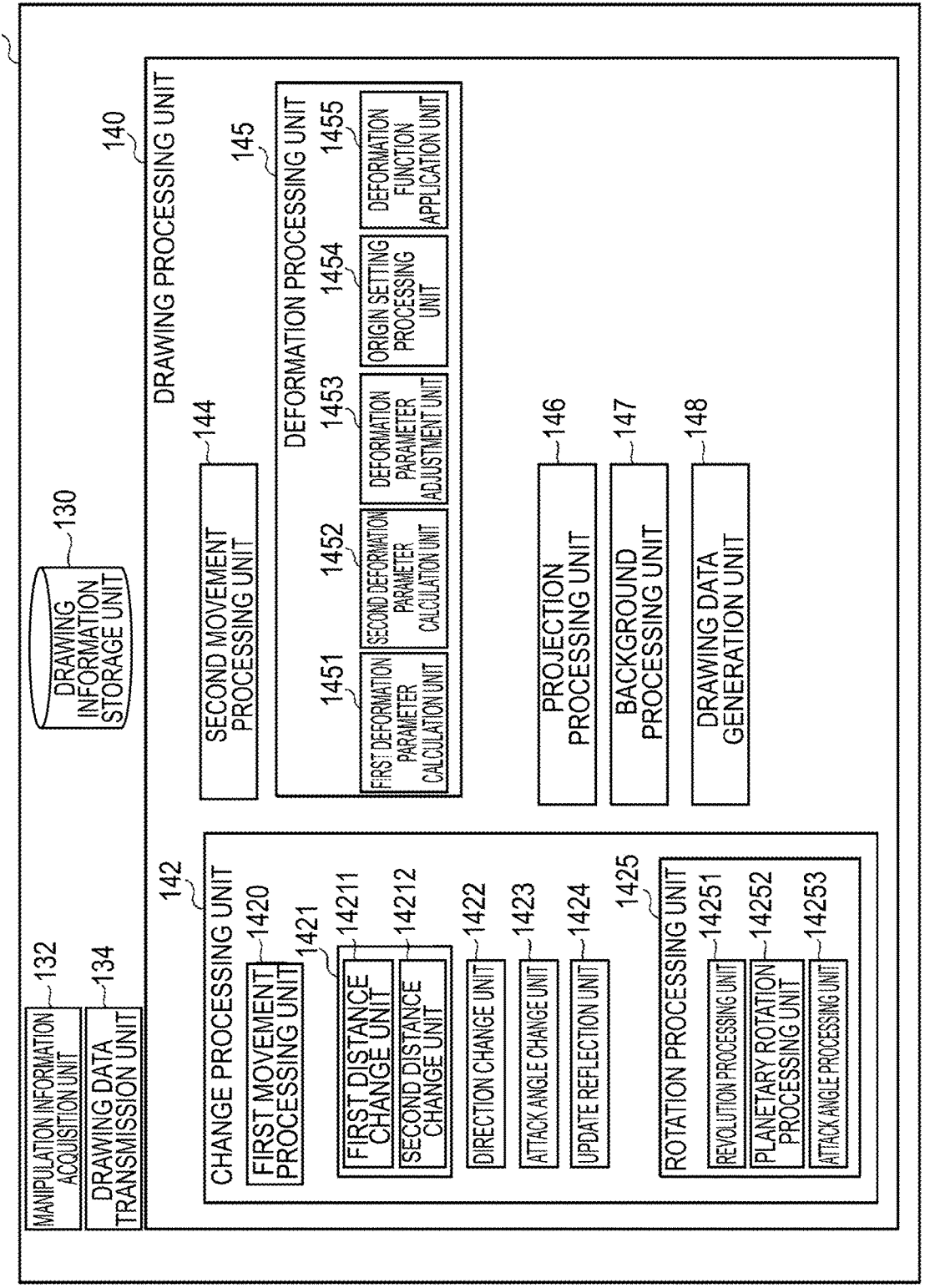
FIG. 12 is an example of a functional block diagram relevant to a drawing function of a server device.

FIG. 12 is an example of a functional block diagram relevant to the drawing function of the server device 10. FIG. 13 is an explanatory diagram of deformation parameter data. Note that, in FIG. 13, "-" indicates that it is arbitrary, and " . . . " indicates the repetition of the same. FIG. 14 is an explanatory diagram of distance parameter data. Similarly, in FIG. 14 (the same applies to FIG. 15), " . . . " indicates the repetition of the same. FIG. 15 is an explanatory diagram of direction parameter data.

The server device 10 includes a drawing information storage unit 130, a manipulation information retrival unit 132, a drawing data transmission unit 134, and a drawing processing unit 140. Note that, the drawing information storage unit 130 can be attained by the server storage unit 12 illustrated in FIG. 1, the manipulation information retrieval unit 132 and the drawing data transmission unit 134 can be attained by the server communication unit 11 illustrated in FIG. 1, and the drawing processing unit 140 can be attained by the server control unit 13 illustrated in FIG. 1. Hereinafter, in the processing of each unit, "calculation" is the concept including processing of only reading out a calculation value, a setting value, or the like stored as data.

In the drawing information storage unit 130, various information items and data items used by the drawing processing unit 140 are stored.

The data stored in the drawing information storage unit 130 includes deformation parameter data 13A according to the specific position described above. Hereinafter, the specific position is a position in which a predetermined object described below can be positioned. That is, the specific position is a position that can be coincident with the position of the predetermined object described below.

In the deformation parameter data 13A, the value of the deformation parameter A1 that is different from a normal value $\beta_0$ is associated with each of the values of the position parameters (X, Y) of the virtual camera 60 according to the specific position described above. Note that, the normal value $\beta_0$ of the deformation parameter A1 is a constant value, but in a case where a plurality of types of field images G60 are prepared, the normal value $\beta_0$ may be a variable value that can be different for each field image. In addition, the value of the direction parameter θ may be further associated with the position parameters (X, Y) of the virtual camera 60 according to the specific position. For example, in the example illustrated in FIG. 13, the value of the deformation parameter A1 according to the value of the direction parameter θ is associated with each of the values (X, Y) ($X_A$, $Y_A$), ($X_B$, $Y_B$), ($X_C$, $Y_C$), and the like of the position parameters according to the specific position, for each specific position. For example, in the deformation parameter data 13A of FIG. 13, in a specific position A=($X_A$, $Y_A$), even in a case where the direction of the virtual camera 60 is any direction, a value $\beta_1$ of the deformation parameter A1 is associated. On the other hand, in a specific position C=($X_C$, $Y_C$), when the direction of the virtual camera 60 is a direction parameter θ=$\theta_{C1}$, a value $\beta_3$ of the deformation parameter A1 is associated, and when the direction of the virtual camera 60 is a direction parameter θ=$\theta_{C2}$, a value $\beta_4$ of the deformation parameter A1 is associated. Hereinafter, as with the specific position C, a specific position in which the value of the deformation parameter A1 is changed in accordance with the direction of the virtual camera 60 may be referred to as a "specific position in which the deformation degree is changed during the revolution of the virtual camera 60", and on the deformation parameter data 13A, a direction in which a value different from the normal value $\beta_0$, such as the value $\beta_3$ or the value $\beta_4$, is associated (a direction in which the direction parameter $\theta=\theta_{C1}$ or $\theta_{C2}$) will be referred to as a "specific direction". The specific direction is fixed, but may be changed. Note that, in another embodiment, the specific position in which the deformation degree is changed during the revolution of the virtual camera 60 may not be set. In addition, in the specific position C, two specific directions are set, but only one specific direction may be set, or three or more specific directions may be set.

In addition, the data stored in the drawing information storage unit 130 includes deformation parameter data 13B according to the specific object. In the deformation parameter data 13B, the value of the deformation parameter A1 that is different from the normal value $\beta_0$ is associated with the specific object. The specific object is an arbitrary object different from the predetermined object described below. For example, it is preferable that the specific object is an object that the user is allowed to watch, in the second objects. For example, the specific object may be an object according to a moving object (for example, a character), or may be an object according to a fixed object. In the deformation parameter data 13B of FIG. 13, in a specific object G1, a value $\beta_{G1}$ of the deformation parameter A1 is associated, and in a specific object G2, a value $\beta_{G2}$ of the deformation parameter A1 is associated. On the other hand, in a specific object G3, when the direction of the virtual camera 60 is a direction parameter $\theta=\theta_{C3}$, a value $\beta_{G3}$ of the deformation parameter A1 is associated, and when the direction of the virtual camera 60 is a direction parameter $\theta=\theta_{C4}$, a value $\beta_{G4}$ of the deformation parameter A1 is associated. As with the case of the deformation parameter data 13A, hereinafter, as with the specific object G3, a specific object in which the value of the deformation parameter A1 is changed in accordance with the direction of the virtual camera 60 may be referred to as a "specific object in which the deformation degree is changed during the revolution of the virtual camera 60", and on the deformation parameter data 13B, a direction in which a value different from the normal value $\beta_0$, such as the value $\beta_{G3}$ or the value $\beta_{G4}$, is associated (a direction in which the direction parameter $\theta=\theta_{C3}$ or $\theta_{C4}$) will be referred to as a "specific direction". The specific direction is fixed, but may be changed. For example, in a case where the specific object G3 has a front direction, the specific direction may be changed in accordance with a change in the front direction of the specific object G3.

In addition, the data stored in the drawing information storage unit 130 includes distance parameter data 14A according to the specific position described above. In the distance parameter data 14A, the value of the distance parameter A2 that is different from a normal value $\gamma_0$ is associated with each of the values of the position parameters (X, Y) of the virtual camera 60 according to the specific position. Note that, the normal value $\gamma_0$ of the distance parameter A2 is a constant value, but in a case where there are a plurality of types of field images G60 are prepared, the normal value $\gamma_0$ may be a variable value that can be different for each field image. The value of the distance parameter A2 according to the specific position of one virtual camera 60 may be set such that the corresponding region (and an object positioned within the region) is captured by the virtual camera 60 positioned in the specific position with a desired distance sense. For example, in the case of allowing the user to see a specific second object at a close distance, the value of the distance parameter A2 in which the specific second object is captured by the virtual camera 60 at the close distance may be associated with each of the values of the position parameters (X, Y) according to the specific position.

For example, in FIG. 14, in a specific position $A=(X_A, Y_A)$, a value $\gamma_1$ of the distance parameter A2 is associated, and in a specific position $B=(X_B, Y_B)$, a value $\gamma_2$ of the distance parameter A2 is associated, and the same applies to the followings. Note that, in this embodiment, as an example, the value of the distance parameter A2 that is defined by the distance parameter data 14A, such as the value $\gamma_1$ or the value $\gamma_2$, is significantly less than the normal value $\gamma_0$. Note that, a distance between the virtual camera 60 and the field object decreases as the value of the distance parameter A2 decreases.

In addition, the data stored in the drawing information storage unit 130 includes distance parameter data 14B according to the specific object. In the distance parameter data 14B, the value of the distance parameter A2 that is less than the normal value $\gamma_0$ is associated with each specific object. In the distance parameter data 14B of FIG. 14, in the specific object G1, a value $\gamma_{G1}$ of the distance parameter A2 is associated, and in the specific object G2, a value $\gamma_{G2}$ of the distance parameter A2 is associated.

Note that, in this embodiment, in the distance parameter data 14A according to the specific position, a specific position in which the value of the distance parameter A2 is changed in accordance with the value of the direction parameter $\theta$ is not defined, but as with the deformation parameter data 13A described above, a specific position in which the value of the distance parameter A2 is changed in accordance with the value of the direction parameter $\theta$ may be defined. That is, a specific position in which the value of the distance parameter A2 is changed during the revolution of the virtual camera 60 may be defined. In this case, preferably, in the specific position in which the deformation degree is changed during the revolution of the virtual camera 60, the value of the distance parameter A2 is associated with the specific direction according to the specific position. For example, in the specific position $C=(X_C, Y_C)$, when the direction of the virtual camera 60 is the direction parameter $\theta=\theta_{C1}$, a value $\gamma_{31}$ of the distance parameter A2 may be associated, and when the direction of the virtual camera 60 is the direction parameter $\theta=\theta_{C2}$, a value $\gamma_{32}$ of the distance parameter A2 may be associated. Accordingly, when a bending deformation degree is changed during the revolution of the virtual camera 60, the value of the distance parameter A2 can be changed.

In addition, similarly, in this embodiment, in the distance parameter data 14B according to the specific object, the specific object in which the value of the distance parameter A2 is changed in accordance with the value of the direction parameter $\theta$ is not defined, but as with the deformation parameter data 13B described above, the specific object in which the value of the distance parameter A2 is changed in accordance with the value of the direction parameter $\theta$ may be defined. That is, the specific object in which the value of the distance parameter A2 is changed during the revolution of the virtual camera 60 may be defined. Even in this case, preferably, in the specific object which the deformation degree is changed during the revolution of the virtual camera 60, the value of the distance parameter A2 is associated with the specific direction according to the specific object. For example, in the specific object G3, when the direction of the virtual camera 60 is the direction parameter $\theta=\theta_{C3}$, a value $\gamma_{G31}$ of the distance parameter A2 may be associated, when the direction of the virtual camera 60 is the direction parameter $\theta=\theta_{C4}$, a value $\gamma_{G32}$ of the distance parameter A2 may be associated. Accordingly, when the bending deformation degree is changed during the revolution of the virtual camera 60, the value of the distance parameter A2 can be changed.

In addition, the data stored in the drawing information storage unit 130 includes the direction parameter data. In the direction parameter data, the value of the direction parameter θ is associated with each of the values of the position parameters (X, Y) of the virtual camera 60 according to a direction change position. The value of the direction parameter θ according to the position of one virtual camera 60 may be set such that a desired region falls within the viewing angle of the virtual camera 60 of the position. For example, in the case of allowing the user to see a specific second object, the value of the direction parameter θ may be associated with each of the values of the position parameters (X, Y) according to the position such that the specific second object is positioned in the region falling within the viewing angle. The direction change position, for example, may be set corresponding to a position and the like in which the direction of the first object is changed while the first object is moved (for example, a start position and an end position of the curved road 17 illustrated in FIG. 2, an intersecting position between the horizontal passage 14 and the vertical passage 15, and the like). For example, in FIG. 15, in a direction change position T1 ($X_{P1}$, $Y_{P1}$), a value $θ_1$ of the direction parameter θ is associated, in a direction change position T2 ($X_{P2}$, $Y_{P2}$), a value $θ_2$ of the direction parameter θ is associated, and the same applies to the followings. As with the specific positions A and B, the direction change positions T1 and T2 may be a position in which the value of the deformation parameter A1 that is different from the normal value $β_0$ is associated, and/or may be a position in which the value of the distance parameter A2 that is different from the normal value $γ_0$ is associated.

In addition, the data stored in the drawing information storage unit 130 includes attack angle parameter data. In the attack angle parameter data, even though it is not illustrated, as with the direction parameter data, the value of the attack angle parameter ψ may be associated with each of the values of the position parameters (X, Y) of the virtual camera 60 according to an attack angle change position. The value of the attack angle parameter ψ according to the position of one virtual camera 60 may be set such that a desired region falls within the viewing angle of the virtual camera 60 of the position. For example, in the case of allowing the user to see a specific second object, the value of the attack angle parameter ψ may be associated with each of the values of the position parameters (X, Y) according to the position such that the specific second object is positioned in the region falling within the viewing angle.

Note that, it is not necessary that the data stored in the drawing information storage unit 130 is managed in segmentations as illustrated in FIG. 13, FIG. 14, and FIG. 15, and the data may be suitably integrally managed.

The manipulation information retrieval unit 132 retrieves the manipulation information of the user. Note that, the manipulation information of the user is generated in accordance with various manipulations of the user in the terminal device 20. Note that, the manipulation information may be generated by a gesture, voice input, or the like. In this embodiment, the manipulation information includes a movement instruction of a predetermined object, and a rotation instruction of the virtual camera 60. The movement instruction of the predetermined object is an instruction for changing the position of the predetermined object with respect to the field object (hereinafter, may be simply referred to as the "position of the predetermined object"), and may include an instruction such as a movement direction or a movement amount. The rotation instruction of the virtual camera 60 is an instruction for attaining the rotation of the virtual camera 60 described above, and may include an instruction such as a rotation type (the rotation around the revolution axis Pc, that is, the revolution, the rotation around the planetary rotation axis 61, that is, the planetary rotation, or the rotation in which the value of the attack angle parameter ψ is changed), or a rotation direction. The predetermined object is arbitrary, and in this embodiment, preferably, is the first object. In addition, the manipulation information may include a movement instruction of the virtual camera 60, and the like.

The drawing data transmission unit 134 transmits field image drawing data that is generated by the drawing processing unit 140 to the terminal device 20. Note that, as described above, in another embodiment, a part or all of the drawing processing of the drawing processing unit 140 may be attained on the terminal device 20 side. For example, in a case where the drawing processing unit 140 is attained by the terminal device 20, the drawing data transmission unit 134 may be omitted.

The drawing processing unit 140 generates the field image drawing data, on the basis of various data items in the drawing information storage unit 130, the manipulation information from the terminal device 20, or the like.

The drawing processing unit 140 includes a change processing unit 142, a second movement processing unit 144, a deformation processing unit 145, a projection processing unit 146, a background processing unit 147, and a drawing data generation unit 148.

The change processing unit 142 changes the region of the field object falling within the viewing angle of the virtual camera 60, in accordance with the manipulation information and the like. For example, in a case where each of the values of the position parameters (X, Y) of the virtual camera 60 is changed, and each of the values of the position parameters (X, Y) is changed, the change processing unit 142 executes various processings according to the change.

In this embodiment, a specific object is arranged on a field object 77, and thus, in a case where the range of the field object falling within the viewing angle of the virtual camera 60 is changed, the specific object may be positioned within the region. In other words, the region of the field object falling within the viewing angle 62 of the virtual camera 60 substantially has all possible combinations of the values of the camera parameters, and among them, in a case where there is a region in which the specific object is positioned (hereinafter, may be referred to as a "specific object region"), there are a region around the specific object region (an example of a predetermined object region) and the like. In addition, in this embodiment, the value of the camera parameter can be changed by comparatively small resolution, and thus, the specific object region includes a first object region in which the specific object is positioned in the center portion, and a second object region in which the specific object is positioned in the end portion.

Here, the specific object and the like will be described with reference to FIG. 11A. In FIG. 11A, regions R1, R2, and R3 of the field object 77 falling within the viewing angle 62 of the virtual camera 60, respectively, at the time of three types of camera parameters different from each other (here, camera parameters 1, 2, and 3) are illustrated. In the camera parameters 1, 2, and 3, at least one value of each element (X, Y, A2, θ, and ψ) of the camera parameter described above is different. Accordingly, three regions illustrated in FIG. 11A are regions different from each other. Then, in three regions R1, R2, and R3 illustrated in FIG. 11A, in the regions R1 and R3, specific objects G5 and G7 are arranged. Accordingly, in this case, the regions R1 and R3 are an example of the specific object region. On the other hand, in the region R2, the specific object is not arranged. Accordingly, in this case, the region R2 is an example of the predetermined object region in which the specific object is not positioned. Note that, in a case where the specific object is a moving object, a region that was the specific object region at one time point may not be the specific object region at another time point. For example, in the case of the region R2, when a specific object G6 that was positioned out of the viewing angle 62 at the time point is moved and is in a state of being positioned in the region R2, the region R2 is the specific object region.

The change processing unit 142 includes a first movement processing unit 1420, a distance change unit 1421, a direction change unit 1422, an attack angle change unit 1423, an update reflection unit 1424, and a rotation processing unit 1425.

In a case where a predetermined first movement condition is established, the first movement processing unit 1420 updates each of the values of the position parameters (X, Y) of the virtual camera 60. The predetermined first movement condition is arbitrary, and for example, may be satisfied by the movement of the predetermined object based on the movement instruction of the predetermined object in the manipulation information, or may be satisfied on the basis of a progress situation of the game or other factors.

The distance change unit 1421 associates the value of the distance parameter A2 with each of the values of the position parameters (X, Y) after being updated. In this embodiment, the distance change unit 1421 calculates the value of the distance parameter A2 associated with each of the values of the position parameters (X, Y) after being updated, with reference to the distance parameter data in the drawing information storage unit 130. At this time, on the distance parameter data 14A, in a case where the value of the distance parameter A2 is not associated with each of the values of the position parameters (X, Y) after being updated, an interpolation value may be associated with each of the values of the position parameters (X, Y) after being updated. An example of a calculation method of the interpolation value will be described below. Note that, in another embodiment, on the distance parameter data, in a case where the value of the distance parameter A2 is not associated with each of the values of the position parameters (X, Y) after being updated, the distance change unit 1421 may associate the normal value $\gamma_0$ as it is, instead of the interpolation value.

The distance change unit 1421 includes a first distance change unit 14211 and a second distance change unit 14212. Note that, unlike the example illustrated in FIG. 14, in another embodiment in which the specific position is not set, the first distance change unit 14211 may be omitted.

The first distance change unit 14211 calculates the value of the distance parameter A2, on the basis of a relationship between position of the virtual camera 60 and the specific position (first distance parameter calculation processing). In this embodiment, the first distance change unit 14211 calculates the value of the distance parameter A2, on the basis of the position of the virtual camera 60, with reference to distance parameter data 14A according to the specific position as described above with reference to FIG. 14. An example of the first distance parameter calculation processing of the first distance change unit 14211 will be described below, with reference to FIG. 17.

The second distance change unit 14212 associates the value of the distance parameter A2 associated with the specific object with each of the values of the position parameters (X, Y) after being updated (second distance parameter calculation processing). In this embodiment, in a case where the specific object is positioned in the region of the field object falling within the viewing angle 62 of the virtual camera 60, the second distance change unit 14212 calculates the value of the distance parameter A2, on the basis of the specific object positioned in the region of the field object falling within the viewing angle of the virtual camera 60, with reference to the distance parameter data 14B according to the specific position as described above with reference to FIG. 14.

In addition, in a case where the specific object is positioned in the region of the field object falling within the viewing angle of the virtual camera 60, the second distance change unit 14212 may calculate the value of the distance parameter A2, in accordance with the position of the specific object in the region. In this case, in the region of the field object falling within the viewing angle of the virtual camera 60, the second distance change unit 14212 may change the value of the distance parameter A2 in a case where the specific object is positioned in the center portion of the region and in a case where the specific object is positioned in the end portions on both sides of the region. Specifically, in the region of the field object falling within the viewing angle of the virtual camera 60, the second distance change unit 14212 may decrease the value of the distance parameter A2 in a case where the specific object is positioned in the center portion of the region and in a case where the specific object is positioned in the end portions on both sides of the region. Accordingly, when the specific object is positioned in the vicinity of the center within the viewing angle of the virtual camera 60, the specific object can be effectively emphasized. Note that, in the region of the field object falling within the viewing angle of the virtual camera 60, the center portion, for example, may be a portion of a range 771 within a distance L0 having a center line CT as the center, in the specific object region on the upper side of FIG. 11A. In this case, the distance L0 is arbitrary insofar as the distance L0 is significantly less than a distance L1 of the entire specific object region, and for example, may be approximately L1/2. In this case, portions according to ranges 772 and 773 on both sides of the range 771 correspond to the end portions of the center portion of the region. An example of the second distance parameter calculation processing will be described below, with reference to FIG. 27.

The direction change unit 1422 associates the value of the direction parameter θ with each of the values of the position parameters (X, Y) after being updated. In this embodiment, the direction change unit 1422 calculates the value of the direction parameter θ according to each of the values of the position parameters (X, Y), with reference to the direction parameter data in the drawing information storage unit 130. At this time, on the direction parameter data, in a case where the value of the direction parameter θ is not associated with each of the values of the position parameters (X, Y) after being updated, the direction change unit 1422 may calculate an interpolation value. An example of a calculation method of the interpolation value will be described below. Then, the direction change unit 1422 associates the calculated value of the direction parameter θ with each of the values of the position parameters (X, Y) after being updated. Note that, in another embodiment, on the direction parameter data, in a case where the value of the direction parameter θ is not associated with each of the values of the position parameters (X, Y) after being updated, the direction change unit 1422 associate the normal value $\theta_0$ as it is. The normal value $\theta_0$ may set such that the visual line direction V is at a right angle with respect to the movement direction of the predetermined object when viewed in the z direction.

The attack angle change unit 1423 associates the value of the attack angle parameter $\psi$ with each of the values of the position parameters (X, Y) after being updated. In this embodiment, the attack angle change unit 1423 calculates the value of the attack angle parameter $\psi$ according to each of the values of the position parameters (X, Y), with reference to the attack angle parameter data in the drawing information storage unit 130. At this time, on the attack angle parameter data, in a case where the value of the attack angle parameter $\psi$ is not associated with each of the values of the position parameters (X, Y) after being updated, the attack angle change unit 1423 may calculate an interpolation value. An example of a calculation method of the interpolation value will be described below. Then, attack angle change unit 1423 associates the calculated value of the attack angle parameter $\psi$ with each of the values of the position parameters (X, Y) after being changed. Note that, in another embodiment, on the attack angle parameter data, in a case where the value of the attack angle parameter $\psi$ is not associated with each of the values of the position parameters (X, Y) after being updated, the attack angle change unit 1423 may associate the normal value $\psi_0$ as it is.

The update reflection unit 1424 positions the virtual camera 60 with respect to the global coordinate system, on the basis of each of the values of the position parameters (X, Y) after being updated, and various parameters associated with each of the values of the position parameters (X, Y) after being updated (the distance parameter A2, the direction parameter $\theta$, and the attack angle parameter $\psi$). Accordingly, the virtual camera 60 is positioned with respect to the field surface 70 (and the field object associated therewith).

In a case where a predetermined rotation condition is established, the rotation processing unit 1425 executes rotation processing of the virtual camera 60. The predetermined rotation condition, for example, may be determined on the basis of the manipulation information (the rotation instruction of the virtual camera 60), or may be satisfied on the basis of the progress situation of the game or other factors.

The rotation processing unit 1425 may include a revolution processing unit 14251, a planetary rotation processing unit 14252, and an attack angle processing unit 14253. Note that, in another embodiment, a part or all of the revolution processing unit 14251, the planetary rotation processing unit 14252, and the attack angle processing unit 14253 may be omitted.

The revolution processing unit 14251 attains the rotation of the visual line direction V around the revolution axis Pc separated from the virtual camera 60 (refer to FIG. 10). Note that, the revolution processing unit 14251 may suitably set the position of the revolution axis Pc, in accordance with the position of the virtual camera 60, the position of the predetermined object, or the like.

The planetary rotation processing unit 14252 attains the rotation of the visual line direction V around the planetary rotation axis 61 that is the axis parallel to the z direction passing through the virtual camera 60 (refer to FIG. 10).

The attack angle processing unit 14253 attains a change in the attack angle parameter $\psi$ (refer to FIG. 5) that is an angle between the visual line direction V of the virtual camera 60 and the xy plane (that is, a rotation around an axis that is perpendicular to the Vz plane passing through the virtual camera 60).

Note that, in one processing cycle, two or more processing units of the revolution processing unit 14251, the planetary rotation processing unit 14252, and the attack angle processing unit 14253 may simultaneously attain the processing.

In a case where a predetermined second movement condition is established, the second movement processing unit 144 updates the position of the predetermined object with respect to the field object. Note that, the predetermined object is arbitrary insofar as the predetermined object is an object of which the position with respect to the field object can be changed, and preferably, as described above, is the first object. The predetermined second movement condition is arbitrary, and for example, may be satisfied by the manipulation information (the movement instruction of the predetermined object), or may be satisfied on the basis of the progress situation of the game and other factors. Note that, the position of the predetermined object, for example, may be defined by the texture coordinate system of the field image.

The deformation processing unit 145 executes bending deformation processing in which the field surface 70 (and the field object associated therewith) is subjected to the bending deformation, on the basis of the position and the direction of the virtual camera 60. The bending deformation of the field surface 70 is as described above. In the deformation parameter data 13A illustrated in FIG. 13, for example, in a case where each of the values of the position parameters (X, Y) corresponds to the specific position A ($X_A$, $Y_A$), the deformation processing unit 145 performs the bending deformation with respect to the field surface 70 (and the field object associated therewith), on the basis of the value $\beta_1$ of the deformation parameter A1, even in a case where the direction of the virtual camera 60 is any direction. In addition, in a case where each of the values of the position parameters (X, Y) corresponds to the specific position C ($X_C$, $Y_C$), the deformation processing unit 145 performs the bending deformation with respect to the field surface 70 (and the field object associated therewith), on the basis of the value $\beta_3$ of the deformation parameter A1, when the direction of the virtual camera 60 is "$\theta_{C1}$", and performs the bending deformation with respect to the field surface 70 (and the field object associated therewith), on the basis of the value $\beta_4$ of the deformation parameter A1, when the direction of the virtual camera 60 is "$\theta_{C2}$".

In this embodiment, the deformation processing unit 145 includes a first deformation parameter calculation unit 1451, a second deformation parameter calculation unit 1452, a deformation parameter adjustment unit 1453, an origin setting processing unit 1454, and a deformation function application unit 1455. Note that, unlike the example illustrated in FIG. 13, in another embodiment in which the specific position is not set, the first deformation parameter calculation unit 1451 and the deformation parameter adjustment unit 1453 may be omitted.

The first deformation parameter calculation unit 1451 calculates the value of the deformation parameter A1, on the basis of the position and the direction of the virtual camera 60, with reference to the deformation parameter data 13A according to the specific position as described above with reference to FIG. 13 (first deformation parameter calculation processing). An example of the first deformation parameter calculation processing of the first deformation parameter calculation unit 1451 will be described below, with reference to FIG. 23.

The second deformation parameter calculation unit 1452 calculates the value of the deformation parameter A1, on the basis of the position and the direction of the virtual camera 60, with reference to the deformation parameter data 13B according to the specific object as described above with reference to FIG. 13 (second deformation parameter calculation processing). An example of the second deformation parameter calculation processing of the second deformation parameter calculation unit 1452 will be described below, with reference to FIG. 24.

In a case where the value of the deformation parameter A1 that is calculated by the first deformation parameter calculation unit 1451 is not coincident with the value of the deformation parameter A1 that is calculated by the second deformation parameter calculation unit 1452, the deformation parameter adjustment unit 1453 calculates an interpolation value by interpolation processing. An example of the interpolation processing according to the deformation parameter will be described below. Note that, in another embodiment, in a case where the value of the deformation parameter A1 that is calculated by the first deformation parameter calculation unit 1451 is not coincident with the value of the deformation parameter A1 that is calculated by the second deformation parameter calculation unit 1452, the deformation parameter adjustment unit 1453 may preferentially use one (for example, the value of the deformation parameter A1 that is calculated by the second deformation parameter calculation unit 1452).

The origin setting processing unit 1454 sets the position in which the origin O of the local coordinate system in the field object is associated (hereinafter, may be referred to as an "origin position"), on the basis of the position and the direction of the virtual camera 60. The origin setting processing unit 1454 sets the origin position, in two or more types of setting modes. In this embodiment, as an example, the origin setting processing unit 1454 sets the origin position, on the basis of the position of the predetermined object, as the first type of setting mode, and sets the origin position, on the basis of the position of the specific object different from the predetermined object, as the second type of setting mode. For example, the origin setting processing unit 1454 determines whether or not the specific object is positioned in the region falling within the viewing angle of the virtual camera 60, and in a case where it is determined that the specific object is positioned in the region falling within the viewing angle of the virtual camera 60, the origin setting processing unit 1454 sets the origin position, on the basis of the position of the specific object. On the other hand, in a case where it is determined that the specific object is not positioned in the region falling within the viewing angle of the virtual camera 60, the origin setting processing unit 1454 sets the origin position, on the basis of the position of the predetermined object. Note that, in another embodiment, the origin setting processing unit 1454 may set the origin position, on the basis of the position of the predetermined object, and the like, regardless of whether or not the specific object is positioned in the region falling within the viewing angle of the virtual camera 60, or may set the origin position, on the basis of other factors.

The deformation function application unit 1455 performs the bending deformation with respect to the field surface 70, on the basis of the origin position that is set by the origin setting processing unit 1454, the value of the deformation parameter A1 that is calculated (set) by the deformation parameter adjustment unit 1453, and the direction of the virtual camera 60, and on the basis of the function F1 described above with reference to FIG. 7.

The projection processing unit 146 arranges various objects other than the background object (the second object and the like) with respect to the field surface 70 that is subjected to the bending deformation by the deformation processing unit 145. The arrangement of various objects can be attained on the basis of the correspondence information described above. At this time, for the predetermined object, the projection processing unit 146 arranges the predetermined object in the position after being moved that is calculated by the second movement processing unit 144. Note that, as described above, the field image may be projected after the field surface 70 is subjected to the bending deformation.

The background processing unit 147 arranges the background object with respect to the field surface 70 that is subjected to the bending deformation by the deformation processing unit 145. The background processing unit 147 sets the position of the background object in the z direction, on the basis of the bending deformation degree of the field surface 70. Specifically, the background processing unit 147 sets the position of the background object with respect to the field object along the z direction, on the basis of the height H1 of the virtual horizon line HL that is expressed by the field object (refer to FIG. 6). For example, in a case where the height H1 of the horizon line HL decreases due to a change in the bending deformation degree of the field surface 70, the background processing unit 147 moves the position of the background object in the z direction to the lower side. For example, in the example illustrated in FIG. 5, in a case where the angle α is changed to the angle α', the background processing unit 147 may move the position of the background object in the z direction to the lower side by a distance Δ1. As illustrated in FIG. 5, the distance Δ1 is a distance between an intersection point P4 of the tangent line 6213 with respect to the field surface 70 from the virtual camera 60 (the tangent line within the viewing angle 62), with respect to the background surface 72, and an intersection point P5 of the tangent line 6213' with respect to the background surface 72. In this case, the background object can be arranged in a mode where a sense of discomfort due to the change does not occur, even in a case where the height H1 of the horizon line HL is changed due to the change in the bending deformation degree of the bending deformation.

Note that, in a predetermined case, the background processing unit 147 may not change the position of the background object with respect to the field object along the z direction. For example, in a case where a change amount in the bending deformation degree of the bending deformation by the deformation processing unit 145 is comparatively small, the position of the background object with respect to the field object along the z direction may not be changed.

The drawing data generation unit 148 generates the field image (the drawing data) including the expression of the various objects viewed from the virtual camera 60.

Next, the operation of the server control unit 13 according to the drawing function will be further described with reference to FIG. 16 and the subsequence. In the following processing flow diagram (a flowchart), a processing order of each step may be changed, unless a relationship between input and output of each of the steps is impaired.

Figure 16:
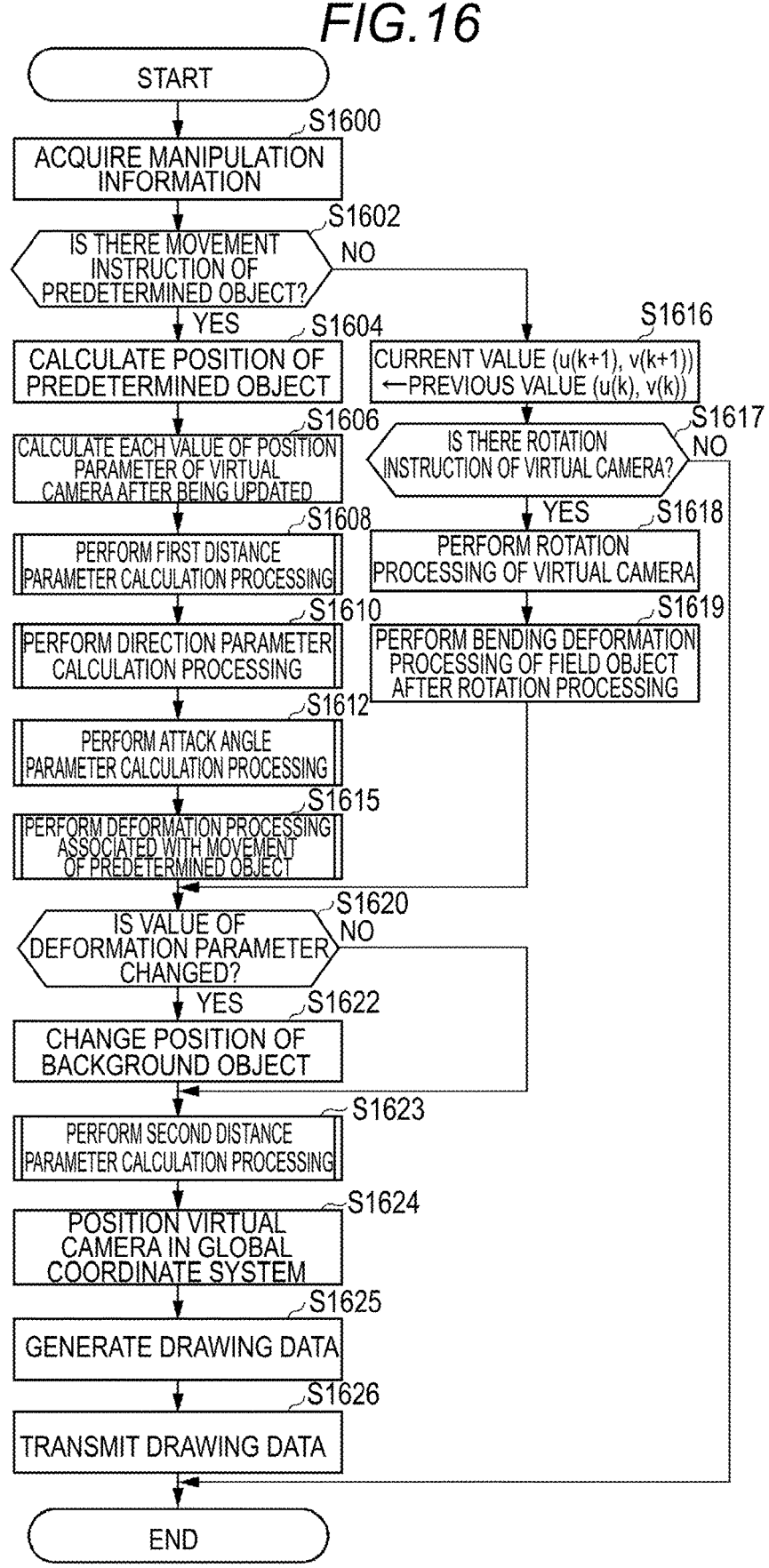
FIG. 16 is a schematic flowchart illustrating a processing flow that is attained by a server control unit.

FIG. 16 is a schematic flowchart illustrating a processing flow that is attained by the server control unit 13.

The processing illustrated in FIG. 16 may be executed for each predetermined processing cycle. The predetermined processing cycle may be identical to a frame cycle (an update cycle) of the field image. Note that, hereinafter, a value "before being updated" corresponds to the previous value based on a certain processing cycle (k+1) (a value derived from the previous processing cycle (k)), and a value "after being updated" corresponds to the current value derived from the processing cycle (k+1). Note that, here, as an example, in the first processing cycle, the position (u(0), v(0)) of the predetermined object after being updated is set in a predetermined initial position, each value (X(0), Y(0)) of the position parameters (X, Y) of the virtual camera 60 after being updated is set to be identical to the position (u(0), v(0)) of the predetermined object, and the values (X(0), Y(0), γ(0), θ(0), ψ(0)) of the camera parameters are set to the normal values thereof, respectively.

In step S1600, the manipulation information retrieval unit 132 acquires the manipulation information. Note that, the manipulation information may be received from the terminal device 20, in interruption processing, and may be stored in a predetermined storage unit of the server storage unit 12. In this case, the manipulation information retrieval unit 132 sequentially reads out the manipulation information from the predetermined storage unit.

In step S1602, the second movement processing unit 144 determines whether or not the movement instruction of the predetermined object is included in the manipulation information obtained in step S1600. In a case where a determination result is "YES", the process proceeds to step S1604, and in the other case, the process proceeds to step S1616.

In step S1604, the second movement processing unit 144 calculates the position of the predetermined object after being moved, on the basis of the movement instruction of the predetermined object in the manipulation information obtained in step S1600. Here, the position of the predetermined object after being moved is set to (u(k+1), v(k+1)) in the field coordinate. Note that, the position of the predetermined object before being moved is set to (u(k), v(k)) in the field coordinate. In this case, a movement vector in the field coordinate system is (u(k+1)−u(k), v(k+1)−v(k)). Note that, the movement instruction of the predetermined object may be an instruction indicating such a movement vector (the movement direction).

In step S1606, the first movement processing unit 1420 calculates each of the values (X(k+1), Y(k+1)) of the position parameters (X, Y) of the virtual camera 60 after being updated, on the basis of the position (u(k+1), v(k+1)) of the predetermined object after being moved that is obtained in step S1604. Note that, each of the values of the position parameters (X, Y) before being updated is set to (X(k), Y(k)). In this case, a change vector of each of the values of the position parameters (X, Y) is (X(k+1)−X(k), Y(k+1)−Y(k)). In this case, (X(k+1), Y(k+1)) may be calculated to be (X(k+1)−X(k), Y(k+1)−Y(k))=(u(k+1)−u(k), v(k+1)−v(k)).

In step S1608, the first distance change unit 14211 of the distance change unit 1421 calculates a value γ(k+1) of the distance parameter A2 after being updated that is associated with (X(k+1), Y(k+1)) described above, on the basis of each of the values (X(k+1), Y(k+1)) of the position parameters (X, Y) after being updated that are obtained in step S1606 (first distance parameter calculation processing). A specific example of the first distance parameter calculation processing will be described below, with reference to FIG. 17 and FIG. 18.

In step S1610, the direction change unit 1422 calculates a value θ(k+1) of the direction parameter θ that is associated with (X(k+1), Y(k+1)) described above, on the basis of each of the values (X(k+1), Y(k+1)) of the position parameters (X, Y) after being updated that are obtained in step S1606 (direction parameter calculation processing). A specific example of the direction parameter calculation processing will be described below, with reference to FIG. 19.

In step S1612, the attack angle change unit 1423 calculates a value ψ(k+1) of the attack angle parameter ψ that is associated with (X(k+1), Y(k+1)) described above, on the basis of each of the values (X(k+1), Y(k+1)) of the position parameters (X, Y) after being updated that are obtained in step S1606 (attack angle parameter calculation processing). A specific example of the attack angle parameter calculation processing will be outlined below, with reference to FIG. 20.

In step S1615, the deformation processing unit 145 executes deformation processing associated with the movement of the predetermined object. A specific example of the deformation processing associated with the movement of the predetermined object will be described below, with reference to FIG. 21.

In step S1616, the second movement processing unit 144 sets the position (u(k+1), v(k+1)) of the predetermined object after being updated to the position (u(k), v(k)) of the predetermined object before being updated. That is, the current value is identical to the previous value.

In step S1617, the rotation processing unit 1425 determines whether or not the rotation instruction of the virtual camera 60 in the manipulation information obtained in step S1600. In a case where a determination result is "YES", the process proceeds to step S1618, and in the other case, the current processing cycle ends as it is.

In step S1618, the rotation processing unit 1425 executes the rotation processing of the virtual camera 60, on the basis of the manipulation information obtained in step S1600. The rotation processing is as described above.

In step S1619, the deformation processing unit 145 executes the bending deformation of the field surface 70 (and the field object associated therewith) described above with reference to FIG. 7, FIG. 7A, and the like, on the basis of the visual line direction V of the virtual camera 60 after the rotation processing in step S1618.

In step S1620, the background processing unit 147 determines whether or not the current value β(k+1) of the deformation parameter A1 that is used in the current processing cycle is changed with respect to the previous value β(k). In a case where a determination result is "YES", the process proceeds to step S1622, and in the other case, the process proceeds to step S1623. Note that, in a modification example, in step S1620, the background processing unit 147 determines whether or not a change amount of the current value β(k+1) of the deformation parameter A1 that is used in the current processing cycle with respect to the previous value β(k) is a predetermined amount or more. Accordingly, in a case where the change amount is the predetermined amount or less, step S1622 can be skipped, and thus, a processing load for calculating the position of the background object in the z direction can be reduced. In addition, in another modification example, in step S1620, the current value β(k+1) of the deformation parameter A1 may not be directly compared with the previous value β(k) of the deformation parameter A1. For example, unlike this embodiment, in another embodiment where a specific position in which the deformation degree is changed during the revolution of the virtual camera 60, such as the specific position C described above, is not set, in a case where processing contents to step S1619 in the current processing cycle are the revolution, a determination result in this step S1620 may be set to "negative determination (NO)", without directly comparing the current value β(k+1) of the deformation parameter A1 with the previous value β(k) of the deformation parameter A1.

In step S1623, the second distance change unit 14212 of the distance change unit 1421 executes the second distance parameter calculation processing. A specific example of the second distance parameter calculation processing will be described below, with reference to FIG. 27.

In step S1624, the update reflection unit 1424 positions the virtual camera 60 in the global coordinate system, on the basis of each of the values (X(k+1), Y(k+1), γ(k+1), θ(k+1), ψ(k+1)) of the various parameters after being updated that are obtained in step S1606 to step S1612, or each of the values (X(k+1), Y(k+1), γ(k+1), θ(k+1), ψ(k+1)) of various parameters after being updated that are obtained in step S1606, step S1610 to step S1612, and step S1623.

In step S1625, the drawing data generation unit 148 generates various drawing data items after being updated (the drawing data of the field image) in the current processing cycle.

In step S1626, the drawing data transmission unit 134 transmits the drawing data generated in step S1625 to the terminal communication unit 21. Note that, in a case where the drawing data is received, the terminal communication unit 21 updates the display of the field image on the display unit 23, on the basis of the drawing data.

As described above, according to the processing illustrated in FIG. 16, the drawing data reflecting the manipulation information can be generated on the basis of the manipulation information received from the terminal device 20, and the generated drawing data can be transmitted to the terminal device 20. Accordingly, the update of the field image associated with the progress of the game can be attained in real time.

Figure 17:
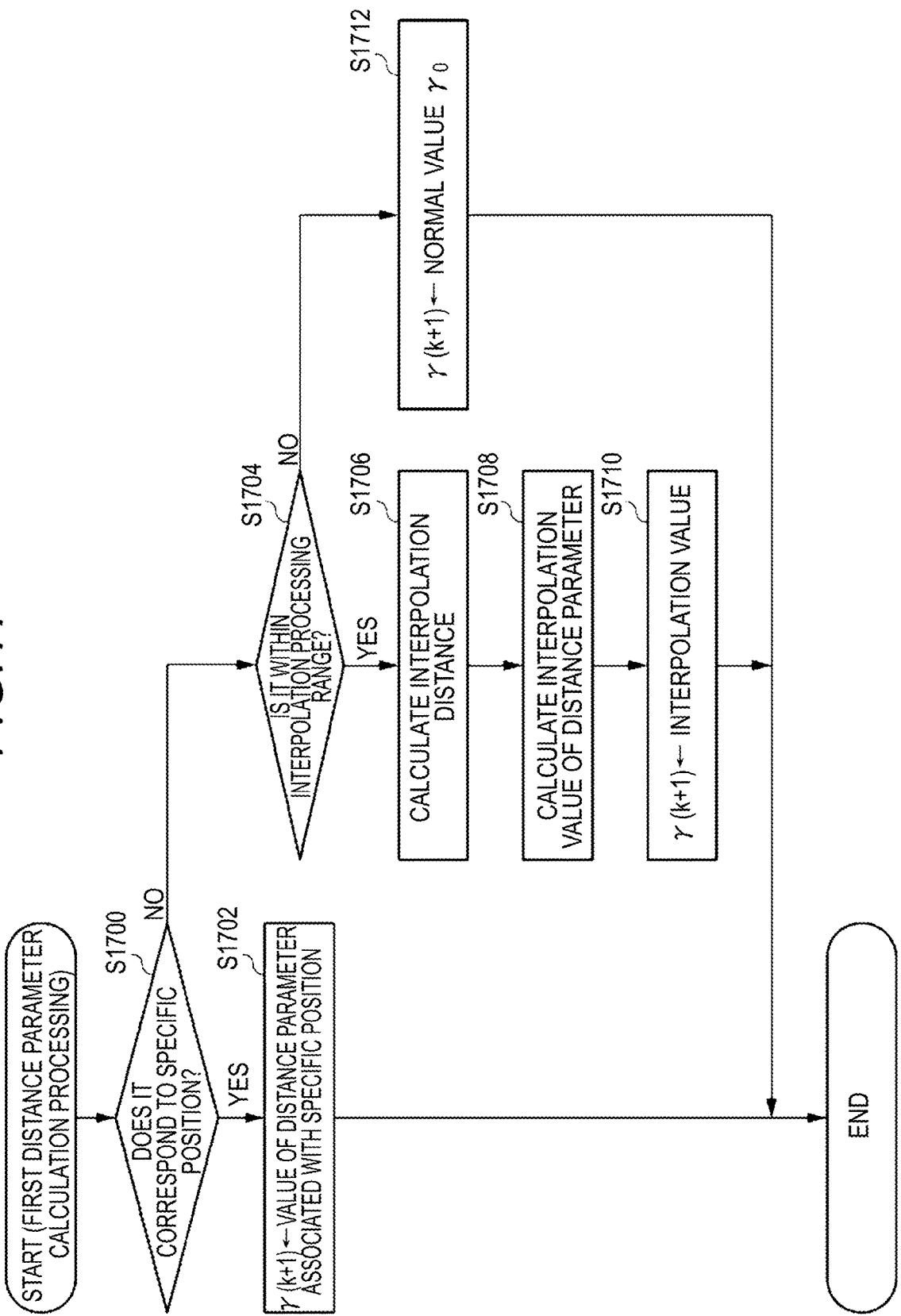
FIG. 17 is a schematic flowchart illustrating an example of first distance parameter calculation processing (step S1608)
Figure 18:
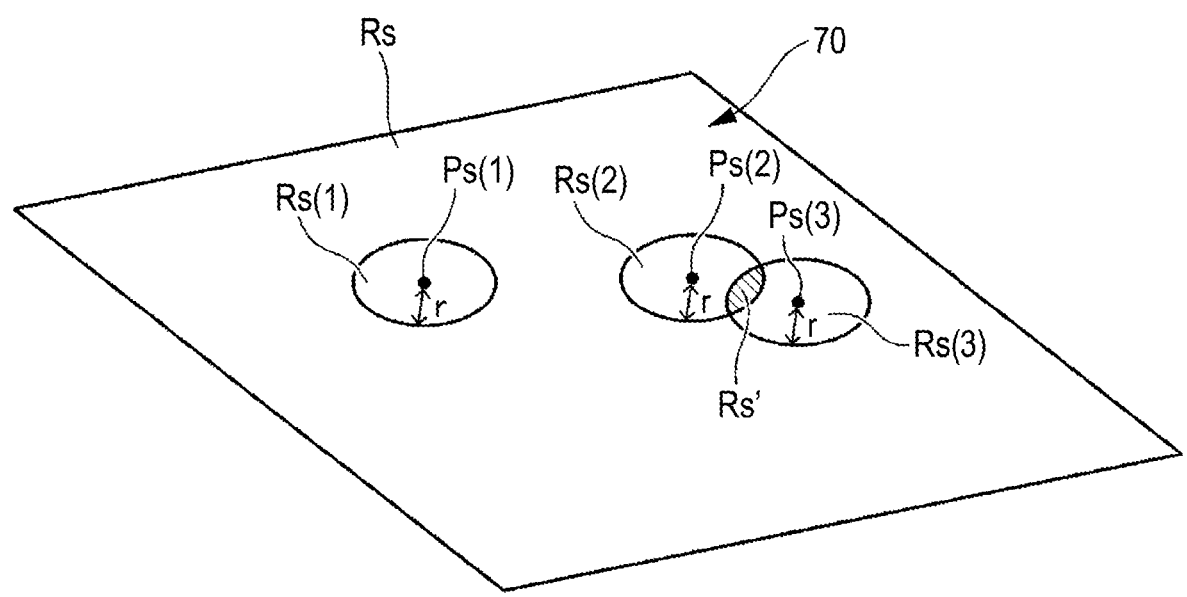
FIG. 18 is an explanatory diagram of an interpolation processing range.

FIG. 17 is a schematic flowchart illustrating an example of the first distance parameter calculation processing (step S1608). FIG. 18 is an explanatory diagram of an interpolation processing range, and is a perspective view illustrating the field surface 70.

In step S1700, the first distance change unit 14211 determines whether or not each of the values (X(k+1), Y(k+1)) of the position parameters (X, Y) after being updated that are obtained in step S1606 corresponds to an arbitrary specific position set in the distance parameter data 14A (refer to FIG. 14). In a case where a determination result is "YES", the process proceeds to step S1702, and in the other case, the process proceeds to step S1704.

In step S1702, the first distance change unit 14211 associates the value of the distance parameter A2 that is associated with a specific position corresponding to each of the values (X(k+1), Y(k+1)) of the position parameters (X, Y) after being updated, with the value γ(k+1) of the distance parameter A2 after being updated. For example, in the example illustrated in FIG. 14, in a case where each of the values (X(k+1), Y(k+1)) of the position parameters (X, Y) after being updated corresponds to the specific position A ($X_A$, $Y_A$), the value γ(k+1) of the distance parameter A2 is set to $γ_1$.

In step S1704, the first distance change unit 14211 determines whether or not each of the values (X(k+1), Y(k+1)) of the position parameters (X, Y) after being updated that are obtained in step S1606 is within an interpolation processing range associated with the arbitrary specific position set in the distance parameter data 14A (refer to FIG. 14). The interpolation processing range may be set in association with the texture coordinate system (=the field coordinate system), for each of the specific positions. In this embodiment, as illustrated in FIG. 18, the interpolation processing range is simply set to be within a circular region having a radius r, with the specific position as the center. In this case, it may be determined whether or not each of the values (X(k+1), Y(k+1)) of the position parameters (X, Y) after being updated is within the circular region having the radius r, with the specific position as the center. Here, in another embodiment, the interpolation processing range may be defined by a region in another form. For example, in a case where each of the values of the position parameters (X, Y) of the virtual camera 60 is positioned within the interpolation processing range, and the values of the distance parameter A2 and the attack angle parameter are normal values $γ_0$ and $ψ_0$, respectively, the interpolation processing range may be set such that the specific position according to the interpolation processing range is positioned in the region falling within the viewing angle of the virtual camera 60, even at the time of the value of the arbitrary direction parameter θ. The same applies to other interpolation processing ranges described below. In FIG. 18, on the field surface 70, three specific positions Ps(1) to Ps(3) are schematically illustrated, and interpolation processing ranges Rs(1) to Rs(3) associated with the specific positions, respectively, are schematically illustrated. Note that, in FIG. 18, the interpolation processing range Rs(2) and the interpolation processing range Rs(3) overlap with each other, and an overlap region Rs' is illustrated by a hatching region. Note that, each of the specific positions Ps(1), Ps(2), and Ps(3) is set to the distance parameter data 14A (refer to FIG. 14), as with the specific positions A and B, and the like. Note that, the interpolation processing range (the same applies to interpolation processing ranges according to other parameters described below) may be defined in advance by the distance parameter data 14A and the like.

In step S1706, the first distance change unit 14211 calculates a distance between each of the values (X(k+1), Y(k+1)) of the position parameters (X, Y) after being updated and the specific position according to the interpolation processing range Rs to which each of the values belongs (an interpolation distance). For example, in the example illustrated in FIG. 18, in a case where each of the values (X(k+1), Y(k+1)) of the position parameters (X, Y) after being updated is positioned within the interpolation processing range Rs(1), a distance d(1) between (X(k+1), Y(k+1)) and the specific position Ps(1) according to the interpolation processing range Rs(1) is calculated. On the other hand, in the example illustrated in FIG. 18, in a case where each of the values (X(k+1), Y(k+1)) of the position parameters (X, Y) after being updated is positioned within the overlap region Rs', a distance d(2) between (X(k+1), Y(k+1)) and the specific position Ps(2) according to the interpolation processing range Rs(2) and a distance d(3) between (X(k+1), Y(k+1)) and the specific position Ps(3) according to the interpolation processing range Rs(3) are calculated.

In step S1708, the first distance change unit 14211 calculates an interpolation value of the distance parameter A2, on the basis of the distance obtained in step S1706. For example, an interpolation value γ(1) of the distance parameter A2 according to the distance d(1) described above may be calculated by the following formula.

$$γ(1)=(γ_1-γ_0)/r×(r-d(1))+γ_0$$

The value $γ_1$ is a value associated with the specific position Ps(1), and is less than the normal value $γ_0$, as described above.

On the other hand, in a case where each of the values (X(k+1), Y(k+1)) of the position parameters (X, Y) after being updated is positioned within the overlap region Rs', an interpolation value γ(Rs') may be calculated by the following formula, on the basis of an interpolation value γ(2) of the distance parameter A2 according to the distance d(2)

described above and an interpolation value γ(3) of the distance parameter A2 according to the distance d(3) described above.

$$\gamma(Rs')=B0\times\gamma(2)+(1-B0)\times\gamma(3)$$

Here, γ(2) and γ(3) are as described below.

$$\gamma(2)=(\gamma_2-\gamma_0)/r\times(r-d(2))+\gamma_0$$

$$\gamma(3)=(\gamma_3-\gamma_0)/r\times(r-d(3))+\gamma_0$$

The values $\gamma_2$ and $\gamma_3$ are values associated with the specific positions Ps(2) and Ps(3), respectively, and are less than the normal value $\gamma_0$, as described above. B0 is a coefficient that is changed within a range of 0 to 1, is close to 1 as each of the values of the position parameters (X, Y) after being updated is close to the specific position Ps(2), and is 1 at a boundary position on the specific position Ps(2) side in the overlap region Rs'. In addition, the coefficient B0 is close to 0 as each of the values of the position parameters (X, Y) after being updated is close to the specific position Ps(3), and is 0 at a boundary position on the specific position Ps(3) side in the overlap region Rs'. For example, B0 may be as described below.

$$B0=(r-d(2))/\{(r-d(2))+(r-d(3))\}$$

In step S1710, the first distance change unit 14211 sets the interpolation value calculated in step S1708 to the value γ(k+1) of the distance parameter A2 after being updated.

In step S1712, the first distance change unit 14211 sets the normal value $\gamma_0$ to the value γ(k+1) of the distance parameter A2 after being updated.

As described above, according to the processing illustrated in FIG. 17, the value of the distance parameter A2 can be gradually changed in tandem with a change in each of the values of the position parameters (X, Y) for each predetermined processing cycle, and thus, for example, a gentle change in the distance can be attained, compared to a case where the normal value $\gamma_0$ is rapidly changed to the value $\gamma_1$ or the like in a processing cycle reaching the specific position. As a result thereof, the value of the distance parameter A2 can be changed while reducing a sense of discomfort that can be felt by the user.

Figure 19:
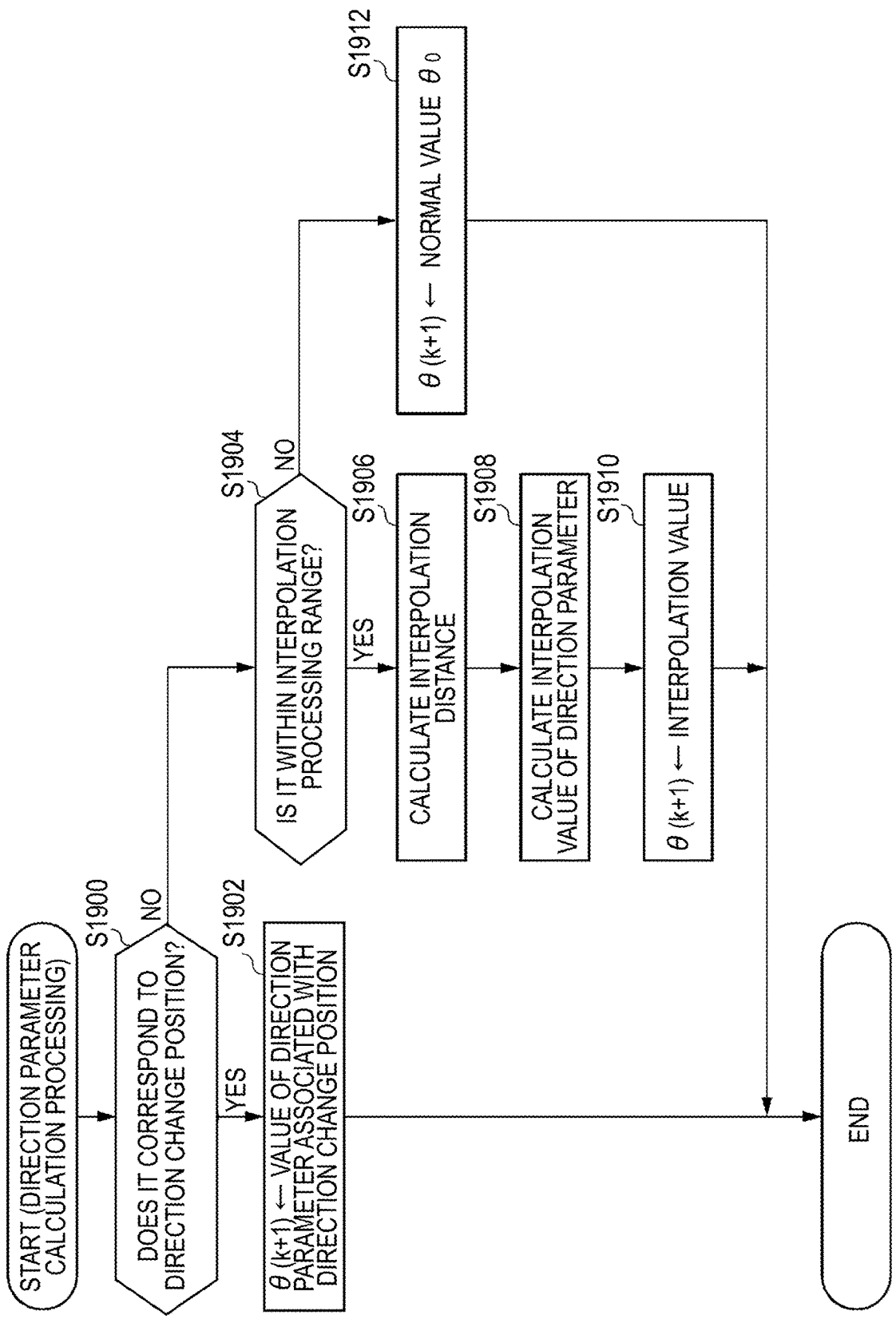
FIG. 19 is a schematic flowchart illustrating an example of direction parameter calculation processing (step S1610)

FIG. 19 is a schematic flowchart illustrating an example of the direction parameter calculation processing (step S1610).

In step S1900, the direction change unit 1422 determines whether or not each of the values (X(k+1), Y(k+1)) of the position parameters (X, Y) after being updated that are obtained in step S1606 corresponds to an arbitrary direction change position set in the direction parameter data (refer to FIG. 15). In a case where a determination result is "YES", the process proceeds to step S1902, and in the other case, the process proceeds to step S1904.

In step S1902, the direction change unit 1422 sets the value of the direction parameter θ associated with the direction change position corresponding to each of the values (X(k+1), Y(k+1)) of the position parameters (X, Y) after being updated to the value θ(k+1) of the direction parameter θ. For example, in the example illustrated in FIG. 15, in a case where each of the values (X(k+1), Y(k+1)) of the position parameters (X, Y) after being updated corresponds to the direction change position T1 ($X_{P1}$, $Y_{P1}$), the value θ(k+1) of the direction parameter θ is set to $\theta_1$.

In step S1904, the direction change unit 1422 determines whether or not each of the values (X(k+1), Y(k+1)) of the position parameters (X, Y) after being updated that are obtained in step S1606 is within an interpolation processing range associated with the arbitrary direction change position set in the direction parameter data (refer to FIG. 15). The interpolation processing range may be set for each of the direction change positions. In this embodiment, as with the interpolation processing range according to the distance parameter A2, the interpolation processing range is simply set to be within the circular region having the radius r, with the direction change position as the center (refer to FIG. 18). Here, in another embodiment, the interpolation processing range may be defined by a region in another form. In addition, in another embodiment, the interpolation processing range may be set with respect to a part of all of the direction change position. In a case where a determination result is "YES", the process proceeds to step S1906, and in the other case, the process proceeds to step S1912.

In step S1906, the direction change unit 1422 calculates a distance between each of the values (X(k+1), Y(k+1)) of the position parameters (X, Y) after being updated and the specific position according to the interpolation processing range Rs to which each of the values belongs. A calculation method of the distance may be the same as that in step S1706 described above.

In step S1908, the direction change unit 1422 calculates the interpolation value of the direction parameter θ, on the basis of the distance obtained in step S1906. A calculation method of the interpolation value may be the same as that in step S1708 described above.

In step S1910, the direction change unit 1422 sets the interpolation value calculated in step S1908 to the value θ(k+1) of the direction parameter θ.

In step S1912, the direction change unit 1422 sets the normal value $\theta_0$ to the value θ(k+1) of the direction parameter θ. The normal value $\theta_0$ may be set such that the projection vector V' is perpendicular to the movement vector (u(k+1)−u(k), v(k+1)−v(k)) of the predetermined object.

As described above, according to the processing illustrated in FIG. 19, the value of the direction parameter θ can be gradually changed in tandem with a change in each of the values of the position parameters (X, Y) for each predetermined processing cycle, and thus, for example, a gentle change in the direction, in which a sense of discomfort that can be felt by the user can be reduced, can be attained, compared to a case where the normal value $\theta_0$ is rapidly changed to the value $\Gamma_1$ or the like in a processing cycle reaching the direction change position.

Figure 20:
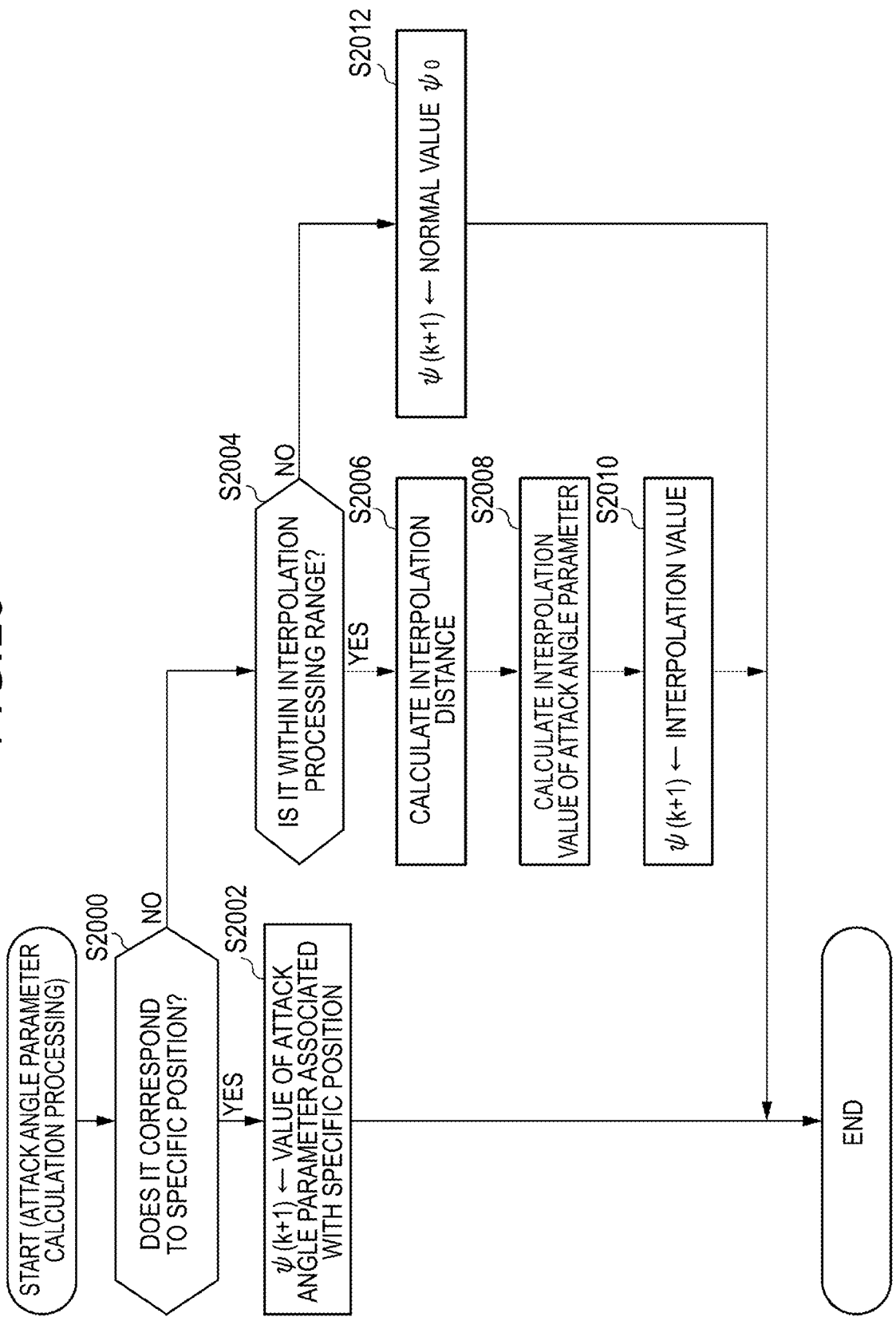
FIG. 20 is a schematic flowchart illustrating an example attack angle parameter calculation processing (step S1612)

FIG. 20 is a schematic flowchart illustrating an example of the attack angle parameter calculation processing (step S1612). The processing illustrated in FIG. 20 is substantially identical to the direction parameter calculation processing illustrated in FIG. 19 described above, except that the parameters are different, and thus, the description thereof will be omitted.

Figure 21:
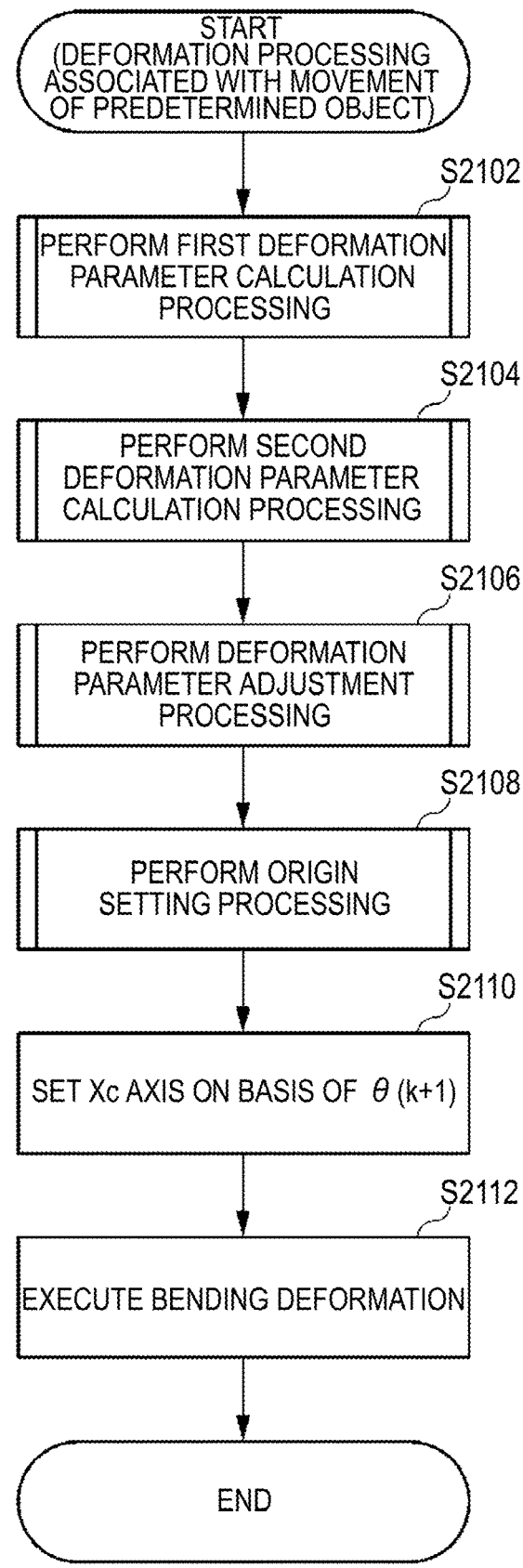
FIG. 21 is a schematic flowchart illustrating an example of deformation processing associated with a movement of a predetermined object (step S1615)
Figure 22:
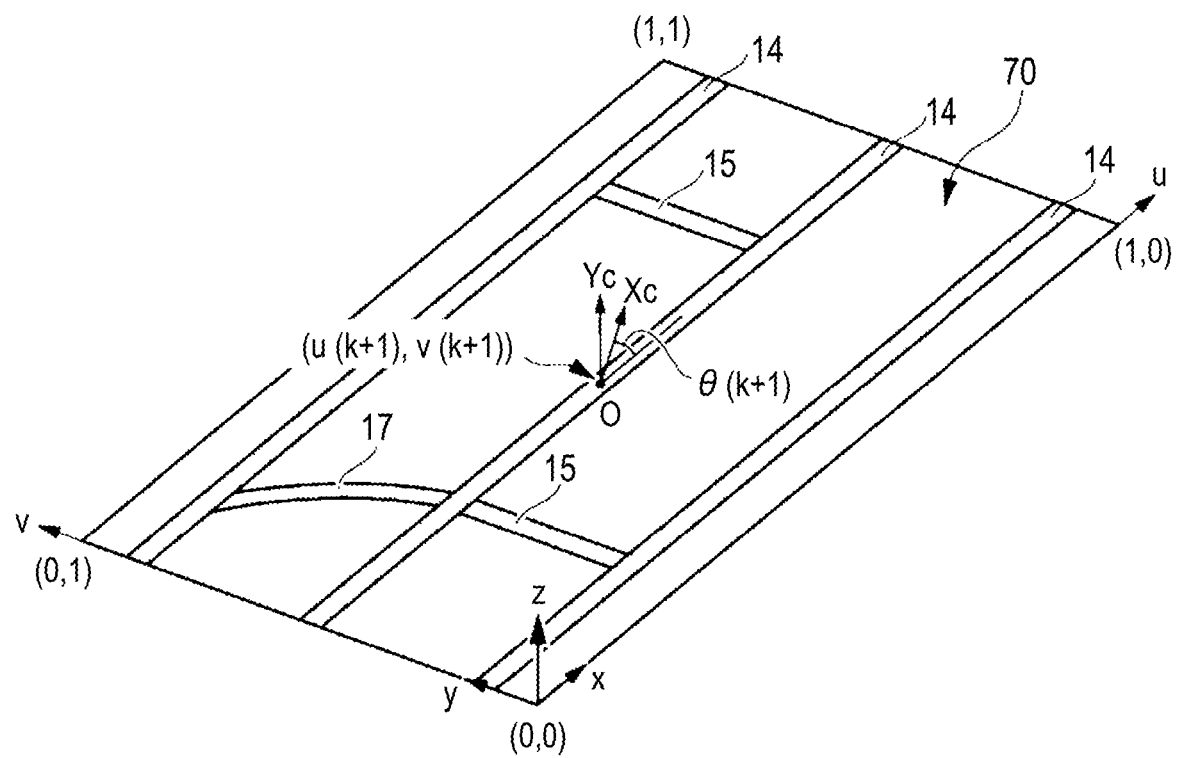
FIG. 22 is an explanatory diagram of bending deformation processing.

FIG. 21 is a schematic flowchart illustrating an example of the deformation processing associated with the movement of the predetermined object (step S1615). FIG. 22 is an explanatory diagram of the bending deformation processing, and is a perspective view in which the local coordinate system is associated on the field surface 70 onto which the field image illustrated in FIG. 2 is projected.

In step S2102, the first deformation parameter calculation unit 1451 calculates the value β(k+1) of the deformation parameter A1 after being updated, with reference to the deformation parameter data 13A according to the specific position (FIG. 13) (the first deformation parameter calculation processing). Hereinafter, the value β(k+1) of the deformation parameter A1 after being updated that is obtained in the first deformation parameter calculation processing will be referred to as a first value β'(k+1) of the deformation parameter A1 after being updated, for distinguishment. A specific example of the first deformation parameter calculation processing will be described below, with reference to FIG. 23.

In step S2104, the second deformation parameter calculation unit 1452 calculates the value β(k+1) of the deformation parameter A1 after being updated, with reference to the deformation parameter data 13B according to the specific object (FIG. 13) (the second deformation parameter calculation processing). Hereinafter, the value β(k+1) of the deformation parameter A1 after being updated that is obtained in the second deformation parameter calculation processing to a second value β"(k+1) of the deformation parameter A1 after being updated, for distinguishment. A specific example of the second deformation parameter calculation processing will be described below, with reference to FIG. 24.

In step S2106, the deformation parameter adjustment unit 1453 sets the value β(k+1) of the deformation parameter A1 after being finally updated, on the basis of the first value β'(k+1) of the deformation parameter A1 after being updated that is obtained in step S2102 and the second value β"(k+1) of the deformation parameter A1 after being updated that is obtained in step S2104 (deformation parameter adjustment processing). A specific example of the deformation parameter adjustment processing will be described below, with reference to FIG. 25.

In step S2108, the origin setting processing unit 1454 executes origin setting processing for setting the origin position (the position in which the origin O of the local coordinate system in the field object is associated) (an example of the predetermined position). A specific example of the origin setting processing will be outlined below, with reference to FIG. 26.

In step S2110, the deformation function application unit 1455 associates the field coordinate system of the field surface 70 (the texture coordinate system of the field image) with the local coordinate system (refer to FIG. 7 and FIG. 22), on the basis of the origin O associated with the origin position set in step S2108, and the value θ(k+1) of the direction parameter θ. Specifically, an axis that passes through the origin set in step S2108 and has the value θ(k+1) of the direction parameter θ with respect to the x direction is set to the Xc axis. Note that, in the example illustrated in FIG. 22, a state is illustrated in which the local coordinate system is associated, with (u(k+1), v(k+1)) on the field surface 70 as the origin position.

In step S2112, the deformation function application unit 1455 performs the bending deformation with respect to the field surface 70, on the basis of the value β(k+1) of the deformation parameter A1 after being updated that is set in step S2106 and the local coordinate system associated with the field coordinate system of the field surface 70 in step S2110. In this case, for example, the deformation function application unit 1455 is capable of performing the bending deformation with respect to the field surface 70, on the basis of the function F1 described above with reference to FIG. 7.

Figure 23:
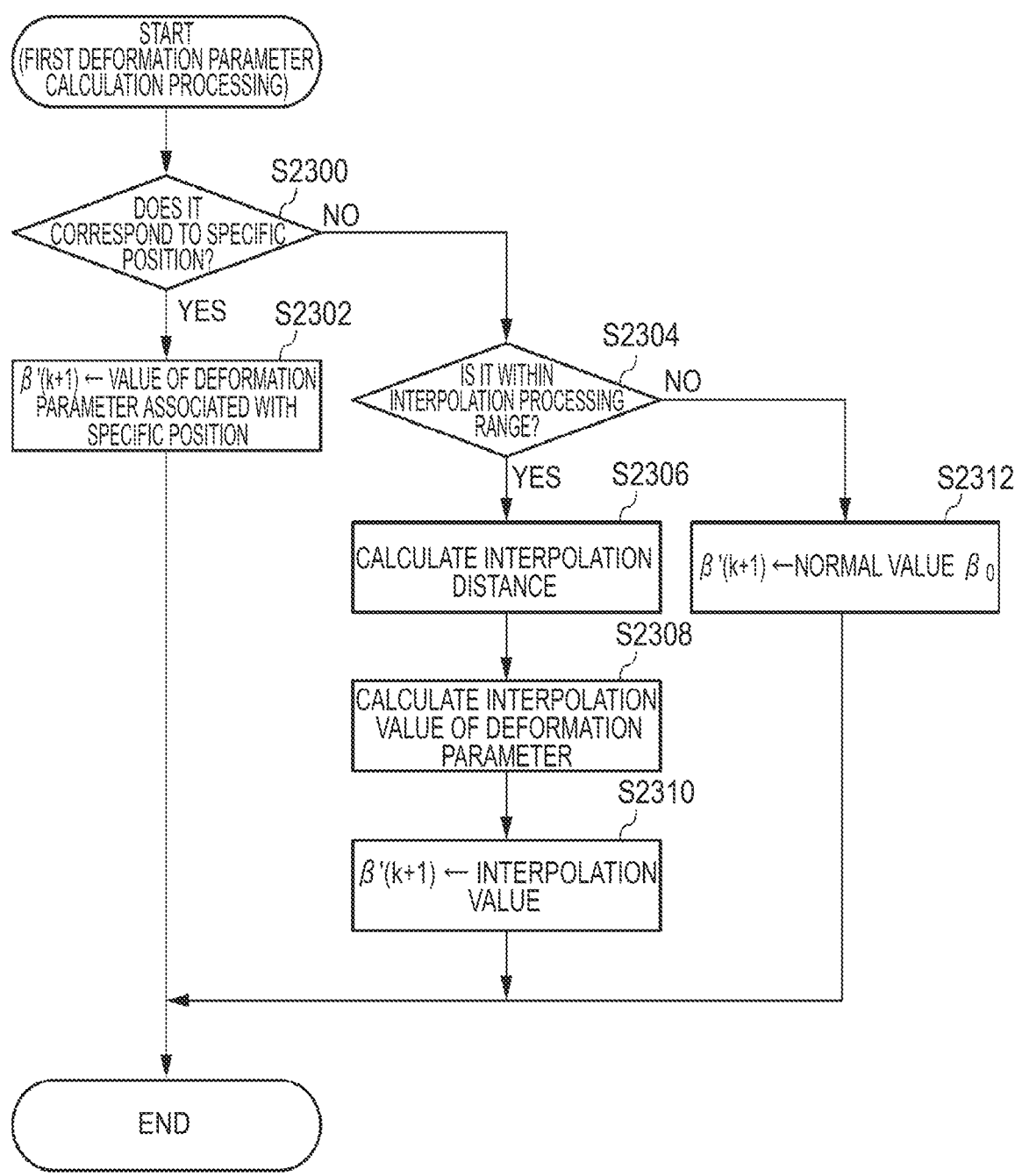
FIG. 23 is a schematic flowchart illustrating first deformation parameter calculation processing (step S2102) of a first deformation parameter calculation unit.

FIG. 23 is a schematic flowchart illustrating the first deformation parameter calculation processing of the first deformation parameter calculation unit 1451 (step S2102).

In step S2300, the first deformation parameter calculation unit 1451 determines whether or not each of the values (X(k+1), Y(k+1)) of the position parameters (X, Y) after being updated that are obtained in step S1606 corresponds to the arbitrary specific position set in the deformation parameter data 13A (refer to FIG. 13). In a case where a determination result is "YES", the process proceeds to step S2302, and in the other case, the process proceeds to step S2304.

In step S2302, the first deformation parameter calculation unit 1451 sets the value of the deformation parameter A1 associated with the specific position corresponding to each of the values (X(k+1), Y(k+1)) of the position parameters (X, Y) after being updated to the first value β'(k+1) of the deformation parameter A1 after being updated. For example, in the deformation parameter data 13A illustrated in FIG. 13, in a case where each of the values (X(k+1), Y(k+1)) of the position parameters (X, Y) after being updated corresponds to the specific position A ($X_A$, $Y_A$), the value β(k+1) of the deformation parameter A1 after being updated is set to $β_1$.

In step S2304, the first deformation parameter calculation unit 1451 determines whether or not each of the values (X(k+1), Y(k+1)) of the position parameters (X, Y) after being updated that are obtained in step S1606 is within an interpolation processing range associated with the arbitrary specific position set in the deformation parameter data (refer to FIG. 13). The interpolation processing range may be set for each of the specific positions. In this embodiment, as with the interpolation processing range associated with the specific position according to the distance parameter A2, the interpolation processing range is simply set to be within the circular region having the radius r, with the specific position as the center (refer to FIG. 18). Here, in another embodiment, the interpolation processing range may be defined by a region in another form, as described above.

In step S2306, the first deformation parameter calculation unit 1451 calculates a distance d(k+1) between each of the values (X(k+1), Y(k+1)) of the position parameters (X, Y) after being updated and the specific position according to the interpolation processing range to which each of the values belongs. A calculation method of the distance may be the same as that in step S1706 described above.

In step S2308, the first deformation parameter calculation unit 1451 calculates an interpolation value of the deformation parameter A1, on the basis of the distance d(k+1) obtained in step S2306. A calculation method of the interpolation value may be the same as that in step S1708 described above.

Here, in the case of a specific position in which the deformation degree is changed during the revolution of the virtual camera 60, such as the specific position C of the deformation parameter data 13A in FIG. 13, calculation may be performed as described below, on the basis of the value θ(k+1) of the direction parameter θ. Here, the specific position C will be described. First, a value $β(C_0)$ of the deformation parameter A1 associated with the specific position C may be calculated by Formula (1) described below when $θ_{C1}-Δθ1 ≤ θ(k+1) ≤ θ_{C1}+Δθ1$, and may be calculated by Formula (2) described below when $θ_{C2}-Δθ1 ≤ θ(k+1) ≤ θ_{C2}+Δθ1$, and in the other range, the value $β(C_0)$ may be set to the normal value $β_0$.

$$β(C_0)=-(β_3-β_0)/Δθ1 \times |(θ(k+1)-θ_{C1})|+β_3 \qquad \text{Formula (1)}$$

$$β(C_0)=-(β_4-β_0)/Δθ1 \times |(θ(k+1)-θ_{C2})|+β_4 \qquad \text{Formula (2)}$$

For example, in Formula (1), a value obtained by multiplying an absolute value of $(θ(k+1)-θ_{C1})$ by $(β_3-β_0)/Δθ1$ is subtracted from $β_3$, and is set to $β(C_0)$. Here, Δθ1 is a value for setting the interpolation angle range, and $β_3$ and $β_4$ are the value of the deformation parameter A1 associated with the specific direction of the specific position C, and are greater than the normal value $β_0$, as described above. Note that, here, in Formula (1) and Formula (2), the same Δθ1 is used, but different Δθ1 may be used.

Then, in a case where a distance between the specific position C and (X(k+1), Y(k+1)) is set to a distance d(d$_C$), an interpolation value β(d$_C$) of the deformation parameter A1 according to the distance d(d$_C$) may be calculated by the following formula, by using β(C$_0$) described above.

$$β(d_C)=(β(C_0)−β_0)/r×(r−d(d_C))+β_0$$

In addition, for example, a case where the interpolation processing ranges respectively according to the specific position A and the specific position B include the overlap region Rs' is the same as the case of the distance parameter A2. Specifically, in a case where each of the values (X(k+1), Y(k+1)) of the position parameters (X, Y) after being updated is positioned within the overlap region Rs', when a distance between the specific position A and (X(k+1), Y(k+1)) is set to a distance d(d$_A$), and a distance between the specific position B and (X(k+1), Y(k+1)) is set to a distance d(d$_B$), an interpolation value β(Rs') may be calculated by the following formula, on the basis of an interpolation value β(d$_A$) of the deformation parameter A1 according to the distance d(d$_A$) and an interpolation value β(d$_B$) of the deformation parameter A1 according to the distance d(d$_B$).

$$β(Rs')=B1×β(d_A)+(1−B1)×β(d_B)$$

Here, β(d$_A$) and β(d$_B$) are as described below.

$$β(d_A)=(β_1−β_0)/r×(r−d(d_A))+β_0$$

$$β(d_B)=(β_2−β_0)/r×(r−d(d_B))+β_0$$

B1 is a coefficient that is changed within a range of 0 to 1, is close to 1 as each of the values of the position parameters (X, Y) after being updated is close to the specific position A, and is 1 at a boundary position on the specific position A side in the overlap region Rs'. In addition, the coefficient B1 is close to 0 as each of the values of the position parameters (X, Y) after being updated is close to the specific position B, and is 0 at a boundary position on the specific position B side in the overlap region Rs'. For example, B1 may be as described below.

$$B1=(r−d(d_A))/\{(r−d(d_A))+(r−d(d_B))\}$$

In step S2310, the first deformation parameter calculation unit 1451 sets the interpolation value calculated in step S2308 to the first value β'(k+1) of the deformation parameter A1 after being updated.

In step S2312, the first deformation parameter calculation unit 1451 sets the normal value β$_0$ to the first value β'(k+1) of the deformation parameter A1 after being updated.

Figure 24:
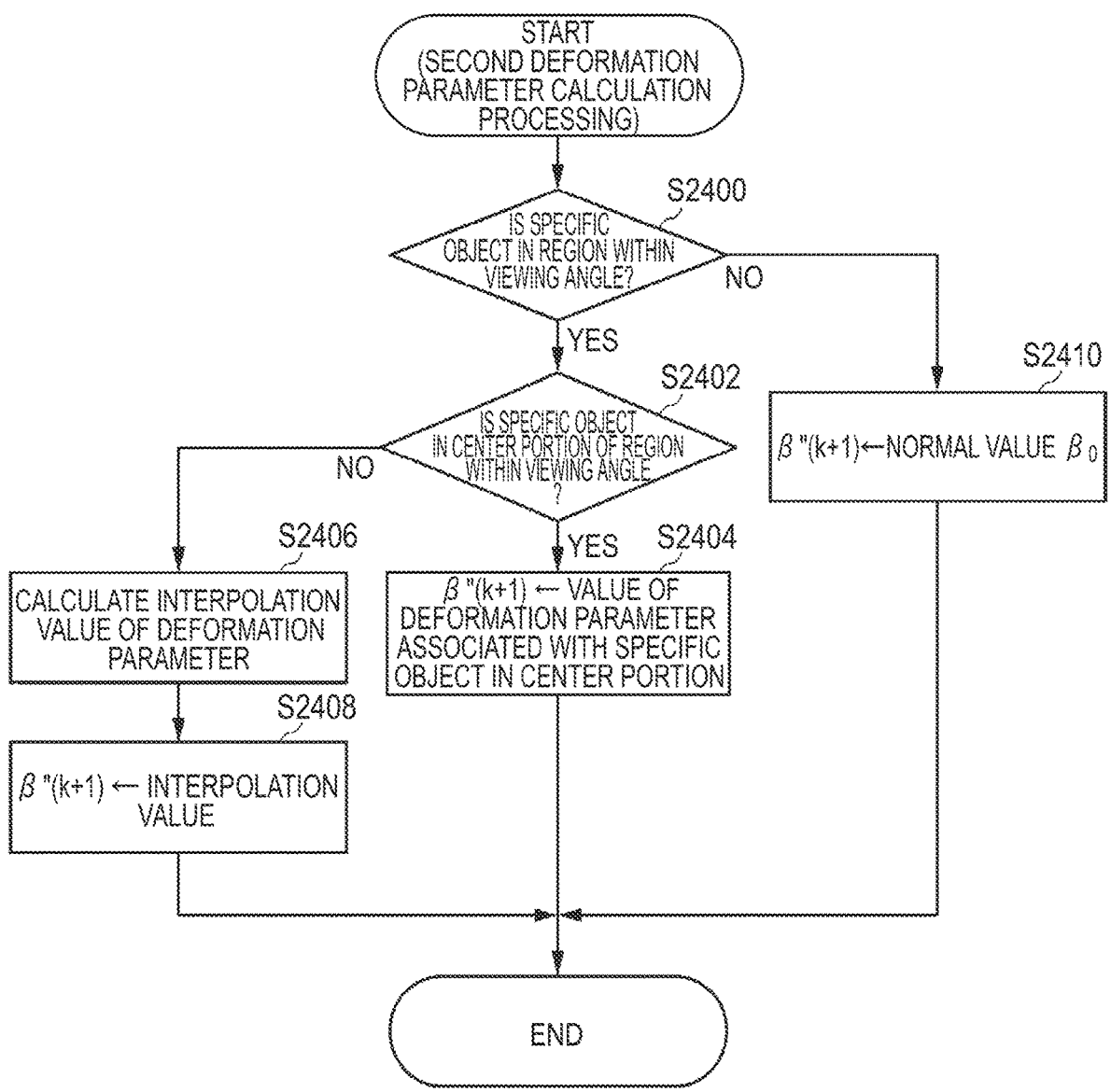
FIG. 24 is a schematic flowchart illustrating second deformation parameter calculation processing (step S2104) of a second deformation parameter calculation unit.

FIG. 24 is a schematic flowchart illustrating the second deformation parameter calculation processing of the second deformation parameter calculation unit 1452 (step S2104).

In step S2400, the second deformation parameter calculation unit 1452 determines whether or not the specific object is positioned in the region of the field object that is positioned within the viewing angle of the virtual camera 60 positioned in an absolute coordinate system on the basis of each of the values (X(k+1), Y(k+1), γ(k+1), θ(k+1), ψ(k+1)) of the camera parameters after being updated that are obtained in step S1608 to step S1612 (hereinafter, may be simply referred to as a "region of the field object within the viewing angle of the virtual camera 60" or may be simply referred to as a "region within the viewing angle"). Note that, the region of the field object within the viewing angle of the virtual camera 60 is unambiguously set on the basis of each of the values of the camera parameters.

Note that, the distance of the region of the field object in the regular state within the viewing angle of the virtual camera 60 in a horizontal direction (for example, a distance in the field coordinate system) is set in accordance with the value of the distance parameter A2. Accordingly, for example, in a case where the distance of the field object within the viewing angle of the virtual camera 60 in the horizontal direction is set to L1, it may be determined whether or not L1/2≤d$_L$(k+1), on the basis of a distance d$_L$(k+1) between the projection vector V' of the virtual camera 60 and the specific object in a direction perpendicular to the projection vector V' (hereinafter, may be simply referred to as the "horizontal direction"). In this case, when L1/2≤d$_L$(k+1), it may be determined that the specific object is positioned in the region of the field object within the viewing angle of the virtual camera 60.

In this embodiment, in a case where each of the values (X(k+1), Y(k+1)) of the position parameters (X, Y) after being updated is positioned in the interpolation processing range associated with the specific object, it is determined that the specific object is positioned in the region of the field object within the viewing angle of the virtual camera 60. In this case, as described above, an interpolation processing range associated with one specific object may be set such that the one specific object is positioned in the region falling within the viewing angle of the virtual camera 60 in a case where each of the values of the position parameters (X, Y) of the virtual camera 60 is positioned within the interpolation processing range.

In this step S2400, in a case where a determination result is "YES", the process proceeds to step S2402, and in the other case, the process proceeds to step S2410.

In step S2402, the second deformation parameter calculation unit 1452 determines whether or not the specific object is positioned in the center portion of the region of the field object within the viewing angle of the virtual camera 60. For example, in a case where the distance d$_L$(k+1) between the projection vector V' of the virtual camera 60 and the specific object in the horizontal direction is 0, the second deformation parameter calculation unit 1452 may determine that the specific object is positioned in the center portion of the region of the field object within the viewing angle of the virtual camera 60. Alternatively, in a case where the distance d$_L$(k+1) in the horizontal direction is a predetermined distance (a distance significantly less than L1/2, for example, L1/4) or less, the second deformation parameter calculation unit 1452 may determine that the specific object is positioned in the center portion of the region of the field object within the viewing angle of the virtual camera 60. Note that, the projection vector V' of the virtual camera 60 can be derived on the basis of each of the values (X(k+1), Y(k+1), θ(k+1)) of the position parameters and the direction parameters after being updated that are obtained in step S1608 and step S1610. In a case where a determination result is "YES", the process proceeds to step S2404, and in the other case, the process proceeds to step S2406.

In step S2404, the second deformation parameter calculation unit 1452 sets the value of the deformation parameter A1 associated with the specific object positioned in the center portion of the region of the field object within the viewing angle of the virtual camera 60 to the second value β"(k+1) of the deformation parameter A1 after being updated. For example, in the case of the deformation parameter data 13B illustrated in FIG. 13, when the specific object G1 is positioned in the center portion of the region of the field object within the viewing angle of the virtual camera 60, the value β$_{G1}$ of the deformation parameter A1 associated with the specific object G1 is associated with the second value β"(k+1) of the deformation parameter A1 after being updated.

In step S2406, the second deformation parameter calculation unit 1452 calculates the interpolation value of the deformation parameter A1, on the basis of the distance $d_L(k+1)$ between the projection vector V' of the virtual camera 60 and the specific object in the horizontal direction. For example, an interpolation value $β(d_L)$ may be calculated by the following formula, by using the distance $d_L(k+1)$ in the horizontal direction described above.

$$β(d_L)=(β_{G*}-β_0)/L1/2×(L1/2-d(d_L))+β_0$$

A value $β_{G*}$ is the value of the deformation parameter A1 associated with the specific object positioned in the region of the field object within the viewing angle of the virtual camera 60, and is the value $β_{G1}$ in the case of the specific object G1. L1/2 is half of the distance L1 of the region of the field object within the viewing angle of the virtual camera 60 in the horizontal direction.

In step S2408, the second deformation parameter calculation unit 1452 sets the interpolation value of the deformation parameter A1 that is obtained in step S2406 to the second value β"(k+1) of the deformation parameter A1 after being updated.

In step S2410, the second deformation parameter calculation unit 1452 sets the normal value $β_0$ to the second value β"(k+1) of the deformation parameter A1 after being updated.

Figure 25:
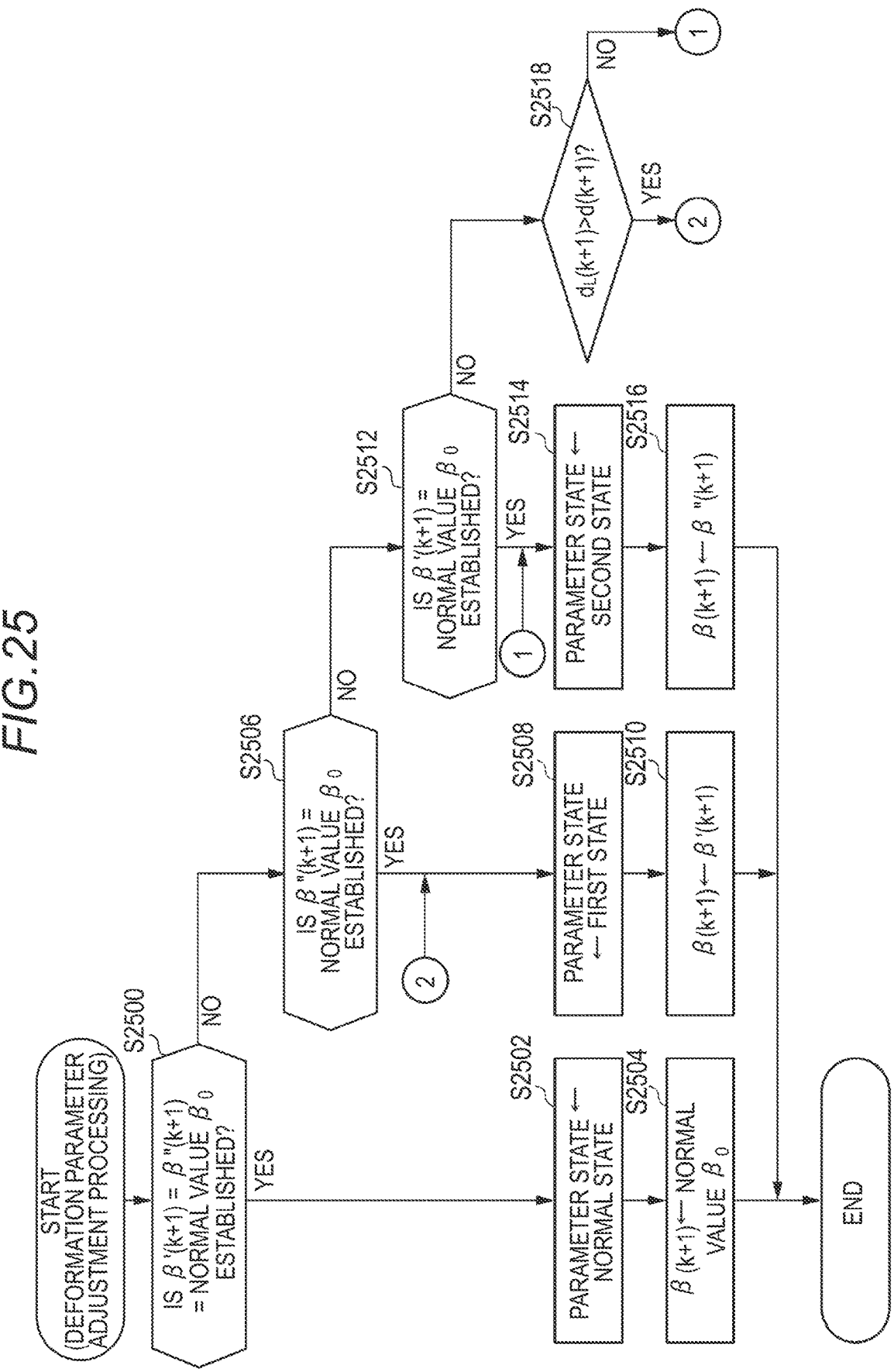
FIG. 25 is a schematic flowchart illustrating deformation parameter adjustment processing (step S2106) of a deformation parameter adjustment unit.

FIG. 25 is a schematic flowchart illustrating the deformation parameter adjustment processing of the deformation parameter adjustment unit 1453 (step S2106).

In step S2500, the deformation parameter adjustment unit 1453 determines whether or not both of the first value β'(k+1) obtained in step S2102 and the second value β"(k+1) obtained in step S2104 are the normal value $β_0$. In a case where a determination result is "YES", the process proceeds to step S2502, and in the other case, the process proceeds to step S2506.

In step S2502, the deformation parameter adjustment unit 1453 sets a parameter state to a "normal state". The normal state corresponds to a state in which the value of the deformation parameter A1 is the normal value $β_0$.

In step S2504, the deformation parameter adjustment unit 1453 associates the normal value $β_0$ with the value β(k+1) of the deformation parameter A1 after being updated. In this case, the adjustment of the deformation parameter adjustment unit 1453 is not attained.

In step S2506, the deformation parameter adjustment unit 1453 determines whether or not the second value β"(k+1) obtained in step S2104 is the normal value $β_0$. In a case where a determination result is "YES", the process proceeds to step S2508, and in the other case, the process proceeds to step S2512.

In step S2508, the deformation parameter adjustment unit 1453 sets the parameter state to a "first state". The first state corresponds to a state in which the value of the deformation parameter A1 is the first value β'(k+1).

In step S2510, the deformation parameter adjustment unit 1453 associates the first value β'(k+1) obtained in step S2102 with the value β(k+1) of the deformation parameter A1 after being updated.

In step S2512, the deformation parameter adjustment unit 1453 determines whether or not the first value β'(k+1) obtained in step S2102 is the normal value $β_0$. In a case where a determination result is "YES", the process proceeds to step S2514, and in the other case (that is, in a case where both of the values are not the normal value), the process proceeds to step S2518.

In step S2514, the deformation parameter adjustment unit 1453 sets the parameter state to a "second state". The second state corresponds to a state in which the value of the deformation parameter A1 is the second value β"(k+1). Hereinafter, in the second state, a specific object according to the second value β"(k+1) may be referred to as a "specific object of an attentive target".

In step S2516, the deformation parameter adjustment unit 1453 associates the second value β"(k+1) obtained in step S2104 with the value β(k+1) of the deformation parameter A1 after being updated.

In step S2518, the deformation parameter adjustment unit 1453 determines whether or not $d_L(k+1)>d(k+1)$, on the basis of the distance $d_L(k+1)$ between the projection vector V' of the virtual camera 60 and the specific object in the horizontal direction, and the interpolation distance d(k+1) obtained in step S2306. Note that, in the case of the value of the deformation parameter A1 in which the first value β'(k+1) obtained in step S2102 is associated with the specific position (refer to step S2302), the interpolation distance d(k+1) is 0. Similarly, in the case of the value of the deformation parameter A1 in which the second value β"(k+1) obtained in step S2104 is associated with the specific object (refer to step S2404), the distance $d_L(k+1)$ in the horizontal direction is 0. In a case where a determination result is "YES", the process proceeds to step S2508, and in the other case, the process proceeds to step S2514.

As described above, according to the processing illustrated in FIG. 25, in a case where both of the first value β'(k+1) obtained in step S2102 and the second value β"(k+1) obtained in step S2104 are not the normal value $β_0$ (for example, in a case where the specific position and the position of the specific object simultaneously belong to the region within the viewing angle), one of the first value β'(k+1) and the second value β"(k+1) is selected in a mode where the smaller of the distance d(k+1) and the distance $d_L(k+1)$ in the horizontal direction, described above, takes a priority. Accordingly, when the specific object is positioned in the center portion of the region of the field object within the viewing angle of the virtual camera 60, the value of the deformation parameter A1 associated with the specific object is preferentially used.

Here, in a modification example, in a case where both of the first value β'(k+1) obtained in step S2102 and the second value β"(k+1) obtained in step S2104 are not the normal value $β_0$ (for example, in a case where the specific position and the position of the specific object simultaneously belong to the region within the viewing angle), an average value or a weighted synthesis value may be used. In the case of weighting, for example, a synthesis value $β_{com}(k+1)$ after being updated may be calculated as described below, by using weighted coefficients w1 and w2.

$$β_{com}(k+1)=\{w1×β'(k+1)+w2×β"(k+1)\}/(w1+w2)$$

In this case, for example, the weighted coefficients w1 and w2 may be as described below.

$$w1=1/d(k+1), \text{ here, when } d(k+1)=0, β_{com}(k+1)=β'(k+1)$$

$$w2=1/d_L(k+1), \text{ here, when } d_L(k+1)=0, β_{com}(k+1)=β"(k+1)$$

Figure 26:
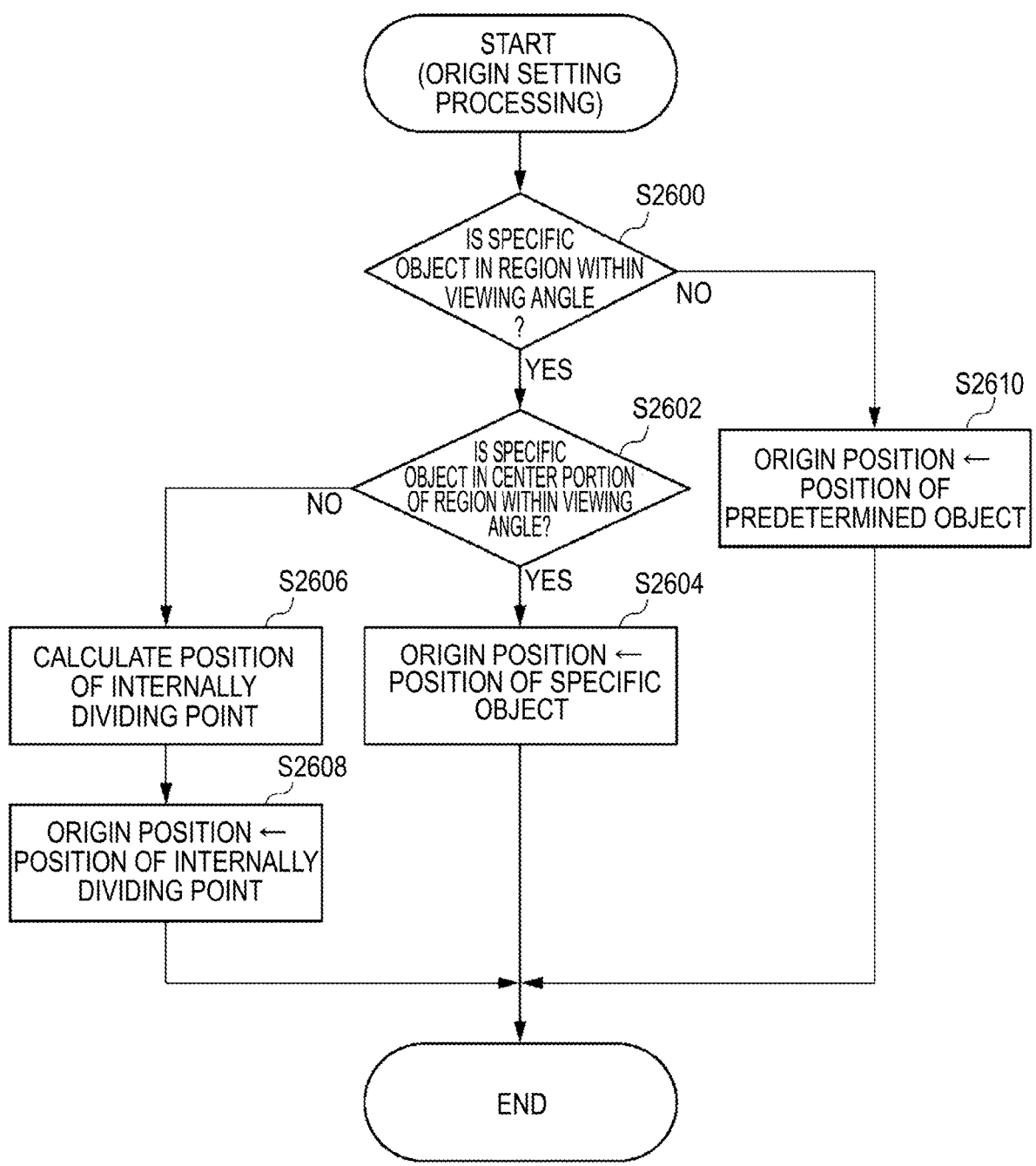
FIG. 26 is a schematic flowchart illustrating an example of origin setting processing (step S2108) of an origin setting processing unit.
Figure 26A:
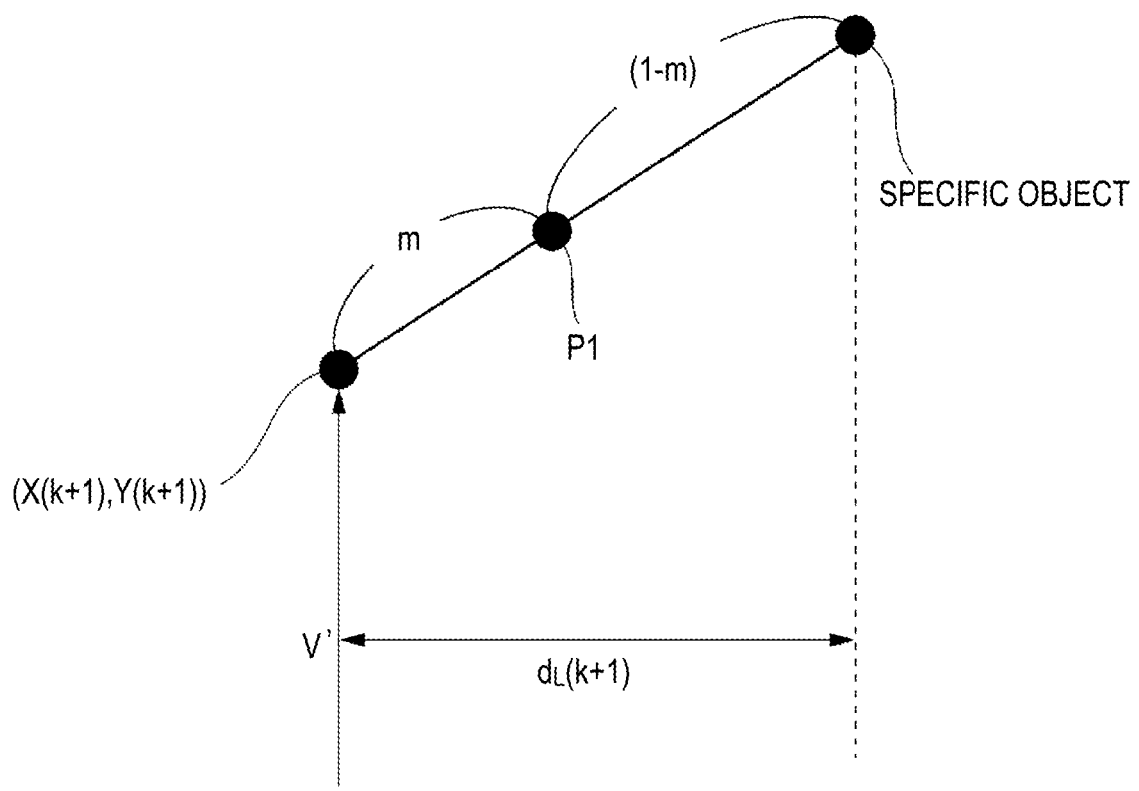
FIG. 26A is an explanatory diagram of an internally dividing point Pi.

FIG. 26 is a schematic flowchart illustrating an example of the origin setting processing of the origin setting processing unit 1454 (step S2108). FIG. 26A is an explanatory diagram of an internally dividing point Pi.

In step S2600, the origin setting processing unit 1454 determines whether or not the specific object is positioned in the region of the field object within the viewing angle of the virtual camera 60. Note that, a determination method may be the same as that in step S2400 of FIG. 24 described above. In a case where a determination result is "YES", the process proceeds to step S2602, and in the other case, the process proceeds to step S2610. Note that, hereinafter, the specific object indicates a specific object that is determined to be positioned in the region of the field object within the viewing angle of the virtual camera 60 in step S2600.

In step S2602, the origin setting processing unit 1454 determines whether or not the specific object is positioned in the center portion of the region of the field object within the viewing angle of the virtual camera 60. Note that, a determination method may be the same as that in step S2402 of FIG. 24 described above. In a case where a determination result is "YES", the process proceeds to step S2604, and in the other case, the process proceeds to step S2606.

In step S2604, the origin setting processing unit 1454 sets the position of the specific object to the origin position. That is, in the field surface 70 (the field surface 70 onto which the field image is projected), the origin setting processing unit 1454 associates the origin O of the local coordinate system with the position of the specific object. Accordingly, in this case, the origin O of the function F1 that is used in the bending deformation is associated with the position of the specific object. Here, it is not necessary that the origin O of the function F1 that is used in the bending deformation is exactly coincident with the position of the specific object, and the origin O may be in the vicinity of the position.

In step S2606, the origin setting processing unit 1454 calculates each of the values (X(k+1), Y(k+1)) of the position parameters (X, Y) after being updated, and a position ($X_{Pi}$(k+1), $Y_{Pi}$(k+1)) of the internally dividing point Pi with respect to the position of the specific object, on the basis of the distance $d_L$(k+1) between the projection vector V' of the virtual camera 60 and the specific object in the horizontal direction. As illustrated in FIG. 26A, the internally dividing point Pi is a position at the time of internally dividing a region between each of the values (X(k+1), Y(k+1)) of the position parameters (X, Y) after being updated and the position of the specific object by m:(1-m). At this time, m is close to 0 as the distance $d_L$(k+1) in the horizontal direction increases, and when the distance $d_L$(k+1) in the horizontal direction is L1/2, m=0. Note that, when m=0, the internally dividing point Pi is coincident with each of the values (X(k+1), Y(k+1)) of the position parameters (X, Y) after being updated. L1 is as described above, and is the maximum value of the distance $d_L$(k+1) in the horizontal direction that can be taken when the specific object is positioned in the region of the field object within the viewing angle of the virtual camera 60. In addition, m is close to 1 as the distance $d_L$(k+1) in the horizontal direction decreases, and when the distance $d_L$(k+1) in the horizontal direction is 0, m=1. Note that, when m=1, the internally dividing point Pi is coincident with the position of the specific object.

In step S2608, the origin setting processing unit 1454 sets the position of the internally dividing point Pi that is obtained in step S2606 to the origin position. That is, in the field surface 70 (the field surface 70 onto which the field image is projected), the origin setting processing unit 1454 associates the origin O of the local coordinate system with the position ($X_{Pi}$(k+1), $Y_{Pi}$(k+1)) of the internally dividing point Pi that is obtained in step S2606. Accordingly, in this case, the origin O of the function F1 that is used in the bending deformation is associated with the position ($X_{Pi}$(k+1), $Y_{Pi}$(k+1)) of the internally dividing point Pi. Here, it is not necessary that the origin O of the function F1 that is used in the bending deformation is exactly coincident with the position ($X_{Pi}$(k+1), $Y_{Pi}$(k+1)) of the internally dividing point Pi, and the origin O may be in the vicinity of the position.

In step S2610, the origin setting processing unit 1454 sets the position (u(k+1), v(k+1)) of the predetermined object after being moved to the origin position. That is, in the field surface 70 (the field surface 70 onto which the field image is projected), the origin setting processing unit 1454 associates the origin O of the local coordinate system with the position (u(k+1), v(k+1)) of the predetermined object after being moved. Accordingly, in this case, the origin O of the function F1 that is used in the bending deformation is associated with the position (u(k+1), v(k+1)) of the predetermined object after being moved. Here, it is not necessary that the origin O of the function F1 that is used in the bending deformation is exactly coincident with the position (u(k+1), v(k+1)) of the predetermined object after being moved, and the origin O may be in the vicinity of the position.

As described above, according to the processing illustrated in FIG. 26, in a case where it is determined that the specific object is positioned in the region of the field object within the viewing angle of the virtual camera 60, the origin position is set on the basis of the position of the specific object. Accordingly, the entire specific object is likely to be visible, and the specific object can be effectively emphasized. For this reason, it is preferable that the specific object is an object that the user is allowed to watch.

In addition, according to the processing illustrated in FIG. 26, in a case where it is determined that the specific object is not positioned in the region of the field object within the viewing angle of the virtual camera 60, the origin position is set on the basis of the position (u(k+1), v(k+1)) of the predetermined object. Accordingly, the entire predetermined object is likely to be visible, and the predetermined object can be effectively emphasized. In addition, in a case where a state in which it is determined that the specific object is not positioned in the region of the field object within the viewing angle of the virtual camera 60 is transitioned to a state in which it is determined that the specific object is positioned in the region of the field object within the viewing angle of the virtual camera 60, the origin position is changed toward the position of the specific object from the position of the predetermined object, and thus, a change (an effect) in the appearance of the field image due to the change described above may occur. Accordingly, the specific object can be effectively emphasized.

In addition, according to the processing illustrated in FIG. 26, in a processing cycle where the state in which it is determined that the specific object is not positioned in the region of the field object within the viewing angle of the virtual camera 60 is transitioned to the state in which it is determined that the specific object is positioned in the region of the field object within the viewing angle of the virtual camera 60, the origin position is not rapidly changed to the position of the specific object from the position of the predetermined object. That is, in a case where it is determined that the specific object is positioned in the region of the field object within the viewing angle of the virtual camera 60, after that, the origin position is gradually changed to the position of the specific object from the position of the predetermined object as the interpolation distance d(k+1) decreases (refer to step S2608). Accordingly, a sense of discomfort that can be felt by the user due to the change can be reduced, compared to a case where the change in the origin position as described above is attained by a comparatively small number of processing cycles (for example, one processing cycle).

Figure 27:
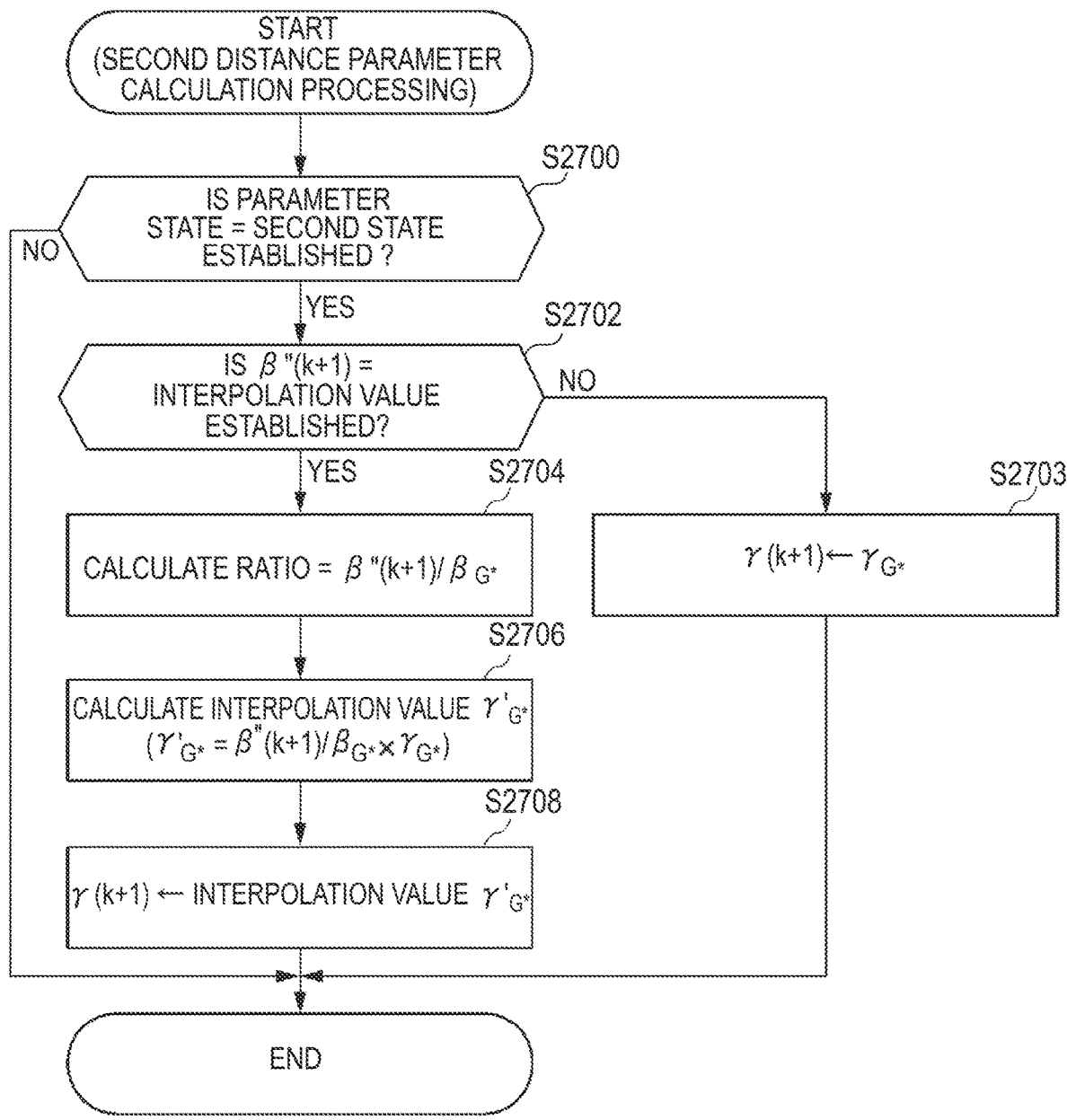
FIG. 27 is a schematic flowchart illustrating an example of second distance parameter calculation processing (step S1623)

FIG. 27 is a schematic flowchart illustrating an example of the second distance parameter calculation processing (step S1623).

In step S2700, the second distance change unit 14212 determines whether or not the parameter state is the second state. As described above, the second state corresponds to a state in which the value β(k+1) of the deformation parameter A1 after being updated is the second value β"(k+1). In a case where a determination result is "YES", the process proceeds to step S2702, and in the other case, the process ends as it is. Note that, in a case where the process ends as it is, the value of the distance parameter A2 is set by the value calculated by the first distance change unit 14211 described above (step S1608).

In step S2702, the second distance change unit 14212 determines whether or not the second value β"(k+1) is the interpolation value calculated by using the value of the deformation parameter A1 associated with the specific object of the attentive target (the interpolation value associated in step S2408). In a case where a determination result is "YES", the process proceeds to step S2704, and in the other case (that is, in a case where the second value β"(k+1) is the value of the deformation parameter A1 associated with the specific object of the attentive target), the process proceeds to step S2703.

In step S2703, the second distance change unit 14212 associates a value (a regular value) $\gamma_{G*}$ of the distance parameter A2 associated with the specific object of the attentive target with the value γ(k+1) of the distance parameter A2 after being updated. In this case, the value (the regular value) $\gamma_{G*}$ of the distance parameter A2 associated with the specific object of the attentive target is associated with the value γ(k+1) of the distance parameter A2 after being updated, instead of the value calculated by the first distance change unit 14211 described above (step S1608). In this case, the update reflection unit 1424 positions the virtual camera 60 in the global coordinate system, on the basis of each of the values (X(k+1), Y(k+1), γ(k+1), θ(k+1), ψ(k+1)) of various parameters after being updated that are obtained in step S1606, step S1610 to step S1612, and step S1623 (refer to step S1624).

In step S2704, the second distance change unit 14212 calculates a ratio between the second value β"(k+1) and the value of the deformation parameter A1 associated with the specific object of the attentive target. That is, in a case where the value of the deformation parameter A1 associated with the specific object of the attentive target is set to $\beta_{G*}$, the ratio=β"(k+1)/$\beta_{G*}$ is calculated. Note that, in the deformation parameter data 13B of FIG. 13, in a case where the specific object of the attentive target is the specific object G1, the ratio=β"(k+1)/$\beta_{G1}$ is calculated.

Here, the ratio=β"(k+1)/$\beta_{G*}$ represents the closeness of the position of the specific object of the attentive target with respect to the center portion of the region within the viewing angle. When β"(k+1)/$\beta_{G*}$=1, the specific object of the attentive target is close to the end portion of the region within the viewing angle (the end portion in the horizontal direction) as β"(k+1)/$\beta_{G*}$ decreases corresponding to a state in which the specific object of the attentive target is positioned in the center portion of the region within the viewing angle.

In step S2706, the second distance change unit 14212 calculates an interpolation value $\gamma'_{G*}$, on the basis of the ratio=β"(k+1)/$\beta_{G*}$ obtained in step S2704. Specifically, in a case where the value (the regular value) of the distance parameter A2 associated with the specific object of the attentive target is set to $\gamma_{G*}$, the interpolation value $\gamma'_{G*}$ may be as described below.

$$\gamma'_{G*} = \beta''(k+1)/\beta_{G*} \times \gamma_{G*}$$

In this case, the interpolation value $\gamma'_{G*}$ is close to the value $\gamma_{G*}$ associated with the specific object of the attentive target as β"(k+1)/$\beta_{G*}$ is close to 1 (that is, as the specific object of the attentive target is close to the center portion of the region within the viewing angle). Note that, in the distance parameter data 14B of FIG. 14, in a case where the specific object of the attentive target is the specific object G1, the value $\gamma_{G*} = \gamma_{G1}$.

In step S2708, the second distance change unit 14212 associates the interpolation value $\gamma'_{G*}$ obtained in step S2706 with the value γ(k+1) of the distance parameter A2 after being updated. In this case, the value calculated by the second distance change unit 14212 is associated with the value of the distance parameter A2, instead of the value calculated by the first distance change unit 14211 described above (step S1608). In this case, the update reflection unit 1424 positions the virtual camera 60 in the global coordinate system, on the basis of each of the values (X(k+1), Y(k+1), γ(k+1), ↓(k+1), ψ(k+1)) of various parameters after being updated that are obtained in step S1606, step S1610 to step S1612, and step S1623 (refer to step S1624).

Note that, in the processing illustrated in FIG. 27, the regular value $\gamma_{G*}$ to the interpolation value $\gamma'_{G*}$ are calculated in accordance with the ratio=β"(k+1)/$\beta_{G*}$, but the invention is not limited thereto. For example, the regular value $\gamma_{G*}$ to the interpolation value $\gamma'_{G*}$ may be calculated in accordance with a ratio between the distance $d_L$(k+1) and L1/2 in the horizontal direction described above. The details are as described below.

$$\gamma'_{G*} = d_L(k+1)/L1/2 \times \gamma_{G*}$$

In addition, in the processing illustrated in FIG. 27, in a case where it is determined that the parameter state is the second state in step S2700, the process proceeds to step S2702, but the invention is not limited thereto. For example, in step S2700, it is determined whether or not the specific object of the attentive target is positioned in the region within the viewing angle, and in a case where it is determined that the specific object of the attentive target is positioned in the region within the viewing angle, the process may proceed to step S2702.

In addition, in the processing illustrated in FIG. 27, for example, in a case where the specific position and the position of the specific object simultaneously belong to the region within the viewing angle, the value of the distance parameter A2 can be comparatively greatly changed when the parameter state is transitioned to the second state from the first state. Such a comparatively great change may be suitably corrected (may be filtered such that the change decreases). Accordingly, a sense of discomfort that can be felt by the user due to such a comparatively great change (and a steep change in the field image associated therewith), and the like can be reduced. For example, in a case where the parameter state is transitioned to the second state from the first state, the value γ(k+1) of the distance parameter A2 after being updated may be further corrected in a direction close to the value γ(k) of the distance parameter A2 before being updated when a difference between the value γ(k+1) of the distance parameter A2 after being updated and the value γ(k) of the distance parameter A2 before being updated is greater than a predetermined threshold value. In addition, in a case where the value γ(k) of the distance parameter A2 before being updated is greater than the value γ(k) of the distance parameter A2 before being updated, the value γ(k) of the distance parameter A2 before being updated may be maintained such that the value γ(k+1) of the distance parameter A2 after being updated is not greater than the value γ(k) of the distance parameter A2 before being updated. In this case, a sense of discomfort that can be felt by the user due to an unstable mode in which the value of the distance parameter decreases, increases, and decreases again (and an unstable change in the field image associated therewith), and the like can be reduced.

Next, an example of an applied scene of the operation example described with reference to FIG. 16 to FIG. 27 will be described with reference to FIG. 28 to FIG. 29C.

Figure 28:
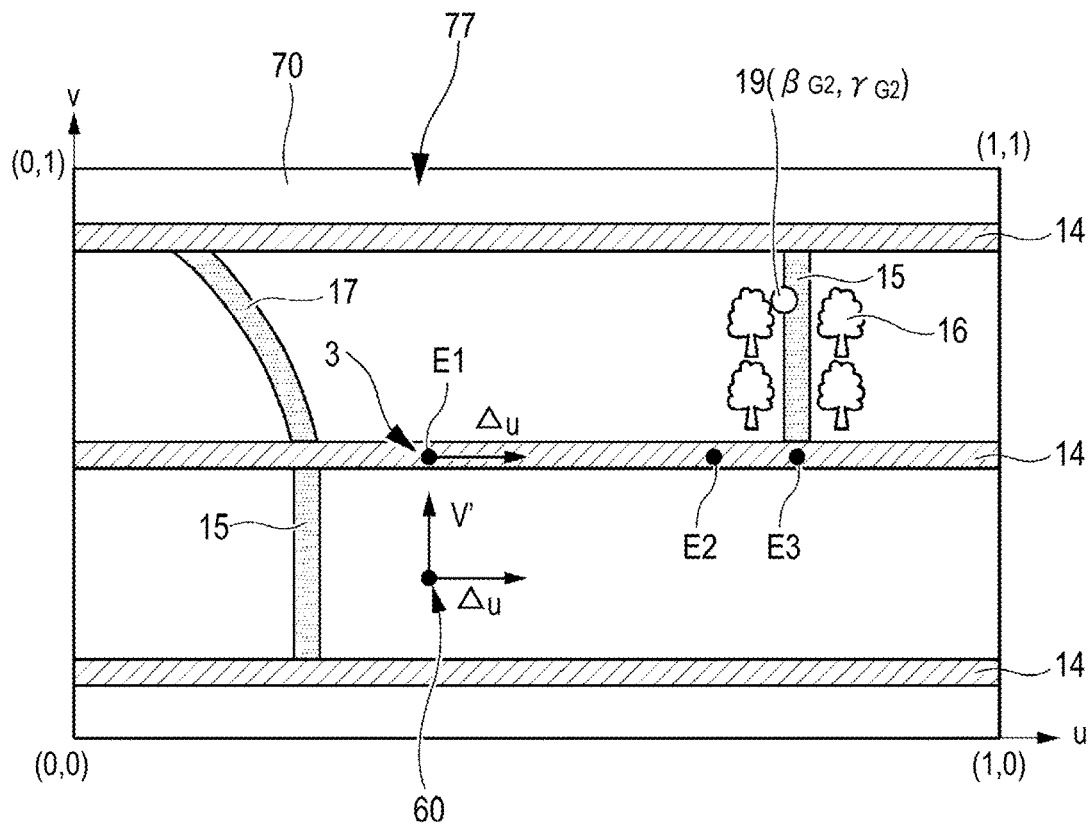
FIG. 28 is a plan view of the field object.
Figure 29A:
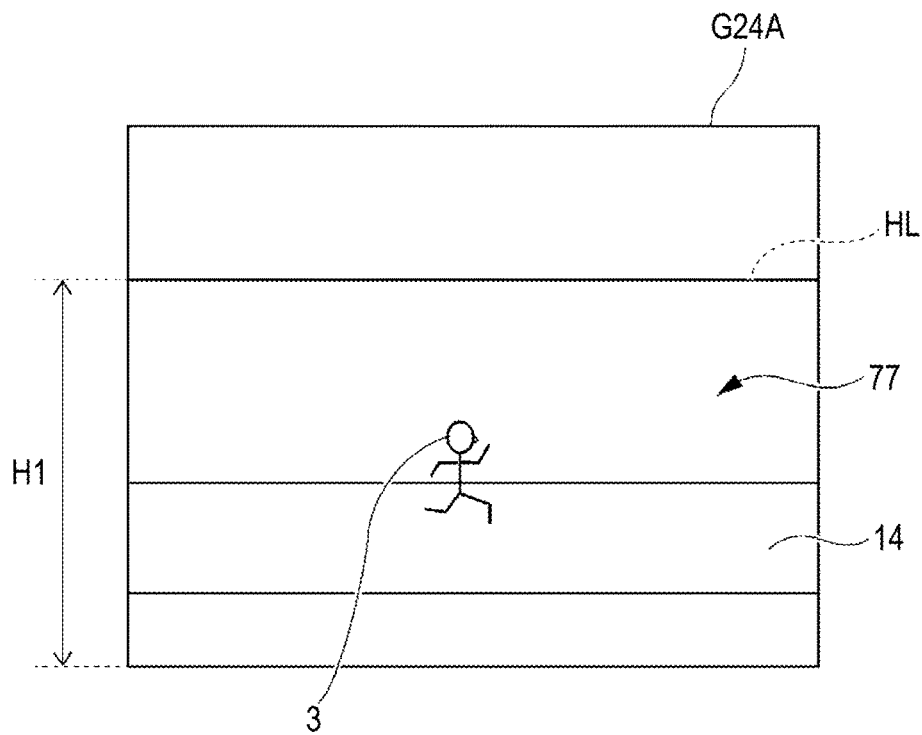
FIG. 29A is a diagram illustrating an example of a field image according to a position E1.
Figure 29B:
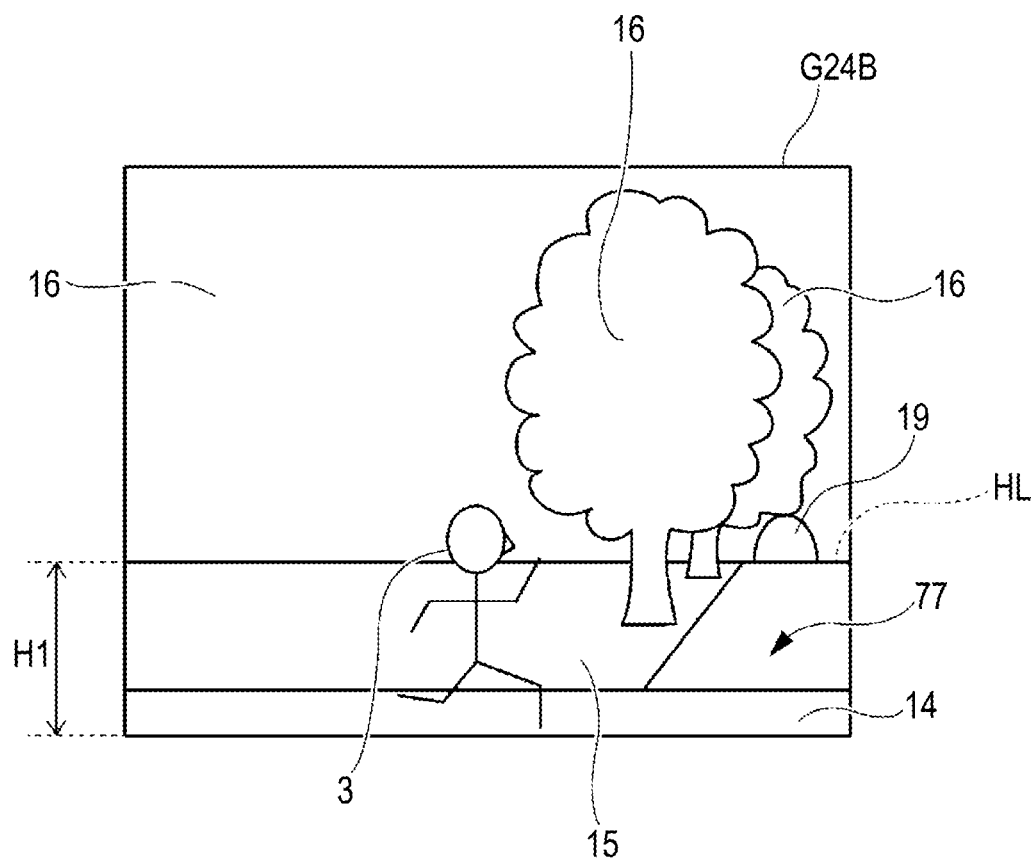
FIG. 29B is a diagram illustrating an example of a field image according to a position E2.
Figure 29C:
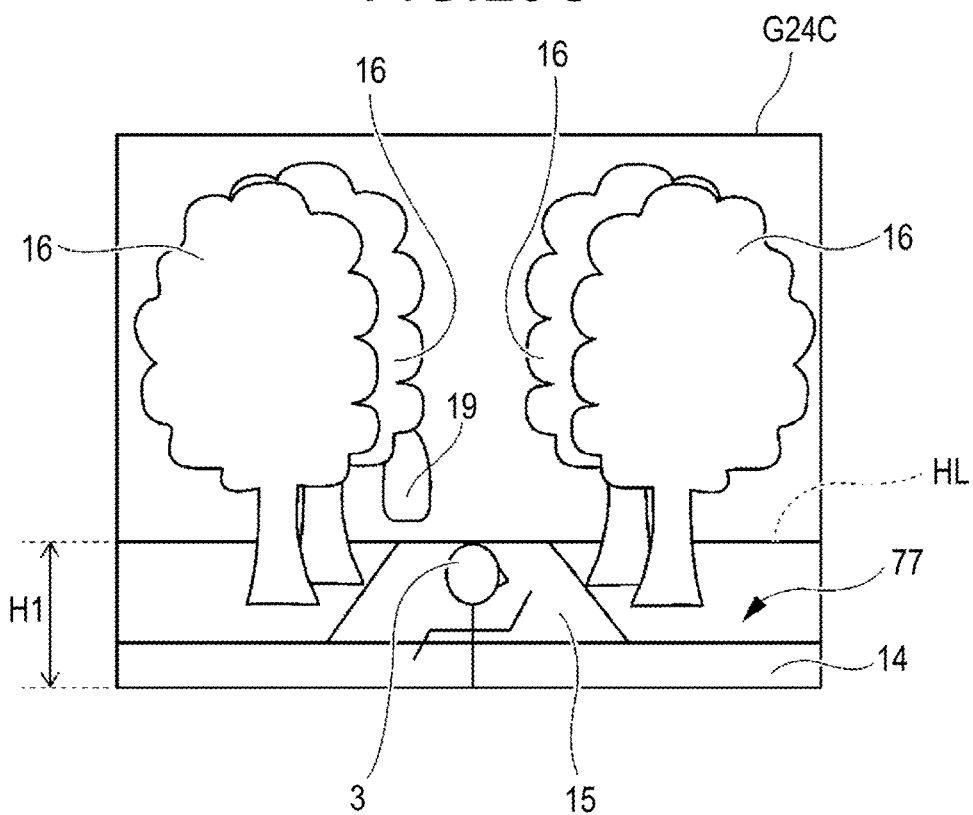
FIG. 29C is a diagram illustrating an example of a field image according to a position E3.

FIG. 28 to FIG. 29C are explanatory diagrams of the applied scene of the operation example described with reference to FIG. 16 to FIG. 28, FIG. 28 is a plan view of the field object 77, FIG. 29A illustrates an example of a field image G24A according to a position E1, and FIG. 29B illustrates an example of a field image G24B according to a position E2. FIG. 29C illustrates an example of a field image G24C according to a position E3. In FIG. 28, the field object 77 is illustrated in an expression in which the field image is projected onto the field surface 70 in the regular state. In FIG. 28, the position E1 to the position E3 are exemplified, the position E3 corresponds to a position in which the horizontal passage 14 intersects with the vertical passage 15, and a plurality of street plant objects 16 that are the second object are arranged on both sides of the vertical passage 15. The plurality of street plant objects 16 are erected on the field object 77, and extend in the z direction. In addition, in the vertical passage 15, a floating object 19 such as a balloon is arranged. Here, the floating object 19 is set to the specific object G2. In FIG. 28, the floating object 19 is arranged on a side farther away from the position E3 than the street plant object 16 in the v direction. The position E2 corresponds to a position in front of the position E3 from the position E1, and is a position in which the distance & between the projection vector V' of the virtual camera 60 and the specific object in the horizontal direction is L1/2 or less, as described above, but is significantly greater than 0. Note that, as described above, L1 is the distance of the region of the field object 77 within the viewing angle of the virtual camera 60 in the horizontal direction. Note that, in FIG. 28, as an example, the plurality of street plant objects 16 are linearly arranged along the v direction, but may be arranged in zigzags in a mode of being slightly offset in a u direction, may be arranged only one side of the vertical passage 15, or may be arranged in two or more rows.

Here, a drawing function when the first object 3 is moved to the position E3 from the position E1 on the field object 77 the will be described. Note that, such a movement may be attained by the manipulation of the user, or may be attained as the output of a demonstration image. Note that, the positions E1 and E2 are not the specific position, there is no specific position between the position E1 and the position E3, and the positions E1 and E2 are not positioned within an interpolation processing range according to another specific position or another specific object. In addition, as illustrated in FIG. 13 and FIG. 14, the value $\beta_{G2}$ of the deformation parameter A1 and the value $\gamma_{G2}$ of the distance parameter A2 are respectively associated with the floating object 19 (the specific object G2).

Each of the values of the position parameters (X, Y) of the virtual camera 60 in a state where the first object 3 is positioned in the position E1 corresponds to the position of the first object 3, the value of the direction parameter θ of the virtual camera 60 is set such that the normal value $\theta_0$, that is, the projection vector V' (refer to FIG. 11) is perpendicular to the movement direction of the first object 3 (in this case, the u direction). At this time, the first object 3 may be positioned in the region of the field object 77 within the viewing angle of the virtual camera 60, and the field image G24A illustrated in FIG. 29A may be drawn. Note that, in this case, the horizon line HL has a height according to the normal value $\beta_0$ of the deformation parameter A1, and the first object 3 and the like have a display size according to the normal value $\beta_0$ of the distance parameter A2.

In a case where the first object 3 is moved toward the position E3 from the position E1 along the horizontal passage 14 (the u direction) by a movement amount Δu, for each processing cycle, each of the values of the position parameters (X, Y) of the virtual camera 60 is moved along the u direction by the movement amount Δu, for each of the processing cycles. Note that, during this time, the value of the direction parameter θ of the virtual camera 60 is fixed.

Each of the values of the position parameters (X, Y) of the virtual camera 60 in a state where the first object 3 reaches the position E2 corresponds to a position of the first object 3 that reaches the position E2, and the value of the direction parameter θ is the same as that in the state where the first object 3 is positioned in the position E1. At this time, the floating object 19 may be positioned in the end portion (the end portion on the right side) of the region of the field object 77 within the viewing angle of the virtual camera 60, and the field image G24B illustrated in FIG. 29B may be drawn. Note that, in this case, the horizon line HL has a height according to the second value β" of the deformation parameter A1 (the value β of the deformation parameter A1 after being updated that is obtained in the second deformation parameter calculation processing (step S2104)), and the first object 3 and the like have a display size according to the value $\gamma'_{G*}$ (the interpolation value $\gamma'_{G*}$) of the distance parameter A2 that is calculated by the second distance change unit 14212. Note that, the interpolation value $\gamma'_{G*}$ is less than the normal value $\gamma_0$, and thus, as illustrated in FIG. 29B, the display size of the first object 3 is greater than that of the field image G24A illustrated in FIG. 29A.

Each of the values of the position parameters (X, Y) of the virtual camera 60 in a state where the first object 3 reaches the position E3 corresponds to the position of the first object 3 that reaches the position E3, and the value of the direction parameter θ is the same as that in the state where the first object 3 is positioned in the position E1. At this time, the floating object 19 may be positioned in the center portion of the region of the field object 77 within the viewing angle of the virtual camera 60, and the field image G24C illustrated in FIG. 29C may be drawn. Note that, in this case, the horizon line HL has a height according to the value $\beta_{G2}$ of the deformation parameter A1 (the value of the deformation parameter A1 associated with the floating object 19), and has a display size according to the value $\gamma_{G2}$ of the distance parameter A2 (the value of the distance parameter A2 associated with the floating object 19).

Here, as described above, the value $\beta_{G2}$ of the deformation parameter A1 is greater than the normal value $\beta_0$. Accordingly, in the field image G24C, the deformation degree of the bending deformation of the field object 77 is greater than that in the field image G24A. For this reason, as schematically illustrated in FIG. 29A and FIG. 29C, the position of the horizon line HL in the image is significantly changed. In addition, the value $γ_{G2}$ of the distance parameter A2 is greater than the normal value $γ_0$. Accordingly, in the field image G24C, the display size of the floating object 19 increases.

Figure 29D:
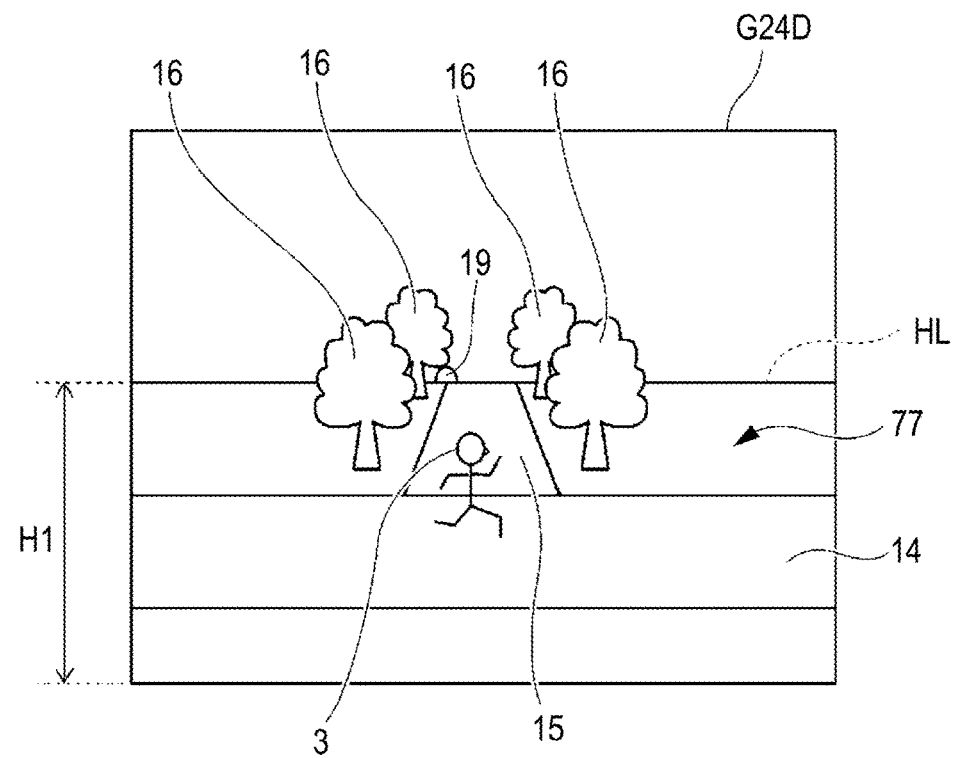
FIG. 29D is a diagram illustrating an example of the field image according to the position E3 according to another operation example.

Here, FIG. 29D illustrates an example of a field image G24D according to the position E3 according to another operation example. In another operation example illustrated in FIG. 29D, unlike the operation example described above, the value of the distance parameter A2 associated with the position E3 is the same normal value $γ_0$ as the value of the distance parameter A2 associated with the position E1. In this case, the height H1 of the horizon line HL is changed between the field image G24A and the field image G24D, but the display size of the first object 3 and the like is the same. Accordingly, the display size of the floating object 19 positioned on the deeper side from the street plant object 16 is comparatively small, and the floating object 19 is less likely to be emphasized.

In contrast, according to the operation example described with reference to FIG. 16 to FIG. 28, as described above, in the field image G24C, the display size of the floating object 19 comparatively increases, and thus, the floating object 19 can be effectively emphasized. Accordingly, the user can be attracted by the floating object 19.

In addition, in another operation example of drawing the field image G24D as illustrated in FIG. 29D, various expressions within the virtual space viewed from the virtual camera 60 can be attained, but in a case where a change amount of the deformation degree (a change amount of the height H1 of the horizon line HL) comparatively increases, the user may feel a sense of discomfort, compared to an operation example of a comparative example (not illustrated) in which the value of the deformation parameter A1 is set to be perennially constant.

In contrast, according to the operation example described with reference to FIG. 16 to FIG. 28, the display size of the first object 3 and the like is also changed while the height H1 of the horizon line HL is changed between the field image G24A and the field image G24B. Accordingly, a sense of discomfort that can be felt by the user due to a change in the deformation degree (a change in the height H1 of the horizon line HL) can be reduced. That is, a change in the display size of the first object 3 and the like is likely to be noticeable for the user, and is impressive, and thus, a sense of discomfort that can be caused by the change in the height H1 of the horizon line HL disappears. As described above, a sense of discomfort that can be caused by the change in the deformation degree (the change in the height H1 of the horizon line HL) can be reduced while attaining various expressions within the virtual space viewed from the virtual camera 60, by making the associated value of the deformation parameter A1 different, and by making the associated value of the distance parameter A2 different, between the position E1 and the position E3. Regarding such an effect, a sense of discomfort can be further reduced by having a predetermined relationship between a change in the value of the distance parameter A2 and a change in the value of the deformation parameter A1. For example, in a case where the change in the value of the distance parameter A2 is steep, a condition is obtained in which a sense of discomfort can be reduced even in a case where the change in the value of the deformation parameter A1 is steep.

In addition, a transition mode of the field image can be novel, and the attractiveness of the game can also be increased, by making the associated value of the deformation parameter A1 different, and by making the associated value of the distance parameter A2 different, between the position E1 and the position E3. In addition, the presence of the vertical passage 15 can be emphasized, and the vertical passage 15 or the second object (for example, the street plant object 16) that is arranged around the vertical passage 15 can be emphasized, along with the floating object 19 that is the specific object. Such an effect is particularly remarkable in a case where the field image is output to a comparatively small screen, such as the screen of a smart phone that is the terminal device 20. In addition, a restriction such as not arranging another second object in order for the specific object to be emphasized is relaxed, and thus, a freedom degree of arranging the second object on the field object increases. In addition, from the same reason, a freedom degree of a region on the field object in which the first object is movable can also be increased.

In addition, for example, as illustrated in FIG. 28, in a case where the second objects such as the street plant objects 16 overlapping with each other along the visual line direction V are arranged, a sense of depth can be increased, and an impressive expression can be attained, by increasing the bending degree of the bending deformation of the field object 77. Accordingly, the user, for example, can also be motivated to move the first object 3 along the vertical passage 15.

Figure 29E:
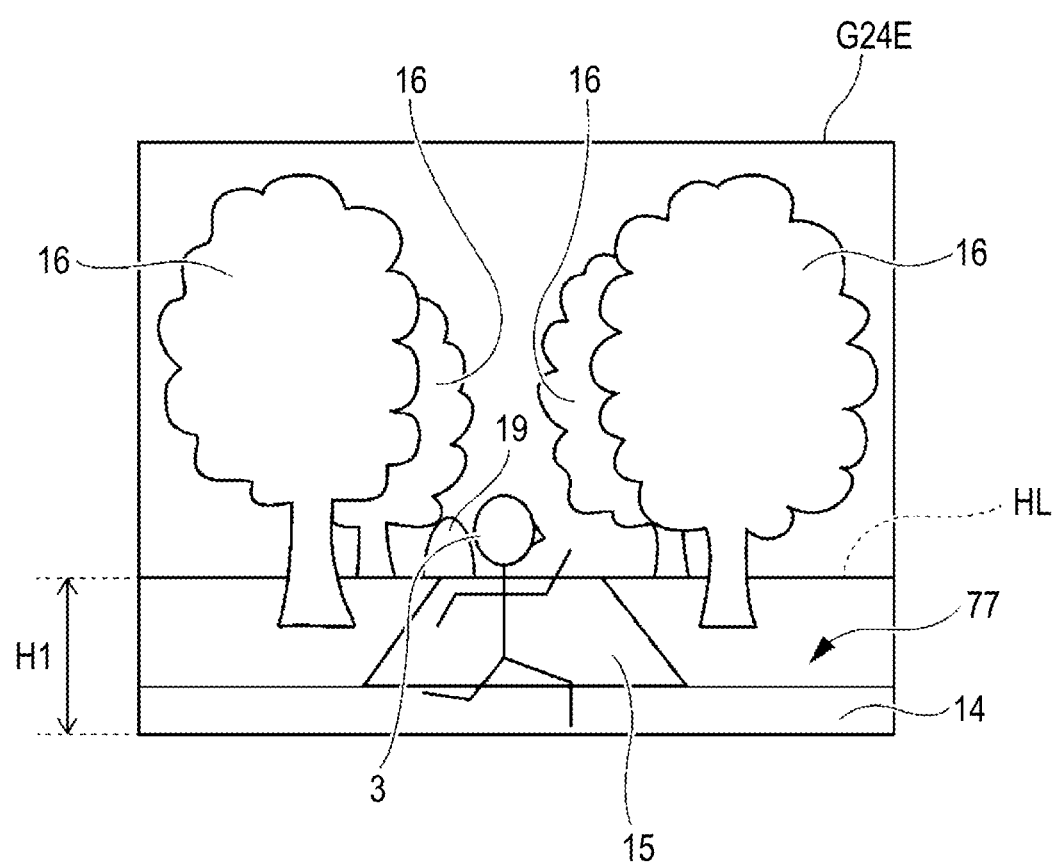
FIG. 29E is a diagram illustrating an example of the field image according to the position E3 according to still another operation example.

Here, FIG. 29E illustrates an example of a field image G24E according to the position E3 according to still another operation example. In still another operation example, unlike the operation example described above (the operation example described with reference to FIG. 16 to FIG. 28), the origin position (the position of the field object 77 in which the origin O of the local coordinate system is associated) is set to the position of the first object 3. In this case, the first object 3 is positioned in the highest position of the field object 77, and thus, the entire first object 3 is visible, but a part (the lower portion) of the floating object 19 is hidden by the deeper side from the horizon line HL. That is, the entire floating object 19 is not visible, and is comparatively less likely to be emphasized.

In contrast, according to the operation example described with reference to FIG. 16 to FIG. 28, the origin position is set to the position of the floating object 19 that is the specific object, instead of the position of the first object 3. In this case, the first object 3 is positioned in the highest position of the field object 77, and thus, the entire first object 3 is visible. Accordingly, the floating object 19 that is the specific object can be effectively emphasized, and the entire floating object 19 (for example, in a floating state) can be visible. In addition, in a case where the range of the center portion of the region of the field object 77 within the viewing angle of the virtual camera 60 is comparatively widened, a state in which the origin position is set to the position of the floating object 19 is likely to be continued for a comparatively long period of time, and thus, the floating object 19 to be notable can be effectively emphasized.

In addition, for example, even in a case where an overlap (overlapping) occurs between the specific object and the first object and/or the second object in the visual line direction V of the virtual camera 60 when the specific object is positioned in the center portion of the region within the viewing angle, as described above, the origin position is set to the position of the floating object 19, and thus, objects that are capable of overlapping with each other are easily separated from each other up and down. That is, the overlapping first object and/or second object relatively slide in a lower direction within the viewing angle with respect to the specific object, and thus, the number of objects overlapping with the specific object can be reduced. Accordingly, the floating object 19 to be notable can be effectively emphasized.

Then, in a case where the specific object is an object relevant to the manipulation of the user (for example, a movement target), the input with respect to the specific object is easily performed by emphasizing the specific object, and thus, manipulation properties are improved. In addition, the influence of the presence of the second object in front and back of the specific object can be reduced to some extent, and thus, a freedom degree of the arrangement of the second object can be increased, and various field images can be attained.

As described above, according to the operation example described with reference to FIG. 16 to FIG. 28, a deformation mode of the field object 77 can be different by changing the value of the deformation parameter A1 or the setting mode of the origin position in a case where it is determined that the specific object is not positioned in the region of the field object 77 within the viewing angle of the virtual camera 60 and in a case where it is determined that the specific object is positioned in the region of the field object 77 within the viewing angle of the virtual camera 60. Accordingly, an expression can be attained in which the specific object can be effectively emphasized, such as emphasizing the specific object while diversifying the field image.

In addition, according to the operation example described with reference to FIG. 16 to FIG. 28, the value of the deformation parameter A1 is changed in a case where the floating object 19 is positioned in the end portion of the region of the field object 77 within the viewing angle of the virtual camera 60 (an example of a second range) and in a case where the floating object 19 is positioned in the center portion of the region of the field object 77 within the viewing angle of the virtual camera 60 (an example of a first range). Accordingly, the deformation degree of the field object 77 is changed even while the floating object 19 is positioned in the region of the field object 77 within the viewing angle of the virtual camera 60, and thus, a display effect such as changing the appearance of the floating object 19 can be obtained.

In addition, according to the operation example described with reference to FIG. 16 to FIG. 28, in a case where the floating object 19 is positioned in the center portion of the region of the field object 77 within the viewing angle of the virtual camera 60 (an example of the first range) (refer to the range 771 in FIG. 11A, for the center portion), the value of the deformation parameter A1 increases, compared to a case where the floating object 19 is positioned in the end portion of the region of the field object 77 within the viewing angle of the virtual camera 60 (an example of the second range) (refer to ranges 772 and 773 in FIG. 11A, for the end portion). Accordingly, when the floating object 19 reaches a position on the field image that is comparatively easily viewed (the center portion), the floating object 19 can be more effectively emphasized by increasing a bending deformation degree of the field object 77.

In addition, according to the operation example described with reference to FIG. 16 to FIG. 28, as the position of the floating object 19 is changed to the center portion from the end portion of the region of the field object 77 within the viewing angle of the virtual camera 60, the value of the deformation parameter A1 is changed (increases) to the value $\beta_{G2}$ (an example of a first setting value) from the interpolation value (an example of a second setting value) that is greater than the normal value $\beta_0$ (an example of a predetermined setting value), through one or more interpolation values (an example of the second setting value). Accordingly, in a processing cycle in which the floating object 19 reaches the center portion of the region of the field object 77 within the viewing angle of the virtual camera 60, a gentle change is attained, compared to a case where the normal value $\beta_0$ of the deformation parameter A1 is changed to the value $\beta_{G2}$. Accordingly, a sense of discomfort that can be felt by the user due to such a change in the deformation degree can be effectively reduced. The same applies to a change to the value $\gamma_{G2}$ of the distance parameter A2 from the normal value $\gamma_0$ of the distance parameter A2, or a change in the origin position. In addition, in the case of not using the interpolation described above, a restriction such as not allowing the specific positions or the specific objects to be close to each other easily occurs in order to avoid a steep change. At this time, a freedom degree of the arrangement of the specific position or the specific object can be increased by using the interpolation described above. As a result thereof, the field image can be further diversified.

In addition, according to the operation example described with reference to FIG. 16 to FIG. 28, for example, the value of the deformation parameter A1 that is more suitable for the interpolation can be associated with each position between the position E2 and the position E3, and thus, storage capacity for deformation parameter data can be efficiently used, compared to a case where each value of the deformation parameter A1 is associated with each position on the deformation parameter data. The same applies to other parameters such as the distance parameter.

Note that, in FIG. 28, the movement of the first object 3 to the position E3 from the position E1 has been described, but the reverse may be attained in the case of the movement of the first object 3 to the position E1 from the position E3. In addition, in FIG. 28, the movement of the first object 3 to the position E3 from the position E1 has been described, but the same may be attained in the case of the movement of the first object 3 to the position E3 from the specific position.

Note that, in a case where the specific position and the position E3 (the position of the virtual camera 60 when the floating object 19 is positioned in the center portion of the region of the field object 77 within the viewing angle of the virtual camera 60) are comparatively close to each other, according to the operation example described with reference to FIG. 16 to FIG. 28, as described above, the interpolation value of the deformation parameter A1 or the distance parameter A2 that is calculated on the basis of the value of the deformation parameter A1 or the value of the distance parameter A2 associated with the specific position, and the interpolation value of the deformation parameter A1 or the distance parameter A2 that is calculated on the basis of the value of the deformation parameter A1 or the value of the distance parameter A2 associated with the specific object according to the position E3 are adjusted in accordance with whether or not $d_L(k+1) > d(k+1)$ (refer to step S2518).

In addition, in this embodiment, even in a case where two or more specific objects are positioned in the region of the field object 77 within the viewing angle of the virtual camera 60, processing may be performed in the same concept as that in a case where the specific position and the specific object are comparatively close to each other. For example, here, a case is assumed in which the specific object includes a first specific object and a second specific object, and the specific object region described above includes an object region in which both of the first specific object and the second specific object are positioned. At this time, the object region includes a first object region in which the first specific object is positioned in the center portion, a second object region in which both of the first specific object and the second specific object are not positioned in the center portion, and a third object region in which the second specific object is positioned in the center portion.

Here, the first specific object region to the third specific object region will be described with reference to FIG. 11B. In FIG. 11B, regions R4, R5, and R6 of the field object 77 falling within the viewing angle 62 of the virtual camera 60, respectively, at the time of three types of camera parameters different from each other (here, camera parameters 4, 5, and 6) are illustrated. In the camera parameters 4, 5, and 6, at least one value of each element (X, Y, A2, θ, and ψ) of the camera parameter described above is different. Accordingly, three regions illustrated in FIG. 11B are regions different from each other. Then, in three regions R4, R5, and R6 illustrated in FIG. 11B, in the region R4, a first specific object G11 is arranged in the center portion (refer to the range 771). Accordingly, in this case, the region R4 is an example of the first object region. On the other hand, in the region R5, both of the first specific object and the second object are not arranged in the center portion (refer to range 771). That is, the first specific object and the second object are arranged in the end portions on both sides of the center portion in the region R5 (refer to the ranges 772 and 773), respectively. Accordingly, in this case, the region R5 is an example of the second object region. In the region R6, a second specific object G12 is arranged in the center portion (refer to the range 771). Accordingly, in this case, the region R6 is an example of the third object region.

In this case, the interpolation value of the deformation parameter A1 or the distance parameter A2 (an example of the first setting value) that is calculated on the basis of the value of the deformation parameter A1 associated with the first specific object (and the first object region associated therewith) or the value of the distance parameter A2, and the interpolation value of the deformation parameter A1 or the distance parameter A2 (an example of the first setting value) that is calculated on the basis of the value of the deformation parameter A1 associated with the second specific object (and the third object region associated therewith) of the value of the distance parameter A2 are adjusted in accordance with whether or not $d_{L1}(k+1) > d_{L2}(k+1)$. In this case, $d_{L1}(k+1)$ is the distance of the first specific object in the horizontal direction, and $d_{L2}(k+1)$ is the distance of the second specific object in the horizontal direction. Specifically, in a case where $d_{L1}(k+1) > d_{L2}(k+1)$, the interpolation value of the deformation parameter A1 or the distance parameter A2 (an example of the second setting value) that is calculated on the basis of the value of the deformation parameter A1 associated with the second specific object or the value of the distance parameter A2 may be adopted, and in a case where $d_{L1}(k+1) \leq d_{L2}(k+1)$, the interpolation value of the deformation parameter A1 or the distance parameter A2 (an example of the second setting value) that is calculated on the basis of the value of the deformation parameter A1 associated with the first specific object or the value of the distance parameter A2 may be adopted. The same applies to the origin setting processing illustrated in FIG. 26 or the second distance parameter calculation processing illustrated in FIG. 27. Specifically, in a case where $d_{L1}(k+1) > d_{L2}(k+1)$, the second specific object functions as the "specific object" described in FIG. 26 and FIG. 27, and in a case where $d_{L1}(k+1) \leq d_{L2}(k+1)$, the first specific object functions as the "specific object" described in FIG. 26 and FIG. 27, and thus, the same effect can be attained while performing adjustment between two specific objects. Note that, such a modification example is preferable even in a case where the specific object is moved. For example, this is because in a case where the first specific object and/or the second specific object are an object that is moved, a distance between the first specific object and the second specific object is changed, and thus, the second object region described above may be generated.

In addition, even in such a case, an average value or a weighted synthesis value may be used in a case where the position of the first specific object and the position of the second specific object simultaneously belong to the region within the viewing angle. In the case of weighting, for example, when the value β of the deformation parameter A1 that is calculated on the basis of the first specific object is set to $\beta_{A1}'(k+1)$, and the value β of the deformation parameter A1 that is calculated on the basis of the second specific object is set to $\beta_{A2}''(k+1)$, a synthesis value $\beta_{com}'(k+1)$ after being updated may be calculated as described below, by using weighted coefficients w3 and w4.

$$\beta_{com}'(k+1) = \{w3 \times \beta_{A1}'(k+1) + w4 \times \beta_{A2}''(k+1)\}/(w3+w4)$$

In this case, for example, the weighted coefficients w3 and w4 may be as described below.

$$w3 = 1/d_{L1}(k+1), \text{ here, when } d_{L1}(k+1)=0,$$
$$\beta_{com}'(k+1) = \beta_{A1}'(k+1)$$

$$w4 = 1/d_{L2}(k+1), \text{ here, when } d_{L2}(k+1)=0,$$
$$\beta_{com}'(k+1) = \beta_{A2}''(k+1)$$

In addition, according to the operation example described with reference to FIG. 16 to FIG. 28, even in a case where it is determined that the specific object is not positioned in the region of the field object 77 within the viewing angle of the virtual camera 60, the value of the deformation parameter A1 and/or the value of the distance parameter A2 are changed on the basis of a relationship between the specific position and each of the values of the position parameters (X, Y) of the virtual camera 60. That is, the value of the deformation parameter A1 and/or the value of the distance parameter A2 are different in a case where it is determined that the specific object is in the position of the virtual camera 60 (an example of a first position) in which each of the values of the position parameters (X, Y) corresponds to the specific position (for example, "YES" in step S1700 of FIG. 17 and/or "YES" in step S2300 of FIG. 23) and in a case where it is determined that the specific object is in the position of the virtual camera 60 (an example of a second position) in which each of the values of the position parameters (X, Y) does not correspond to the specific position (for example, "NO" in step S1700 of FIG. 17 and/or "NO" in step S2300 of FIG. 23). Accordingly, even in a case where the specific object is not positioned in the region of the field object 77 within the viewing angle of the virtual camera 60, the field image can be further diversified. Note that, in a case where it is determined that the specific object is in the position of the virtual camera 60 (an example of the first position) in which each of the values (X(k+1), Y(k+1)) of the position parameters (X, Y) after being updated corresponds to the specific position (for example, "YES" in step S1700 of FIG. 17), the value γ(k+1) of the distance parameter A2 after being updated is set to a value associated with the specific position (step S1702), whereas in a case where it is determined that the specific object is in the position of the virtual camera 60 (an example of the second position) in which each of the values (X(k+1), Y(k+1)) of the position parameters (X, Y) after being updated does not correspond to the specific position (for example, "NO" in the step S1700 of FIG. 17), the value γ(k+1) of the distance parameter A2 after being updated is set to the normal value $\gamma_0$ or the interpolation value (step S1712 and step S1710). Accordingly, equivalently, in the case of a specific position in which both of the value of the deformation parameter A1 and the value of the distance parameter A2 are associated, such as the specific positions A and B illustrated in FIG. 13 and FIG. 14, the value $\beta(k+1)$ of the deformation parameter A1 after being updated may be set on the basis of the value $\gamma(k+1)$ of the distance parameter A2 after being updated. For example, in a case where the value $\gamma(k+1)$ of the distance parameter A2 after being updated is a value corresponding to a comparatively long distance (an example of a first distance), the value $\beta(k+1)$ of the deformation parameter A1 after being updated may be set such that the deformation degree decreases, compared to a case where the value $\gamma(k+1)$ is a value corresponding to a comparatively short distance (an example of a second distance). In addition, as another embodiment, the value of the deformation parameter A1 may be linked in accordance with the value of the distance parameter A2. For example, in a relationship of the value $\beta(k+1)$ of the deformation parameter A1 after being updated=the normal value $\beta_0 \times$ the normal value $\gamma_0$/the value $\gamma(k+1)$ of the distance parameter A2 after being updated, the value $\beta(k+1)$ of the deformation parameter A1 after being updated according to the value $\gamma(k+1)$ of the distance parameter A2 after being updated may be calculated. In this case, when the value $\gamma(k+1)$ of the distance parameter A2 after being updated is the value corresponding to the comparatively long distance (an example of the first distance), the value $\beta(k+1)$ of the deformation parameter A1 after being updated is linked such that the deformation degree decreases, compared to a case where the value $\gamma(k+1)$ is the value corresponding to the comparatively short distance (an example of the second distance). Accordingly, a storage region can be saved, compared to a case where each value of the deformation parameter A1 and each value of the distance parameter A2 are individually stored. In addition, the value of the deformation parameter A1 can be similarly changed by changing the value of the distance parameter A2 between the normal value $\gamma_0$ and the value of the distance parameter A2 defined by the distance parameter data 14A (for example, the value $\gamma_1$ and the like) through the interpolation value, as described above, and thus, a sense of discomfort due to a steep change in the values of both of the parameters can be simultaneously reduced.

Next, a modification example of the embodiment described above will be described with reference to FIG. 30.

Figure 30:
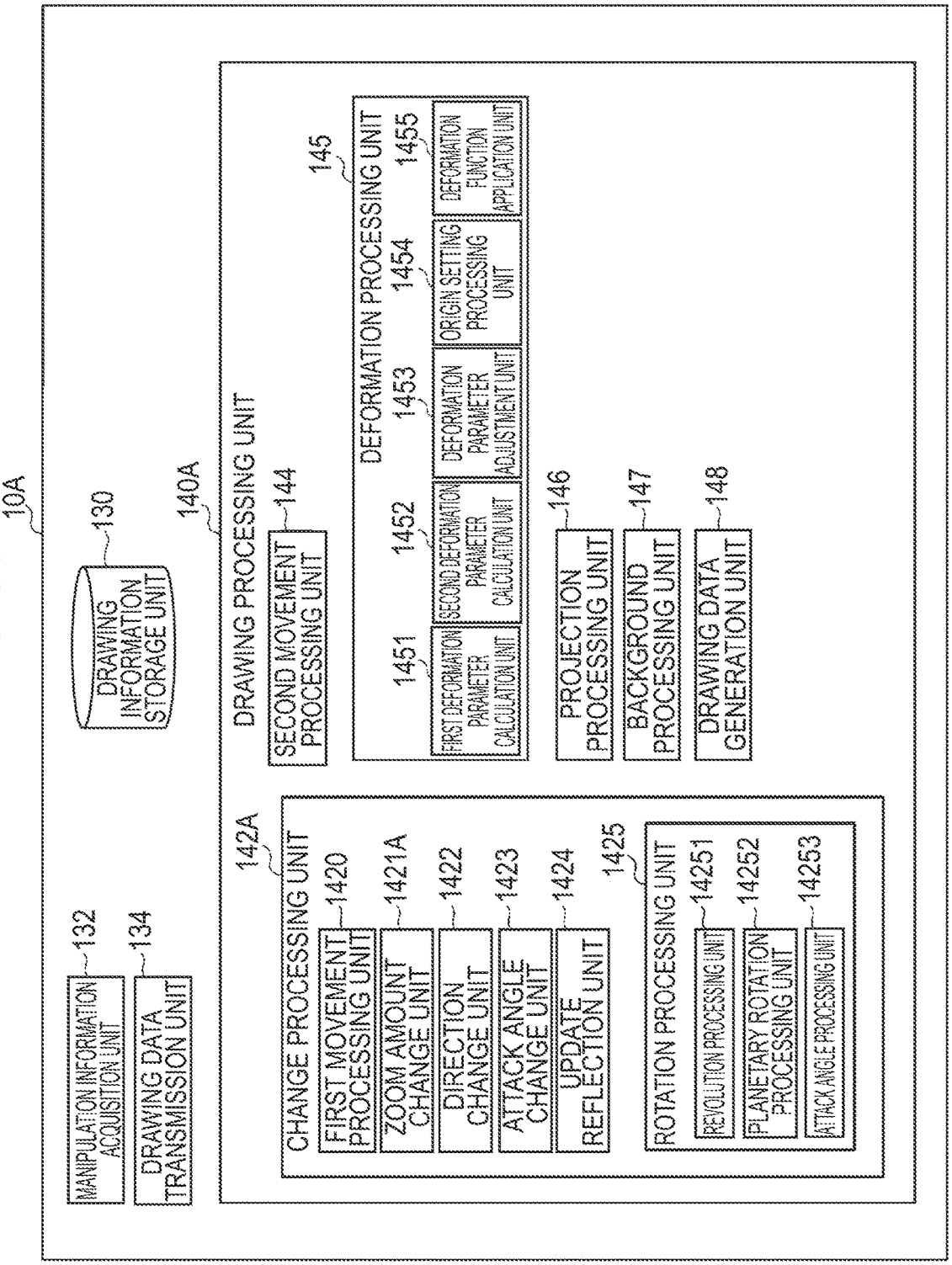
FIG. 30 is an example of a functional block diagram relevant to a drawing function of a server device according to a modification example.

FIG. 30 is an example of a functional block diagram relevant to a drawing function of a server device 10A according to a modification example. The server device 10A according to the modification example is different from the server device 10 according to the embodiment described above in that the drawing processing unit 140 is replaced with a drawing processing unit 140A.

The drawing processing unit 140A according to this modification example is different from the drawing processing unit 140 according to the embodiment described above in that the distance change unit 1421 is replaced with a zoom amount change unit 1421A (an example of a parameter value change unit).

The zoom amount change unit 1421A changes the value of the optical parameter relevant to a zoom amount of the virtual camera 60, such as a focal distance or a viewing angle. The zoom amount change unit 1421A may change the value of the optical parameter such that the same effect as that of the distance change unit 1421 is attained. For example, the effect obtained by reducing the value of the distance parameter A2 with the distance change unit 1421 may be attained by changing the value of the optical parameter with the zoom amount change unit 1421A such that the zoom amount increases. Similarly, the effect obtained by increasing the value of the distance parameter A2 with the distance change unit 1421 may be attained by changing the value of the optical parameter with the zoom amount change unit 1421A such that the zoom amount decreases. As described above, the function of the distance change unit 1421 can be attained by the zoom amount change unit 1421A.

Note that, in another modification example, the distance change unit 1421 and the zoom amount change unit 1421A may simultaneously function. In addition, only one of the first distance change unit 14211 and the second distance change unit 14212 of the distance change unit 1421 according to the embodiment described above may be attained by the zoom amount change unit 1421A.

As described above, each of the examples has been described, but the invention is not limited to specific examples, and various deformations and changes can be made within the scope according to the claims. In addition, all or a plurality of constituents of the examples described above can also be combined.

For example, in the embodiment described above, processing of setting the value of the deformation parameter A1, the value of the distance parameter A2, and the origin position, on the basis of a position relationship between the region of the field object within the viewing angle of the virtual camera 60 and the specific object is executed in the deformation processing associated with the movement of the predetermined object (step S1615 in FIG. 16), but instead thereof or in addition thereto, may be executed in the bending deformation processing of the field object after the rotation processing (step S1619 in FIG. 16). In this case, the value of the deformation parameter A1, the value of the distance parameter A2, and the origin position may be similarly set on the basis of a position relationship between the region of the field object within the viewing angle of the virtual camera 60 and the specific object after the rotation processing.

Specifically, for example, in a case where the virtual camera 60 is rotated by a predetermined angle for each processing cycle, in the rotation processing according to the revolution and/or the planetary rotation, there are a plurality of regions of the field object falling within the viewing angle of the virtual camera 60 at each predetermined angle for one lap (in the case of the rotation processing according to the attack angle, there are a plurality of regions according to a variable range), and hereinafter, the region will be referred to as a predetermined region. In a case where there is the region in which the specific object is positioned (the specific object region) (an example of a second predetermined region), in the plurality of predetermined regions for one lap, there is also the region in which the specific object is not positioned (an example of a first predetermined region). Note that, there may be no specific object region, in accordance with the position of the virtual camera 60. In a case where the region of the field object falling within the viewing angle of the virtual camera 60 is changed in the regions in which the specific object is not positioned, on the basis of the rotation processing according to the revolution and/or the planetary rotation, in a situation where there is the specific object region in the plurality of predetermined regions for one lap, the value of the deformation parameter A1 may not be changed, whereas in a case where the region of the field object falling within the viewing angle of the virtual camera 60 is transitioned between the region in which the specific object is not positioned and the specific object region, the value of the deformation parameter A1 may be changed. In this case, when the region of the field object falling within the viewing angle of the virtual camera 60 is changed in the regions in which the specific object is not positioned, on the basis of the rotation processing according to the revolution and/or the planetary rotation, the bending deformation of the field object 77 according to the changed visual line direction V (the bending deformation in the same deformation mode when viewed in the visual line direction V of the virtual camera 60) is attained, and thus, the height H1 of the horizon line HL is not changed. Accordingly, the height H1 of the horizon line HL can be constantly retained while the virtual camera 6 follows even a curved movement of the first object 3. Here, in the modification example, the height H1 of the horizon line HL may be changed within a level at which the user does not feel a sense of discomfort. For example, the level at which the user does not feel a sense of discomfort may be a level corresponding to fine unevenness or the like that can be provided in the field object (that is, a shape slightly different from the shape of the field surface 70). According to a change within such a level, the height H1 of the horizon line HL is approximately the same.

On the other hand, in a case where the value of the deformation parameter A1 is not changed, and the region of the field object falling within the viewing angle of the virtual camera 60 is transitioned between the region in which the specific object is not positioned and the specific object region, the deformation degree increases, and thus, as described above, the specific object can be effectively emphasized. Even in this case, as with the case described above, the value of the deformation parameter A1 may be changed when the specific object is positioned in the end portion of the region of the field object 77 within the viewing angle of the virtual camera 60 (an example of the second range) and when the specific object is positioned in the center portion of the region of the field object 77 within the viewing angle of the virtual camera 60 (an example of the first range). In addition, the value of the deformation parameter A1 may be changed (may increase) to the value $\beta_{G*}$ (an example of the first setting value) from the interpolation value (an example of the second setting value) that is greater than the normal value $\beta_0$ (an example of the predetermined setting value), through one or more interpolation values (an example of the second setting value), as the position of the specific object is changed to the center portion from the end portion of the region of the field object 77 within the viewing angle of the virtual camera 60, on the basis of the rotation processing according to the revolution and/or the planetary rotation.

In addition, in the embodiment described above, the processing of setting the value of the deformation parameter A1, the value of the distance parameter A2, and the origin position is executed in the deformation processing associated with the movement of the predetermined object (step S1615 in FIG. 16), on the basis of the position relationship between the region of the field object within the viewing angle of the virtual camera 60 and the specific object, but instead thereof or in addition thereto, may be executed in the distance change processing that is not associated with the movement of the predetermined object (for example, distance change processing according to a distance change instruction from the user that is not included in the manipulation information) (not illustrated). This is because even in a case where each of the values of the position parameters (X, Y) of the virtual camera 60 is not changed, the value of the distance parameter A2 is changed, and thus, a transition may be performed between a state in which the specific object is positioned in the region of the field object 77 within the viewing angle of the virtual camera 60 and a state in a case where the specific object is not positioned. The same applies to the processing of the zoom amount change unit 1421A according to the modification example described above (processing of changing the value of the optical parameter relevant to the zoom amount of the virtual camera 60).

Specifically, for example, in a case where the value of the distance parameter A2 of the virtual camera 60 is changed by a predetermined distance for each processing cycle, in the distance change processing according to the distance change instruction from the user, there are a plurality of regions of the field object within the viewing angle of the virtual camera 60 according to a variable range of the distance, for each predetermined distance, and in a case where there is the region in which the specific object is positioned (the specific object region), in the plurality of regions, there is also the region in which the specific object is not positioned. Note that, there may be no specific object region, in accordance with the position of the virtual camera 60. In a case where the region of the field object falling within the viewing angle of the virtual camera 60 is changed in the regions in which the specific object is not positioned, on the basis of the distance change processing according to the distance change instruction, in a situation where there is the specific object region in the plurality of regions, the value of the deformation parameter A1 may not be changed, whereas in a case where the region of the field object falling within the viewing angle of the virtual camera 60 is transitioned between the region in which the specific object is not positioned and the specific object region, the value of the deformation parameter A1 may be changed. In this case, in a case where the region of the field object falling within the viewing angle of the virtual camera 60 is changed to the region in which the specific object is positioned, on the basis of the distance change processing according to the distance change instruction, the deformation degree increases, and thus, as described above, the specific object can be effectively emphasized. Even in this case, as with the case described above, the value of the deformation parameter A1 may be changed when the specific object is positioned in the end portion of the region of the field object 77 within the viewing angle of the virtual camera 60 (an example of the second range) and when the specific object is positioned in the center portion of the region of the field object 77 within the viewing angle of the virtual camera 60 (an example of the first range). In addition, the value of the deformation parameter A1 may be changed (may increase) to the value $\beta_{G*}$ (an example of the first setting value) from the interpolation value (an example of the second setting value) that is greater than the normal value $\beta_0$ (an example of the predetermined setting value), through one or more interpolation values (an example of the second setting value), as the position of the specific object is changed to the center portion from the end portion of the region of the field object 77 within the viewing angle of the virtual camera 60, on the basis of the distance change processing according to the distance change instruction.

In addition, in the embodiment described above, the bending deformation of the field object is attained by performing the bending deformation with respect to the entire field object, but the invention is not limited thereto. For example, the bending deformation of the field object may be executed with respect to only the region of the entire field object falling within the viewing angle of the virtual camera 60 or only a part of a region including the region.

In addition, in the embodiment described above, in a case where the predetermined object is moved, the values of various parameters (for example, the distance parameter A2, the direction parameter θ, the attack angle parameter ψ, and the like) associated with each of the values of the position parameters (X, Y) of the virtual camera 60 are the same every time when each of the values of the position parameters (X, Y) is the same. For example, in a case where the predetermined object is moved, and the predetermined object is positioned in one position, the same values of various parameters (for example, the distance parameter A2, the direction parameter θ, the attack angle parameter ψ, and the like) are attained with respect to the one position. However, the invention is not limited thereto. For example, in a case where the predetermined object is moved, the values of various parameters (for example, the distance parameter A2, the direction parameter θ, the attack angle parameter ψ, and the like) associated with each of the values of the position parameters (X, Y) of the virtual camera 60 may be changed in accordance with the progress situation of the game or other factors (for example, the movement direction of the predetermined object, and the like) even when each of the values of the position parameters (X, Y) is the same. For example, in a case where the predetermined condition is established on the basis of the progress situation of the game or other factors, the value of the deformation parameter A1 associated with the specific position A may be set to the value $β_1$, and in the other case, the value may be set to the normal value $β_0$. In addition, such a change, for example, may be executed in accordance with the occurrence of a predetermined event, a case where the second object that is moved enters the region of the field object falling within the viewing angle of the virtual camera 60 (is arranged within the screen), or a manual manipulation of the user for changing the viewing angle.

In addition, in the embodiment described above, each of the specific positions such as the specific positions A and B is a fixed position on the field object, and may be a position that is movable on the field object. For example, a part of the specific position may be set in accordance with the position of a predetermined second object that is moved, in the second objects. In this case, one specific position may be a position having a predetermined relationship with respect to the position of one predetermined second object that is moved.

Figure 31:
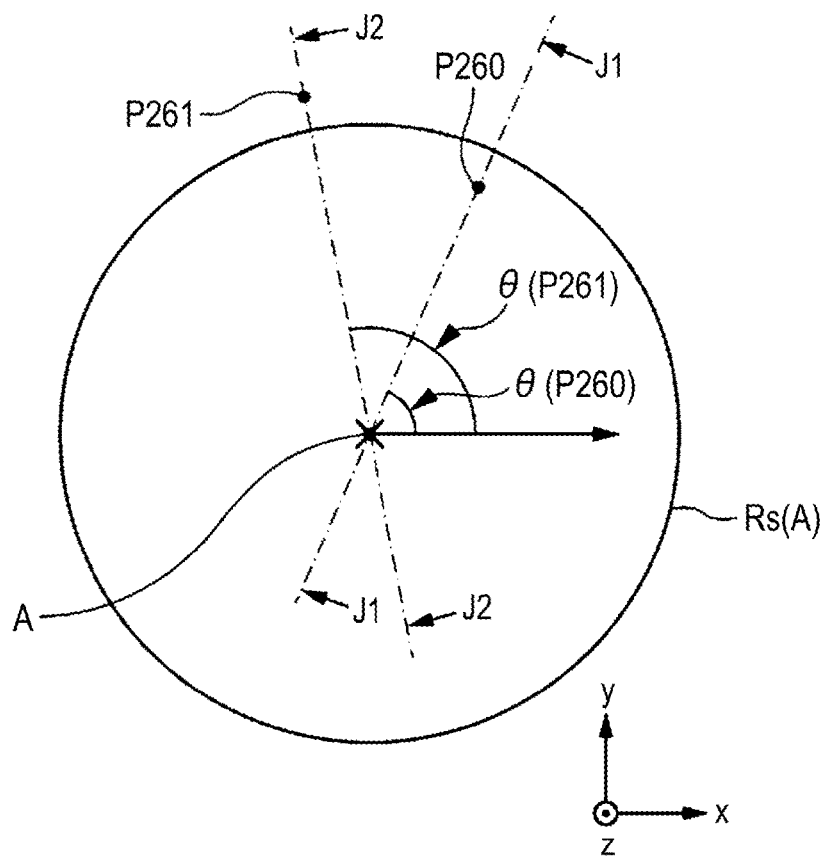
FIG. 31 is an (first) explanatory diagram of a setting method of the interpolation processing range.
Figure 32:
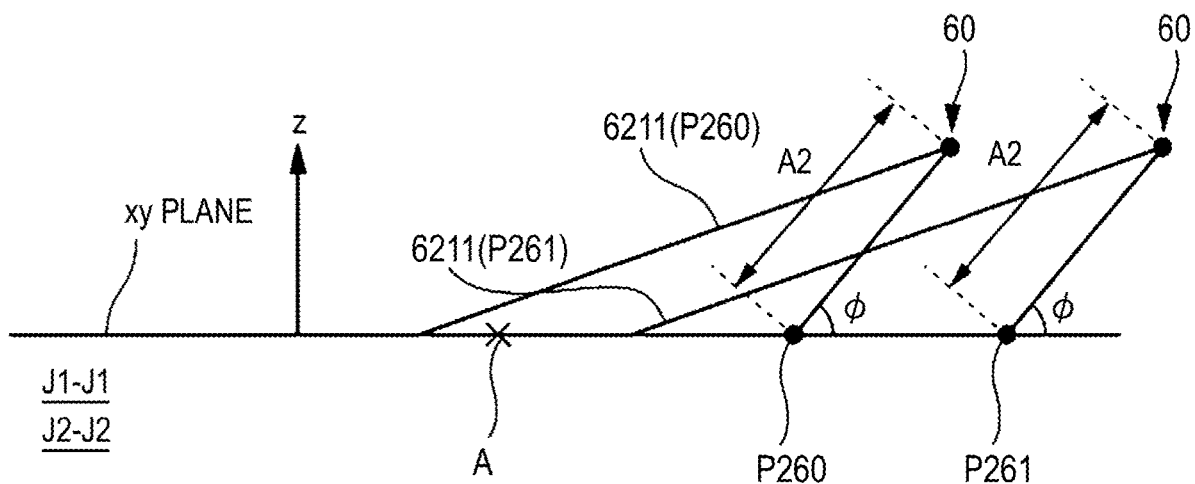
FIG. 32 is an (second) explanatory diagram of the setting method of the interpolation processing range.

In addition, in the embodiment described above, as a case where the interpolation processing range according to the specific position (hereinafter, the same applies to the interpolation processing range according to the specific object) is fixed without being dynamically changed, as described above, in a case where each of the values of the position parameters (X, Y) of the virtual camera 60 is positioned within the interpolation processing range, and the values of the distance parameter A2 and the attack angle parameter ψ are the normal values $γ_0$ and $ψ_0$, respectively, it may be set that the specific position according to the interpolation processing range is positioned in the region of the field object falling within the viewing angle of the virtual camera 60, even at the time of the value of the arbitrary direction parameter θ. For example, in FIG. 31, an interpolation processing range Rs(A) relevant to the specific position A is illustrated in the plan view, and in FIG. 32, a sectional view along line J1-J1 of FIG. 31 and a sectional view along line J2-J2 are illustrated to overlap with each other. In this case, when each of the values of the position parameters (X, Y) of the virtual camera 60 corresponds to a position P260, and the values of the distance parameter A2 and the attack angle parameter ψ are the normal values $γ_0$ and $ψ_0$, respectively, as illustrated in FIG. 32, the specific position A is positioned in the region of the field object falling within the viewing angle of the virtual camera 60 in a case where the value of the parameter θ is θ(P260) as illustrated in FIG. 31. Note that, the boundary line 6211 illustrated in FIG. 32 is a boundary line on the upper side of the viewing angle 62 of the virtual camera 60 (the viewing angle when viewed in the direction perpendicular to the z direction) (refer to FIG. 5). Accordingly, in this case, the position P260 belongs to the interpolation processing range Rs(A). On the other hand, when each of the values of the position parameters (X, Y) of the virtual camera 60 corresponds to a position P261, and the values of the distance parameter A2 and the attack angle parameter ψ are the normal values $γ_0$ and $ψ_0$, respectively, as illustrated in FIG. 32, the specific position A is not positioned in the region of the field object falling within the viewing angle of the virtual camera 60 in a case where the value of the parameter θ is θ(P261) as illustrated in FIG. 31. Accordingly, in this case, the position P260 does not belong to the interpolation processing range Rs(A). However, as another setting mode, it may be set that the interpolation processing range is dynamically changed on the basis of each of the values of the camera parameters at this time. For example, when each of the values of the position parameters (X, Y) of the virtual camera 60 is positioned within the interpolation processing range, and each of the values of the distance parameter A2 and the attack angle parameter ψ after being updated (or before being updated) (can be values different from the normal values $γ_0$ and $ψ_0$) is applied, an interpolation processing range according to one specific position may be dynamically set such that the one specific position is positioned in the region falling within the viewing angle of the virtual camera 60 even in the case of the value of the arbitrary direction parameter θ. This is because even in a case where each of the values of the position parameters (X, Y) of the virtual camera 60 is out of one interpolation processing range, the values are positioned within the other interpolation processing range, and thus, the value of the distance parameter A2 or the like may be an interpolation value that is not a normal value. Note that, here, a specification is assumed in which the revolution or the planetary rotation of the virtual camera 60 can be performed in an arbitrary position, but in a specification where the revolution or the planetary rotation of the virtual camera 60 can be performed only in a limited position or a specification where the revolution or the planetary rotation itself is not capable of being performed, "even in the case of the value of the arbitrary direction parameter θ" described above may be replaced with "in the case of the value of the direction parameter θ at this time point".

In addition, in a mode where the interpolation processing range increases as a change rate (a change amount per hour) of each of the values of the position parameters (X, Y) of the virtual camera 60 increases, the width of the interpolation processing range may be dynamically changed in accordance with the change rate. Alternatively, on the basis of the similar concept, a predetermined margin may be set with respect to the interpolation processing range, regardless of the change rate. Accordingly, for example, a disadvantage that may occur in a case where each of the values of the position parameters (X, Y) of the virtual camera 60 is changed to each value corresponding to the specific position (or the specific object), in a state where the change rate (the change amount per hour) of each of the values of the position parameters (X, Y) of the virtual camera 60 is large (a sense of discomfort that can be felt by the user due to a comparatively steep change in the field image), can be reduced.

In addition, in a case where the viewing angle of the virtual camera 60 is variable, in a mode where the interpolation processing range increases as the viewing angle decreases, the width of the interpolation processing range may be dynamically changed in accordance with the viewing angle of the virtual camera 60. Accordingly, for example, a disadvantage that may occur in a case where each of the values of the position parameters (X, Y) of the virtual camera 60 is changed to each value corresponding to the specific position (the specific object), in a state where the viewing angle of the virtual camera 60 is small (a sense of discomfort that can be felt by the user due to a comparatively steep change in the field image), can be reduced.

In addition, in the embodiment described above, whether or not to execute interpolation processing is set on the basis of whether or not each of the values of the position parameters (X, Y) after being updated is positioned in the interpolation processing range, but the invention is not limited thereto. For example, equivalently, each of the values of the position parameters (X, Y) of the virtual camera 60 after being updated may be positioned, the region of the field object falling within the viewing angle of the virtual camera 60 (that is, the region within the viewing angle described above) may be derived on the basis of each of the values of the distance parameter A2 and the attack angle parameter $\psi$ after being updated, and it may be determined whether or not the specific position or the specific object is positioned in the region within the viewing angle. In this case, when the specific position or the specific object is positioned in the region within the viewing angle, but each of the values of the position parameters (X, Y) of the virtual camera 60 after being updated does not correspond to the position of the specific position or the specific object, the interpolation processing may be executed.

In addition, in each of the embodiments described above, the first movement processing unit 1420 may be omitted.

Note that, the following appendices will be further disclosed regarding the examples described above.

[Appendix 1]

An information processing device for drawing an object arranged in a three-dimensional virtual space defined by a first axis, a second axis, and a third axis that are orthogonal to each other, in an expression viewed from a virtual camera arranged in the virtual space, the object including a field object associated with a two-dimensional plane defined by the first axis and the second axis, and a specific object arranged on the field object, the device including:

a change processing unit changing a region of the field object falling within a viewing angle of the virtual camera; and a deformation processing unit deforming the field object, in which in a case where the region is changed by the change processing unit, the deformation processing unit determines whether or not the specific object is positioned in the region after being changed, and makes a deformation mode of the field object different when it is determined that the specific object is positioned in the region after being changed and when it is determined that the specific object is not positioned in the region after being changed.

[Appendix 2]

The information processing device according to appendix 1, in which in a case where the region is changed by the change processing unit, the deformation processing unit further determines whether the specific object is positioned within a first range in the region after being changed or the specific object is positioned within a second range adjacent to the first range in the region, and makes a deformation degree of the field object different when it is determined that the specific object is positioned within the first range and when it is determined that the specific object is positioned within the second range.

[Appendix 3]

The information processing device according to appendix 2, in which the second range is positioned on both sides of the first range of the viewing angle of the virtual camera in a horizontal direction, and in a case where it is determined that the specific object is positioned within the first range, the deformation processing unit increases the deformation degree of the field object, compared to a case where it is determined that the specific object is positioned within the second range.

[Appendix 4]

The information processing device according to appendix 1, in which in a case where a position of the specific object in the region after being changed is changed toward a center portion of the region after being changed from one end side in a horizontal direction, every time when the region is changed by the change processing unit, the deformation processing unit increases a deformation degree of the field object, every time when the region is changed by the change processing unit.

[Appendix 5]

The information processing device according to appendix 1, in which the field object is shaped on the basis of a deformable basic surface, and in a case where a predetermined position is set to an origin on a plane including a visual line direction of the virtual camera and the third axis, an axis that passes through the origin and is parallel to the third axis is set to a Y axis, a direction toward an upper side with respect to the field object is set to a positive side of the Y axis, and an axis that passes through the origin and is perpendicular to the Y axis is set to an X axis, the deformation processing unit deforms the basic surface, in accordance with a function in which a value of a Y coordinate monotonically decreases linearly or non-linearly as an absolute value of a value of an X coordinate increases.

[Appendix 6]

The information processing device according to appendix 5, in which the deformation processing unit deforms the basic surface, on the basis of a value of a deformation parameter that is changeable in accordance with a change in the region and sets a deformation degree of the field object, and the deformation parameter includes a coefficient that is assigned to a term for the value of the X coordinate, in the function.

[Appendix 7]
The information processing device according to appendix 6,
in which the region includes a predetermined object region in which the specific object is not positioned, a first object region in which the specific object is positioned in a center portion, and a second object region in which the specific object is positioned in an end portion,
the value of the deformation parameter includes a predetermined setting value set in the predetermined object region, a first setting value set in the first object region, and a second setting value set in the second object region, and
the first setting value attains the deformation degree of the field object that is greater than the second setting value, and the second setting value attains the deformation degree of the field object that is greater than the predetermined setting value.

[Appendix 8]
The information processing device according to appendix 7,
in which in a case where the region is changed between the predetermined object region and the first object region by the change processing unit through the second object region, the deformation processing unit changes the value of the deformation parameter to the first setting value or the predetermined setting value through the second setting value.

[Appendix 9]
The information processing device according to appendix 6,
in which the specific object includes a first specific object and a second specific object,
the region includes a predetermined object region in which both of the first specific object and the second specific object are not positioned, and an object region in which both of the first specific object and the second specific object are positioned,
the object region includes a first object region in which the first specific object is positioned in a center portion, a second object region in which both of the first specific object and the second specific object are not positioned in a center portion, and a third object region in which the second specific object is positioned in a center portion,
the value of the deformation parameter includes a predetermined setting value set in the predetermined object region, a first setting value set in the first object region and the third object region, and a second setting value set in the second object region,
the first setting value attains the deformation degree of the field object that is greater than the second setting value, and the second setting value attains the deformation degree of the field object that is greater than the predetermined setting value, and
in a case where the region is changed between the predetermined object region and the first object region or the third object region by the change processing unit through the second object region, the deformation processing unit changes the value of the deformation parameter to the first setting value or the predetermined setting value through the second setting value.

[Appendix 10]
The information processing device according to any one of appendices 5 to 9,
in which in a case where it is determined that the specific object is positioned in the region after being changed, the deformation processing unit sets the predetermined position, on the basis of a position of the specific object.

[Appendix 11]
The information processing device according to any one of appendices 1 to 10,
in which the change processing unit includes a first movement processing unit relatively changing a position of the virtual camera with respect to the field object, in a direction intersecting with the visual line direction of the virtual camera, and
the region is changed by the first movement processing unit changing the position of the virtual camera with respect to the field object.

[Appendix 12]
The information processing device according to any one of appendices 5 to 10,
in which the specific object is fixed with respect to the field object,
the object further includes a predetermined object arranged with respect to the field object,
the information processing device, further includes: a second movement processing unit relatively changing a position of the predetermined object with respect to the field object within the two-dimensional plane defined by the first axis and the second axis, and
in a case where it is determined that the specific object is not positioned in the region after being changed, the deformation processing unit sets the predetermined position, on the basis of the position of the predetermined object.

[Appendix 13]
The information processing device according to any one of appendices 1 to 12,
in which in a case where it is determined that the specific object is not positioned in the region after being changed, the deformation processing unit further determines whether the position of the virtual camera with respect to the field object is in a first position or in a second position different from the first position in the direction intersecting with the visual line direction of the virtual camera, and makes the deformation degree of the field object different when it is determined that the position of the virtual camera with respect to the field object is in the first position and when it is determined that the position of the virtual camera with respect to the field object is in the second position.

[Appendix 14]
The information processing device according to appendix 13, further including:
a distance change unit making a distance between the virtual camera and the field object in the visual line direction of the virtual camera different when the position of the virtual camera with respect to the field object is in the first position and when the position of the virtual camera with respect to the field object is in the second position.

[Appendix 15]
The information processing device according to any one of appendices 1 to 12,
in which the change processing unit further includes a distance change unit changing a distance between the virtual camera and the field object in the visual line direction of the virtual camera, and
the region is changed by the distance change unit changing a distance of the virtual camera with respect to the field object.

[Appendix 16]
The information processing device according to appendix 15,
in which in a case where it is determined that the specific object is not positioned in the region after being changed, the deformation processing unit further determines whether the distance of the virtual camera with respect to the field object is a first distance or a second distance different from the first distance, and makes the deformation degree of the field object different when it is determined that the distance of the virtual camera with respect to the field object is the first distance and when it is determined that the distance of the virtual camera with respect to the field object is the second distance.

[Appendix 17]

The information processing device according to any one of appendices 1 to 16, in which the change processing unit further includes a rotation processing unit changing the visual line direction of the virtual camera with respect to the field object around the third axis, and the region is changed by the rotation processing unit changing the visual line direction of the virtual camera with respect to the field object.

[Appendix 18]

The information processing device according to appendix 17, in which the region includes a plurality of predetermined regions, each of which sequentially falls within the viewing angle of the virtual camera, every time when the visual line direction is changed around the third axis by a predetermined angle by the rotation processing unit, the plurality of predetermined regions include a plurality of first predetermined regions in which the specific object is not positioned, and a second predetermined region in which the specific object is positioned, and in a case where the visual line direction is changed around the third axis by the rotation processing unit, the deformation processing unit determines whether or not the region is changed from one to another of the plurality of first predetermined regions, and performs bending deformation with respect to the field object such that a deformation mode is the same when viewed in the visual line direction before being changed and when viewed in the visual line direction after being changed in a case where it is determined that the region is changed from one to another of the plurality of first predetermined regions.

[Appendix 19]

The information processing device according to any one of appendices 1 to 18, in which the object further includes a background object, and the information processing device further includes: a background processing unit changing a position of the background object with respect to the field object along a direction of the third axis in a case where it is determined that the deformation degree of the field object is changed by determining whether or not the deformation degree of the field object that is deformed by the deformation processing unit is changed.

[Appendix 20]

An information processing method for drawing an object arranged in a three-dimensional virtual space defined by a first axis, a second axis, and a third axis that are orthogonal to each other, in an expression viewed from a virtual camera arranged in the virtual space, which is executed by a computer, the object including a field object associated with a two-dimensional plane defined by the first axis and the second axis, and a specific object arranged on the field object, the method including:

determining whether or not the specific object is positioned in a region of the field object falling within a viewing angle of the virtual camera after being changed in a case where the region is changed;

deforming the field object in a first deformation mode in a case where it is determined that the specific object is positioned in the region after being changed; and deforming the field object in a second deformation mode different from the first deformation mode in a case where it is determined that the specific object is not positioned in the region after being changed.

[Appendix 21]

An information processing program for drawing an object arranged in a three-dimensional virtual space defined by a first axis, a second axis, and a third axis that are orthogonal to each other, in an expression viewed from a virtual camera arranged in the virtual space, the object including a field object associated with a two-dimensional plane defined by the first axis and the second axis, and a specific object arranged on the field object, the program allowing a computer to execute processing of:

determining whether or not the specific object is positioned in a region of the field object falling within a viewing angle of the virtual camera after being changed in a case where the region is changed;

deforming the field object in a first deformation mode in a case where it is determined that the specific object is positioned in the region after being changed; and deforming the field object in a second deformation mode different from the first deformation mode in a case where it is determined that the specific object is not positioned in the region after being changed.

REFERENCE SIGNS LIST 1 game system
3 first object
10 server device
11 server communication unit
12 server storage unit
13 server control unit
14 horizontal passage
15 vertical passage
16 street plant object
20 terminal device
21 terminal communication unit
22 terminal storage unit
23 display unit
24 input unit
25 terminal control unit
30 network
60 virtual camera
62 viewing angle
70 field surface
72 background surface
77 field object
130 drawing information storage unit
132 manipulation information acquisition unit
134 drawing data transmission unit
140 drawing processing unit
142 change processing unit
1420 first movement processing unit
1421 distance change unit
14211 first distance change unit
14212 second distance change unit
1421A zoom amount change unit 1422 direction change unit
1423 attack angle change unit
1424 update reflection unit
1425 rotation processing unit
14251 revolution processing unit
14252 planetary rotation processing unit
14253 attack angle processing unit
144 second movement processing unit
145 deformation processing unit
1451 first deformation parameter calculation unit
1452 second deformation parameter calculation unit
1453 deformation parameter adjustment unit
1454 origin setting processing unit
1455 deformation function application unit
146 projection processing unit
147 background processing unit
148 drawing data generation unit

The invention claimed is:

1. An information processing device for drawing an object arranged in a three-dimensional virtual space defined by a first axis, a second axis, and a third axis that are orthogonal to each other, in an expression viewed from a virtual camera arranged in the virtual space, comprising:
   a storage unit storing the object including a field object associated with a two-dimensional plane defined by the first axis and the second axis, and a specific object arranged on the field object,
   a change processing unit changing a region of the field object falling within a viewing angle of the virtual camera; and
   a deformation processing unit deforming the field object,
   wherein in a case where the region is changed by the change processing unit, the deformation processing unit determines whether or not the specific object is positioned in the region after being changed, and makes a deformation mode of the field object different when it is determined that the specific object is positioned in the region after being changed and when it is determined that the specific object is not positioned in the region after being changed.

2. The information processing device according to claim 1,
   wherein in a case where the region is changed by the change processing unit, the deformation processing unit further determines whether the specific object is positioned within a first range in the region after being changed or the specific object is positioned within a second range adjacent to the first range in the region, and makes a deformation degree of the field object different when it is determined that the specific object is positioned within the first range and when it is determined that the specific object is positioned within the second range.

3. The information processing device according to claim 2,
   wherein the second range is positioned on both sides of the first range of the viewing angle of the virtual camera in a horizontal direction, and
   in a case where it is determined that the specific object is positioned within the first range, the deformation processing unit increases the deformation degree of the field object, compared to a case where it is determined that the specific object is positioned within the second range.

4. The information processing device according to claim 1,
   wherein in a case where a position of the specific object in the region after being changed is changed toward a center portion of the region after being changed from one end side in a horizontal direction, every time when the region is changed by the change processing unit, the deformation processing unit increases a deformation degree of the field object, every time when the region is changed by the change processing unit.

5. The information processing device according to claim 1,
   wherein the field object is shaped on the basis of a deformable basic surface, and
   in a case where the plane includes a direction of the virtual camera's line of sight and the third axis, the predetermined position is set to the origin, and the axis passes through the origin and is parallel to the third axis is set to a Y axis, a direction toward an upper side with respect to the field object is set to a positive side of the Y axis, and an axis that passes through the origin and is perpendicular to the Y axis is set to an X axis, the deformation processing unit deforms the basic surface, in accordance with a function in which a value of a Y coordinate monotonically decreases linearly or non-linearly as an absolute value of a value of an X coordinate increases.

6. The information processing device according to claim 5,
   wherein the deformation processing unit deforms the basic surface, on the basis of a value of a deformation parameter that is changeable in accordance with a change in the region and sets a deformation degree of the field object, and
   the deformation parameter includes a coefficient that is assigned to a term for the value of the X coordinate, in the function.

7. The information processing device according to claim 6,
   wherein the region includes a predetermined object region in which the specific object is not positioned, a first object region in which the specific object is positioned in a center portion, and a second object region in which the specific object is positioned in an end portion,
   the value of the deformation parameter includes a predetermined setting value set in the predetermined object region, a first setting value set in the first object region, and a second setting value set in the second object region, and
   the first setting value sets the deformation degree of the field object that is greater than the second setting value, and the second setting value attains the deformation degree of the field object that is greater than the predetermined setting value.

8. The information processing device according to claim 7,
   wherein in a case where the region is changed between the predetermined object region and the first object region by the change processing unit through the second object region, the deformation processing unit changes the value of the deformation parameter to the first setting value or the predetermined setting value through the second setting value.

9. The information processing device according to claim 6,
   wherein the specific object includes a first specific object and a second specific object, the region includes a predetermined object region in which both of the first specific object and the second specific object are not positioned, and an object region in which both of the first specific object and the second specific object are positioned, the object region includes a first object region in which the first specific object is positioned in a center portion, a second object region in which both of the first specific object and the second specific object are not positioned in a center portion, and a third object region in which the second specific object is positioned in a center portion, the value of the deformation parameter includes a predetermined setting value set in the predetermined object region, a first setting value set in the first object region and the third object region, and a second setting value set in the second object region, the first setting value attains the deformation degree of the field object that is greater than the second setting value, and the second setting value attains the deformation degree of the field object that is greater than the predetermined setting value, and in a case where the region is changed between the predetermined object region and the first object region or the third object region by the change processing unit through the second object region, the deformation processing unit changes the value of the deformation parameter to the first setting value or the predetermined setting value through the second setting value.

10. The information processing device according to claim 5,
wherein in a case where it is determined that the specific object is positioned in the region after being changed, the deformation processing unit sets the predetermined position, on the basis of a position of the specific object.

11. The information processing device according to claim 1,
wherein the change processing unit includes a first movement processing unit relatively changing a position of the virtual camera with respect to the field object, in a direction intersecting with the visual line direction of the virtual camera, and
the region is changed by the first movement processing unit changing the position of the virtual camera with respect to the field object.

12. The information processing device according to claim 5,
wherein the specific object is fixed with respect to the field object,
the object further includes a predetermined object arranged with respect to the field object,
the information processing device, further comprises: a second movement processing unit relatively changing a position of the predetermined object with respect to the field object within the two-dimensional plane defined by the first axis and the second axis, and
in a case where it is determined that the specific object is not positioned in the region after being changed, the deformation processing unit sets the predetermined position, on the basis of the position of the predetermined object.

13. The information processing device according to claim 1,
wherein in a case where it is determined that the specific object is not positioned in the region after being changed, the deformation processing unit further determines whether the position of the virtual camera with respect to the field object is in a first position or in a second position different from the first position in the direction intersecting with the visual line direction of the virtual camera, and makes a deformation degree of the field object different when it is determined that the position of the virtual camera with respect to the field object is in the first position and when it is determined that the position of the virtual camera with respect to the field object is in the second position.

14. The information processing device according to claim 13, further comprising:
a distance change unit making a distance between the virtual camera and the field object in the visual line direction of the virtual camera different when the position of the virtual camera with respect to the field object is in the first position and when the position of the virtual camera with respect to the field object is in the second position.

15. The information processing device according to claim 1,
wherein the change processing unit further includes a distance change unit changing a distance between the virtual camera and the field object in the visual line direction of the virtual camera, and
the region is changed by the distance change unit changing a distance of the virtual camera with respect to the field object.

16. The information processing device according to claim 15,
wherein in a case where it is determined that the specific object is not positioned in the region after being changed, the deformation processing unit further determines whether the distance of the virtual camera with respect to the field object is a first distance or a second distance different from the first distance, and makes a deformation degree of the field object different when it is determined that the distance of the virtual camera with respect to the field object is the first distance and when it is determined that the distance of the virtual camera with respect to the field object is the second distance.

17. The information processing device according to claim 1,
wherein the change processing unit further includes a rotation processing unit changing the visual line direction of the virtual camera with respect to the field object around the third axis, and
the region is changed by the rotation processing unit changing the visual line direction of the virtual camera with respect to the field object.

18. The information processing device according to claim 17,
wherein the region includes a plurality of predetermined regions, each of which sequentially falls within the viewing angle of the virtual camera, every time when the visual line direction is changed around the third axis by a predetermined angle by the rotation processing unit,
the plurality of predetermined regions include a plurality of first predetermined regions in which the specific object is not positioned, and a second predetermined region in which the specific object is positioned, and
in a case where the visual line direction is changed around the third axis by the rotation processing unit, the deformation processing unit determines whether or not the region is changed from one to another of the plurality of first predetermined regions, and performs bending deformation with respect to the field object such that a deformation mode is the same when viewed in the visual line direction before being changed and when viewed in the visual line direction after being changed in a case where it is determined that the region is changed from one to another of the plurality of first predetermined regions.

19. The information processing device according to claim 1,
wherein the object further includes a background object, and
the information processing device further comprises: a background processing unit changing a position of the background object with respect to the field object along a direction of the third axis in a case where it is determined that a deformation degree of the field object is changed by determining whether or not the deformation degree of the field object that is deformed by the deformation processing unit is changed.

20. An information processing method for drawing an object arranged in a three-dimensional virtual space defined by a first axis, a second axis, and a third axis that are orthogonal to each other, in an expression viewed from a virtual camera arranged in the virtual space, which is executed by a computer,
the object including a field object associated with a two-dimensional plane defined by the first axis and the second axis, and a specific object arranged on the field object, the method comprising:
determining whether or not the specific object is positioned in a region of the field object falling within a viewing angle of the virtual camera after being changed in a case where the region is changed;
deforming the field object in a first deformation mode in a case where it is determined that the specific object is positioned in the region after being changed; and
deforming the field object in a second deformation mode different from the first deformation mode in a case where it is determined that the specific object is not positioned in the region after being changed.

21. A non-transitory computer-readable medium embodying program code that, when executed, causes a computer to execute a step of:
drawing an object arranged in a three-dimensional virtual space defined by a first axis, a second axis, and a third axis that are orthogonal to each other, in an expression viewed from a virtual camera arranged in the virtual space, the object including a field object associated with a two-dimensional plane defined by the first axis and the second axis, and a specific object arranged on the field object
wherein drawing the object includes steps of:
determining whether or not the specific object is positioned in a region of the field object falling within a viewing angle of the virtual camera after being changed in a case where the region is changed;
deforming the field object in a first deformation mode in a case where it is determined that the specific object is positioned in the region after being changed; and
deforming the field object in a second deformation mode different from the first deformation mode in a case where it is determined that the specific object is not positioned in the region after being changed.

* * * * *